(12) United States Patent
Kim

(10) Patent No.: US 12,137,181 B2
(45) Date of Patent: Nov. 5, 2024

(54) SYSTEM AND THE METHOD FOR GIVING CONTENTS IN THE SMART PHONE

(71) Applicant: Si-Han Kim, Gwangju-si (KR)

(72) Inventor: Si-Han Kim, Gwangju-si (KR)

( * ) Notice: Subject to any disclaimer, the term of this patent is extended or adjusted under 35 U.S.C. 154(b) by 193 days.

(21) Appl. No.: 17/604,866

(22) PCT Filed: Apr. 16, 2020

(86) PCT No.: PCT/KR2020/005067
§ 371 (c)(1),
(2) Date: Nov. 18, 2021

(87) PCT Pub. No.: WO2020/213941
PCT Pub. Date: Oct. 22, 2020

(65) Prior Publication Data
US 2022/0224788 A1     Jul. 14, 2022

(30) Foreign Application Priority Data

Apr. 19, 2019 (KR) .......................... 10-2019-0046383

(51) Int. Cl.
*H04M 1/02* (2006.01)
*H04M 1/72436* (2021.01)
*H04W 4/14* (2009.01)

(52) U.S. Cl.
CPC ......... *H04M 1/72436* (2021.01); *H04W 4/14* (2013.01)

(58) Field of Classification Search
CPC ........... H04M 1/72436; H04M 1/0214; H04M 1/72469; H04M 2250/16; H04M 1/72403;
(Continued)

(56) References Cited

U.S. PATENT DOCUMENTS

| 10,261,683 B2 * | 4/2019 | Han .................... G06F 3/04886 |
| 2012/0072856 A1 | 3/2012 | Park et al. ..................... 715/752 |

(Continued)

FOREIGN PATENT DOCUMENTS

| CN | 1988562 A | 6/2007 |
| CN | 102624974 A | 8/2012 |

(Continued)

OTHER PUBLICATIONS

International Search Report mailed Aug. 14, 2020, issued to the corresponding International Application No. PCT/KR2020/005067.

*Primary Examiner* — Joseph E Dean, Jr.
(74) *Attorney, Agent, or Firm* — Stein IP, LLC

(57) ABSTRACT

A smartphone configured to provide stepwise information is proposed. In the smartphone configured to provide stepwise information and include a display, a central processing unit, and an input device, the smartphone is configured such that, when a stepwise operation command for distinguishing individual steps is input on the display, the input device outputs the stepwise operation command, and the central processing unit recognizes each step of the stepwise operation command and outputs information suitable for each step to the display, and the smartphone is configured such that a text service is executed on the smartphone, transmitted text and received text is present in the text service, a selection area in which the stepwise operation command is able to be executed is present between the transmitted text and the received text, each step is present from Step 1 to Step K, and K is 2 or more.

20 Claims, 48 Drawing Sheets

(58) Field of Classification Search
CPC ......... H04M 1/72448; H04M 2201/34; H04M 2201/36; H04M 2201/38; H04W 4/14; G06F 3/0482; G06F 3/04842; G06F 3/0485; G06F 3/04883; G06F 3/04886
See application file for complete search history.

(56) References Cited

U.S. PATENT DOCUMENTS

2015/0022436 A1* 1/2015 Cho ................ G06F 1/1615
 345/156
2015/0331573 A1* 11/2015 Zhu ................ G06F 3/0482
 715/788

FOREIGN PATENT DOCUMENTS

| | | | | |
|---|---|---|---|---|
| CN | 103324387 A | 9/2013 | | |
| EP | 2884377 B1 * | 8/2017 | ....... | G06F 17/30867 |
| KR | 10-2016-0018816 A | 2/2016 | | |
| KR | 10-2016-0036522 A | 4/2016 | | |
| KR | 10-2016-0087590 A | 7/2016 | | |
| KR | 10-2016-0109238 A | 9/2016 | | |
| KR | 10-2017-0029466 A | 3/2017 | | |
| KR | 10-2017-0138682 A | 12/2017 | | |

* cited by examiner (1)

(2)

(3)

(4)

(5)

(6)

(7)

(A)

(B)

(A)

(B)

(A)

(B)

SYSTEM AND THE METHOD FOR GIVING CONTENTS IN THE SMART PHONE

CROSS-REFERENCE TO RELATED APPLICATIONS

This application is a national stage of International Application No. PCT/KR2020/005067, filed Apr. 16, 2020, which claims the benefit of Korean Application No. 10-2019-0046383, filed Apr. 19, 2019, in the Korean Intellectual Property Office, the disclosure of which is incorporated herein by reference.

TECHNICAL FIELD

The present disclosure relates to a system and method configured to provide information within a text service of a smartphone and, more particularly, to a system and method that may provide a method of an operation command capable of providing various programs or content as well as information within the text message service.

BACKGROUND ART

A touch screen or touch panel refers to a user interface device that allows a user to directly touch text or a specific position on a screen with his or her finger or any optional operation means without using a keyboard, so as to detect the touched position and process an operation of the touched position through prestored software. As an example, touch panel types include: a resistive overlay type, a surface acoustic wave type, a capacitive overlay type, an infrared beam type, etc.

In addition, due to such various types of touch input devices as described above, a desired operation command may be directly executed on a display, and in practice, as functions of text services diversify, the role of the input function through such a touch screen or touch panel is growing.

However, since a lot of information is interrelated on a display of a today's terminal, a detailed method for effectively displaying the information different from and interrelated with other information currently displayed on the display is not yet proposed.

That is, in Korean Patent Application Publication No. 10-2017-0029466, "A method for providing content realized by a computer", there is provided the method for providing the content, the method including: registering the content in a form of a conversation according to a time flow by receiving data input in a form of a timeline from a terminal of a first user, matching each piece of the data with corresponding time information, and storing the data; receiving a request for access to the content from a terminal of a second user providing a messenger chat interface between a messenger account of the second user and a messenger account that is related to the content according to the request for the access; and providing the content so that the data included in the content may be sequentially reproduced over time on a screen of the terminal of the second user in an order of the time flow corresponding to the matched time information through the messenger chat interface.

In addition, in Korean Patent Application Publication No. 10-2017-0138682, "A content management method of a messenger server that manages DRM (Digital Right Management) content in connection with a DRM server", there is provided a method for managing the content including: establishing a messenger chat session between an account of a first user and an account of a second user, who are registered as members; checking whether the content received from an electronic device of the first user is the DRM content managed in association with the DRM server according to content upload through the messenger chat session of the first user, changing user identification information of a license included within the DRM content from identification information for the first user to identification information for the second user through association with the DRM server when the uploaded content is the DRM content; and providing the DRM content in which the user identification information has been changed, so as to be shared with the second user through the messenger chat session.

However, it is not that the above patented technologies suggest the method of effectively providing various content and information, which are provided by a text service, and various programs provided by a smartphone.

Therefore, when users use the text service, there is an urgent need to develop a system and method that effectively provides various content and information, which are provided by the text service, and various programs provided by the smartphone.

Related Art 1: Korean Patent Application Publication No. 10-2017-0029466 (published on Mar. 15, 2017)
Related Art 2: Korean Patent Application Publication No. 10-2017-0138682 (published on Dec. 18, 2017)

DISCLOSURE

Technical Problem

The present disclosure has been devised to solve the above problems, and an objective of the present disclosure is to provide an operation command and a method of inputting the operation command that effectively provides various content and information, which are provided by a text message service, and various programs provided by a smartphone, when users use the text service.

Technical Solution

The objective of the present disclosure is achieved by a smartphone configured to provide stepwise information, the smartphone including: a display; a central processing unit; and an input device, wherein the smartphone is configured such that, when a stepwise operation command for distinguishing individual steps is input on the display, the input device outputs the stepwise operation command, and the central processing unit recognizes each step of the stepwise operation command and outputs information suitable for each step to the display, and the smartphone is configured such that a text message service is executed on the smartphone, transmitted text and received text is present in the text message service, a selection area in which the stepwise operation command is able to be executed is present between the transmitted text and the received text, each step is present from Step 1 to Step K, K is 2 or more, and when the selection area is Step 1, information on other functions or other programs is provided through one arbitrary step from Step 1 to Step K.

In addition, some or all of the steps among the steps may be input on the display of the smartphone.

In addition, each of the transmitted text and the received text may become the selection area.

In addition, when retransmitting the transmitted text or the received text, a step input may be added to retransmit.

Advantageous Effects

According to the present disclosure, through a stepwise operation command, when using the text message service, the system and method effectively provide various content and information, which are provided by the text message service, and various programs provided by the smartphone.

DESCRIPTION OF THE REFERENCE NUMERALS IN THE VIEWS

Figure 1:
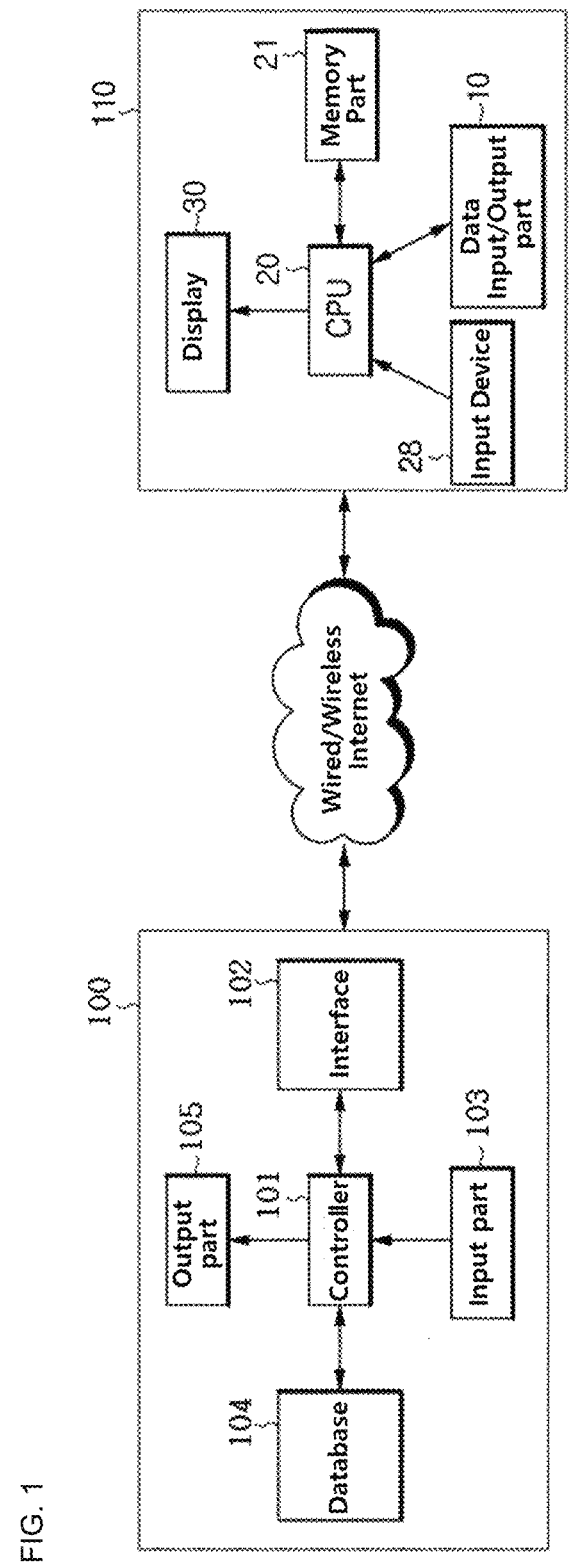
FIG. 1 is a view illustrating a configuration of a smartphone connected to a server through a wired/wireless Internet

1: received text 2: transmitted text
20: central processing unit 21: memory part
24: R/F part 28: input device
30: display 32: selection area (Step 1)
34: Step 2 34a: operation mark
36: Step 3 38: Step 4
40: selection window 41: selection item
42: step input 45: input window
46: step display 47: input space
48: attachment mark 60: first layer
61-1, 61-9: second layer
62-1-1, 62-4-3: third layer
70, 80, 90: table of contents 71, 81, 91: item
72, 82, 92: group item
72a, 82a, 92a: selected item
95: search box 95a: word search
95b: voice search 97: separate window
97a: new item 101: server controller
104: server database 110: smartphone

BEST MODE

Hereinafter, exemplary embodiments according to the present disclosure will be described in detail with reference to the accompanying views. The configuration of the present disclosure and the effects thereof will be clearly understood through the following detailed description.

In addition, detailed descriptions of well-known technical configuration may be omitted.

In the present disclosure, a "stepwise operation command" is executed within a text service of a smartphone, so as to provide various content and information, which are provided by the text service, and various programs provided by the smartphone.

FIG. 1 is a view illustrating a configuration of a smartphone connected to a server through a wired/wireless Internet.

A server 100 in a communication system is a device constituting a system that operates various types of information provision services over the wired/wireless Internet. The server 100 includes: an input part 103 configured to allow a manager or operator of the server 100 to input and manage information; an output part 105 configured to output or display the information (i.e., the output part includes a connection port, a printer, and the like for outputting the information); a database 104 for storing various types of information and information related to the operation of services; and an interface part 102 capable of transmitting and receiving data to and from an accessing user over the Internet or a communication network. Meanwhile, the information refers to all types of information including an image, a video, text, etc.

In addition, a smartphone 110 (or portable terminal) is a terminal capable of transmitting and receiving various types of information over the wired/wireless Internet (or communication network).

Therefore, the smartphone 110 is configured to include: a central processing unit (CPU) 20; a display 30 for displaying various types of information; a memory part 21 for storing various types of the information; an input device 28 for inputting the information; and a data input/output part 10 for inputting/outputting data or the information.

Figure 2:
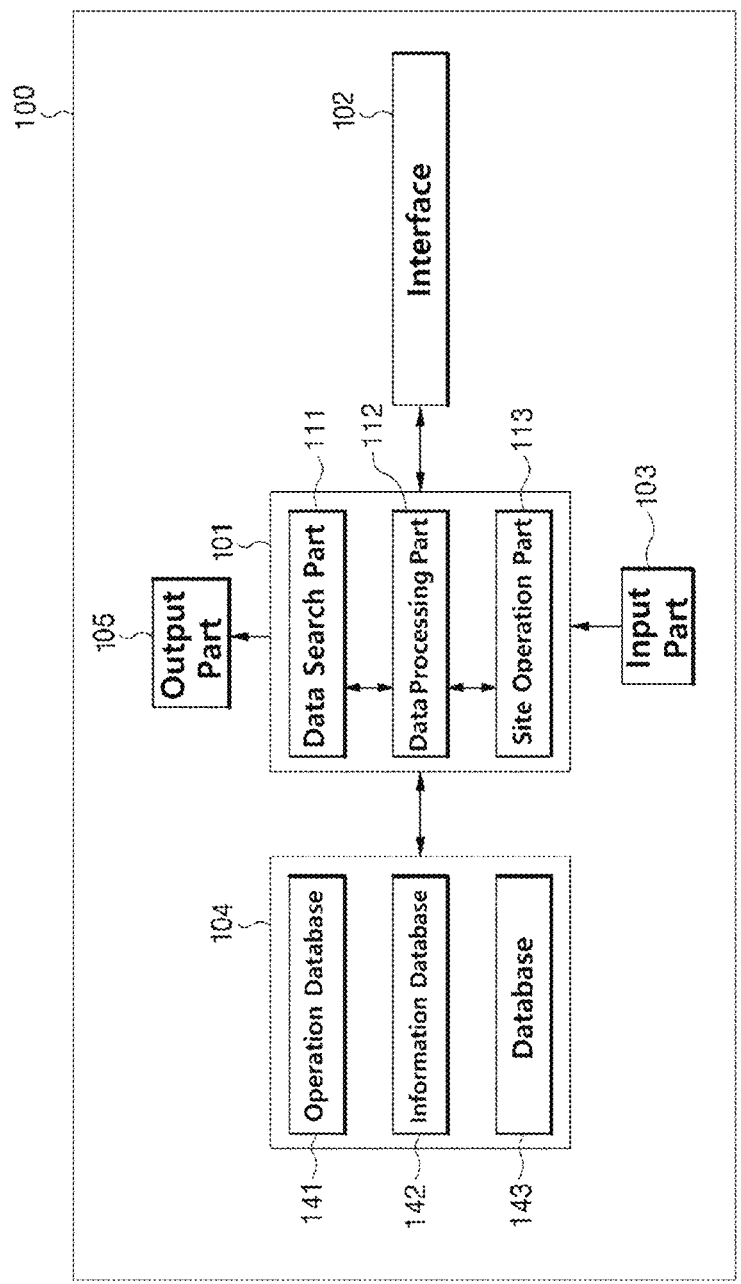
FIG. 2 is a block diagram illustrating the server in more detail.

FIG. 2 is a block diagram illustrating the server in more detail.

A controller 101 is configured in the server 100, and includes a data search part 111 configured to search for data, a data processing part 112, and a site operation part 113 configured to manage and operate Internet-accessing users or Internet members.

In addition, a database 104 is further configured, and the database 104 includes: an operation database 141 for storing information related to the operation of a site; an information database 142 for storing pieces of data suitable for respective pieces of information; and a database 143 for storing a plurality of pieces of information.

In addition, the above-described controller 101 and the database 104 are merely examples, and it may be considered that any conventional controller for performing all algorithms for server operation and any conventional database for storing all types of information may be included in the exemplary embodiment of the present disclosure.

Meanwhile, in the controller 101 of the server 100, the site operation part 113 determines information about an accessing user (or smartphone) and information about memberships and use of content, the data search part 111 searches the database 104 for information that matches the information transmitted from the accessing user (or smartphone), and the data processing part 112 transmits the results of performing the algorithms and the retrieved data to the accessing user through the interface.

Figure 3:
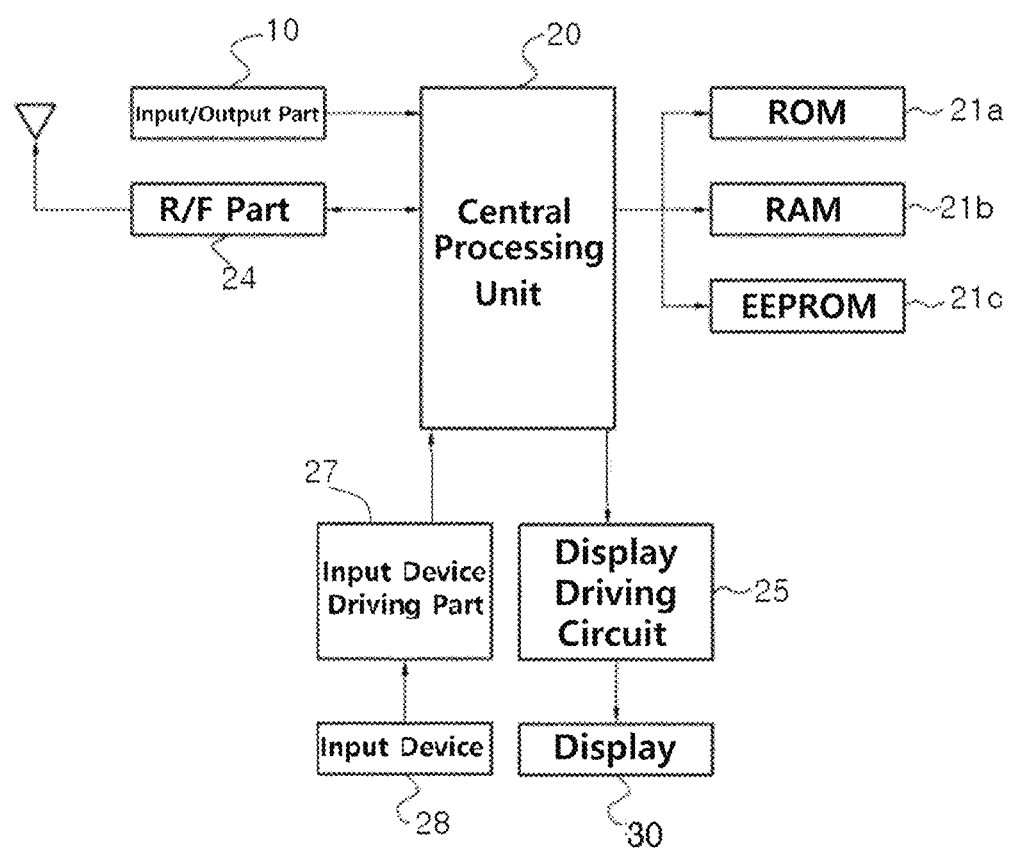
FIG. 3 is a view illustrating a block diagram of a portable smartphone.

FIG. 3 is a view illustrating a block diagram of a portable smartphone.

In the view, the central processing unit 20 is a control means for controlling the entire operation of a portable smartphone (that is, generally, a portable display device, a smartphone, or a computer) used in the exemplary embodiment of the present disclosure. In addition, read only memory (ROM) 21a that is present in the memory part 21 (or 21a, 21b, or 21c) controls execution programs of the display device, random access memory (RAM) 21b stores data generated during the execution of the programs, and electrically erasable programmable ROM (EEPROM) 21c stores data required by a user and data required to process the data required by the user.

A radio frequency (R/F) part 24 is configured to tune to an RF channel with a radio frequency, amplify various types of input signals, and convert the RF signals received through an antenna into required frequency signals. The input/output part 10 includes an input part and an output part, wherein the input part includes various types of information input devices, numeric keys, menu keys, and selection keys, and the output part includes a speaker, a vibrating device, or the like.

There is provided a display driving circuit 25 for receiving signals output from the central processing unit 20 and driving the display, wherein the display driving circuit outputs the signals capable of driving a display 30.

In addition, the central processing unit controls the input device 28 through an input device driving part 27. That is, when information is input through the input device 28, the input device driving part transmits the input information to the central processing unit.

Meanwhile, the portable smartphone of the present disclosure may include a portable display device, a smartphone, a tablet PC, etc.

Figure 4:
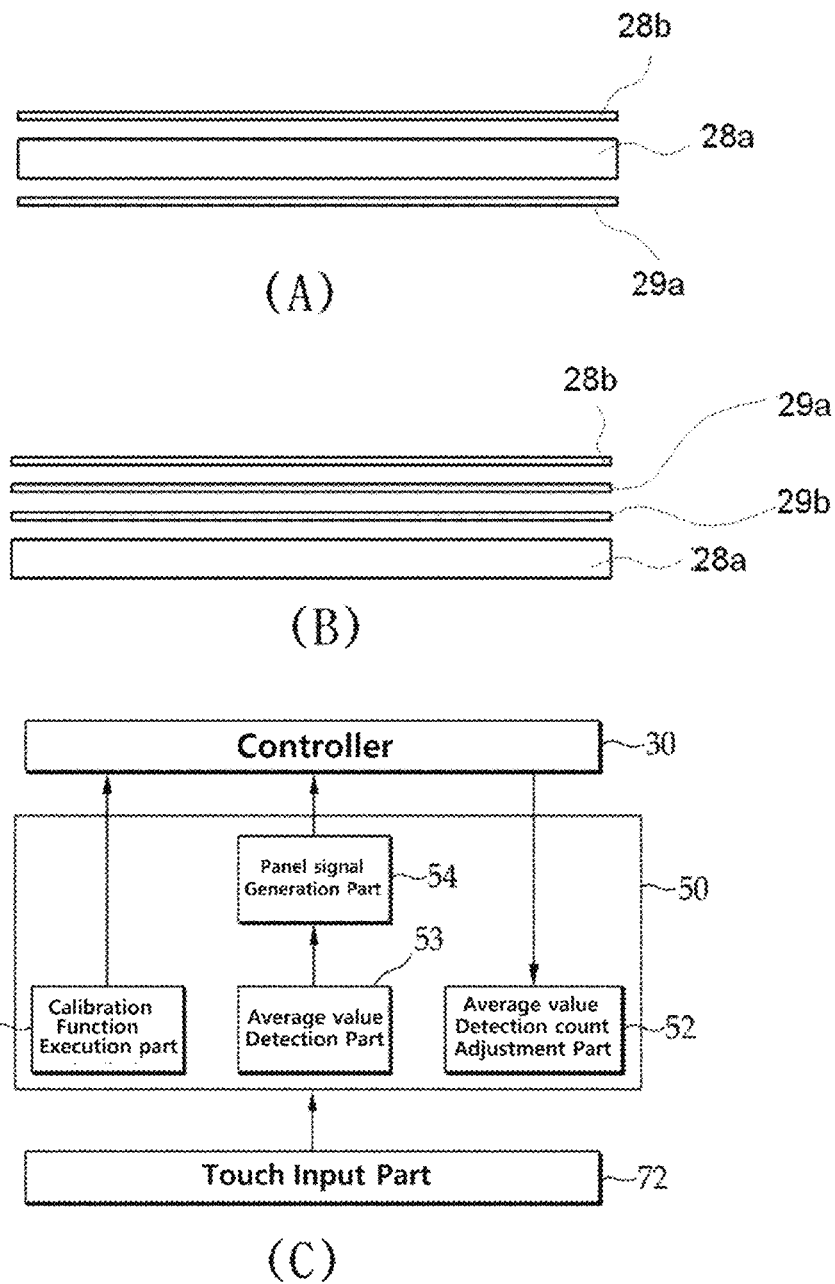
FIG. 4 is a view schematically illustrating a conventional input device and an input device driving part.

FIG. 4 is a view schematically illustrating a conventional input device and an input device driving part.

FIG. 4 is the view schematically illustrating a sectional view of the input device, wherein FIG. 4(A) is a view showing a capacitive type input device and FIG. 4(B) is a view showing a resistive film type input device.

That is, in FIG. 4(A), an electrode plate 29a coated with a transparent electrode is provided under a protective plate 28a, and the electrode plate 29a is composed of one or two sheets of films, each coated with the transparent electrode.

In addition, in FIG. 4(B), two films 29a and 29b, each coated with the transparent electrode, are provided on an upper part of the protective plate 28a so as to face each other in a state of maintaining a predetermined distance spaced apart from each other, and an external protective plate (or a decorative plate) 28b may be further provided on an upper end of the input device 28. In addition, a coating having a desired pattern is applied to the protective plate 28b.

In addition, FIG. 4 illustrates an example of the input device 28 that is conventionally and widely used, but the present disclosure is not an invention for the input device 28. Therefore, any conventional input device 28 capable of inputting information on the display may be applicable to the present disclosure.

In this case, the term "on the display" means that information may also be able to be input in a state where no pressure or contact is applied to the surface of the display.

In addition, the exemplary embodiment of the present disclosure may be applied to a device in which an input device and a display are integrated with each other.

Meanwhile, as long as information may be input by distinguishing steps from each other even through an image change or motion change, such an image change or motion change may be applicable to the exemplary embodiment of the present disclosure.

FIG. 4(C) illustrates an exemplary embodiment of the input device driving part. FIG. 4(C) is a view merely illustrating an exemplary embodiment, and the present disclosure may use any type of conventional input device driving part.

A touch input driving part 50 according to the exemplary embodiment of the present disclosure includes a calibration function execution part 51, an average value detection count adjustment part 52, an average value detection part 43, a panel signal generation part 54, etc.

In addition, it may be considered that the input device driving part of the present disclosure is merely an exemplary embodiment and a conventional input device driving part is included in the configuration of the present disclosure.

The calibration function execution part 51 performs calibration on the coordinate values of the touch input part 72 when a device is initially operated. In accordance with this calibration function, panel signals corresponding to the coordinate values of an actual position that is touched on the touch input part 72 are selected. That is, the signals of the touch input part 72 corresponding to coordinate values are selected according to the resolution of a touch display 74, and the selected signals are provided to a controller 30.

Accordingly, the controller 30 stores and manages the coordinate values corresponding to the panel signals. The average value detection count adjustment part 52 adjusts an average value detection count of the panel signals output from the touch input part 72 on the basis of screen resolution information of the touch display 74, the screen resolution information being provided from the controller 30. When the screen resolution is changed to high resolution, the average value detection count is adjusted to a value greater than the value that is previously set. Conversely, when the screen resolution is changed to low resolution, the average value detection count is adjusted to a value less than the previously set value.

An average value detection part 53 detects an average value of the panel signals transmitted from the touch input part 72 on the basis of the average value detection count adjusted by the average value detection count adjustment part 52. In addition, the average value detection part 53 transmits the detected average value to the panel signal generation part 54.

The panel signal generation part 54 generates the panel signals by using the changed screen resolution, provided from the controller 30, of the touch display 74, or by using the average value of currently input panel signals and the position information, changed by a virtual scroll, of the display screen.

When a user touches a certain point with one or two fingers or with any operation means, the touch input driving part 50 configured in this way continuously detects the position information of the touched point a predetermined number of times, and then outputs the average value of the detected values as the final position information.

Figure 5:
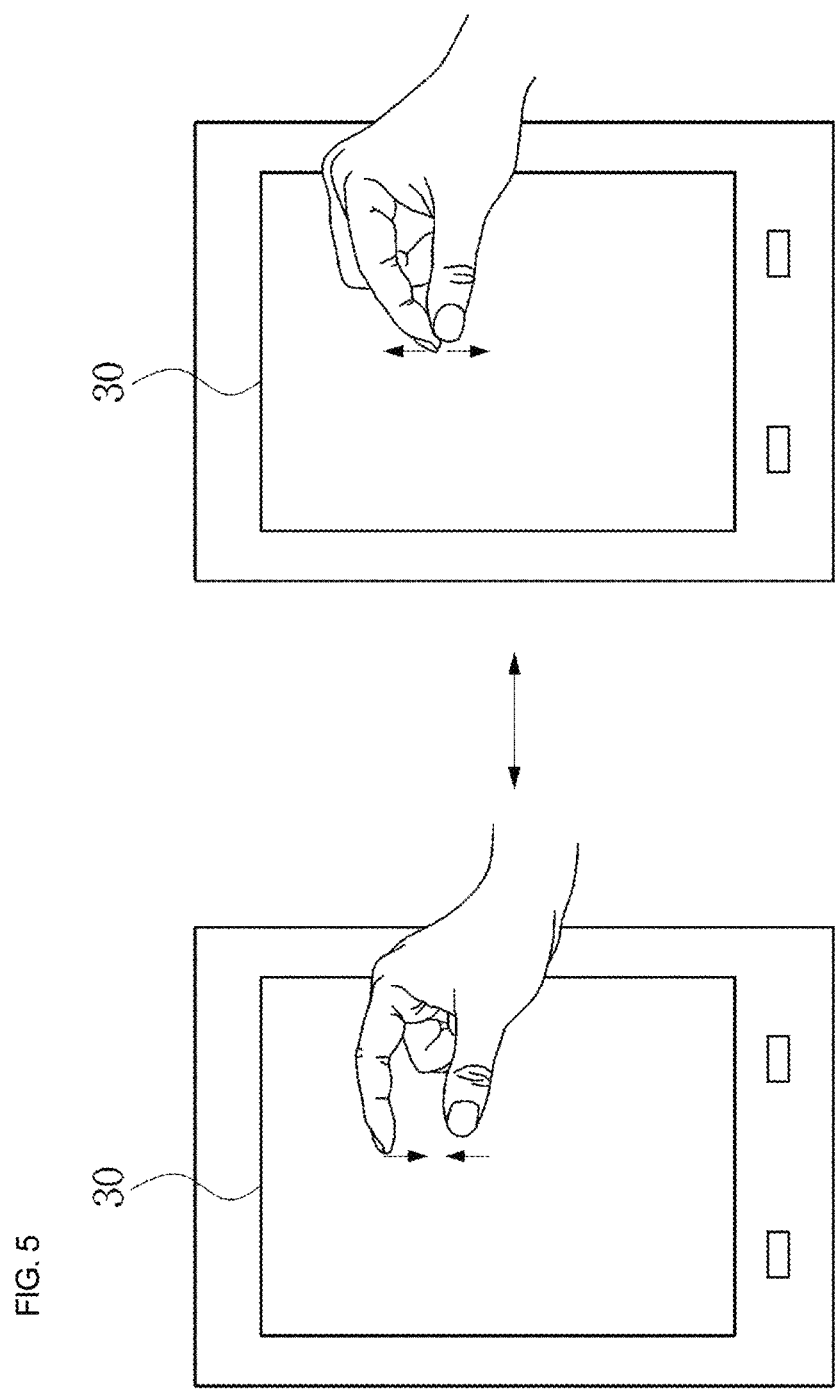
FIG. 5 is a view illustrating an exemplary embodiment in which a stepwise operation command is executed through the input device.

FIG. 5 is a view illustrating an exemplary embodiment in which a stepwise operation command is executed through the input device.

As shown in the exemplary embodiment of FIG. 5, the stepwise operation command is executed by using a small bar or using fingers on the display 30.

That is, the stepwise operation command is input by selecting information displayed on the display through the input device 28. As shown in FIG. 5, the stepwise operation command is executed by a method of reducing or increasing a distance between points selected by using two fingers (or bars).

Figure 6:
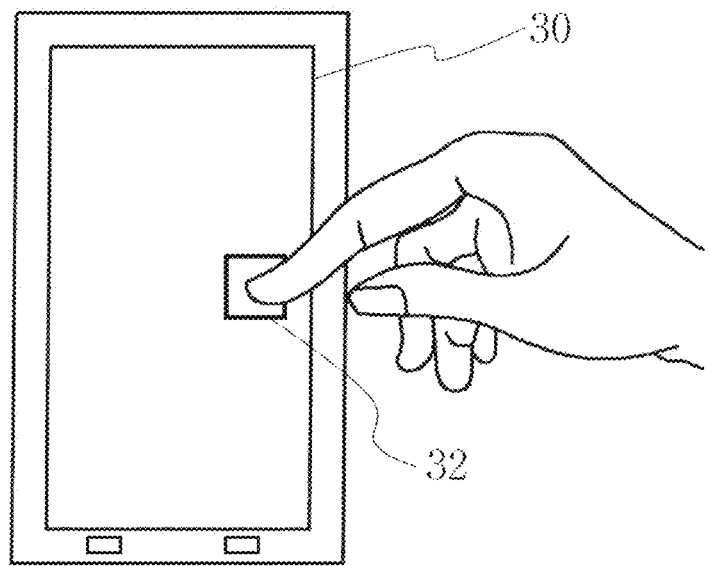
FIG. 6 is a view illustrating another exemplary embodiment of executing a stepwise operation command through the input device.

FIG. 6 is a view illustrating another exemplary embodiment of executing the stepwise operation command through the input device.

By using fingers (or bars) as in FIG. 6, an upper end of the display 30 is selected in the smartphone 110, and the length of holding time after selecting is adjusted, whereby the stepwise operation command is executed.

For example, an area within the display 30 where the stepwise operation command may be executed is referred to as a selection area 32, and the selection area 32 occupies some of the entire area of the display 30. In addition, the selection area 32 is selected by using fingers (or bars), and the length of holding time after selecting is adjusted, thereby executing the stepwise operation command.

In this case, the selection means that the fingers (or bars) are used to touch the display 30. In addition, since the input device 28 is substantially provided on the display 30, touching the display 30 means touching the input device 28. Naturally, the method of contact may not necessarily be used depending on the type of the input device.

Meanwhile, in the present disclosure, as long as a method is able to determine a step, various methods other than the methods using the movement distance and the length of holding time may be used.

That is, after tapping on the display 30 or tapping in a selection area, the step may be divided by the number of the tapping, or the step may be divided by the shapes of finger images after defining the finger images.

Exemplary Embodiment of Step Movement by Time

1) A step is determined by a value of holding time.

For example, when the holding time is maintained for 0.5 seconds, a step is moved by one step, when the holding time is maintained for one second, the step is moved by two steps, and when the holding time is maintained for 1.5 seconds, the step is moved by two steps.

2) The value of holding time becomes a boundary value of step movement.

For example, when the holding time is maintained for less than or equal to 0.5 seconds, the step is moved by one step, and when the holding time is maintained for greater than or equal to 0.5 seconds, the step is moved by two steps. When the holding time is maintained for less than or equal to one second, the step is moved by two steps, and when the holding time is maintained for greater than or equal to one second, the step is moved by three steps.

That is, when the holding time is maintained for less than or equal to a predetermined time T value, the step is moved by J steps, and when the holding time is maintained for greater than or equal to the predetermined time T value, the step is moved by J+1 steps. Alternately, when the holding time is maintained for less than or equal to a predetermined time T1 value, the step is moved by J steps, and when the holding time is maintained for greater than or equal to the predetermined time T1 value and less than or equal to a predetermined time T2 value, the step is moved by J+1 steps. (Where J is a value greater than or equal to one and less than or equal to K−1, and K is a value of the highest level).

Exemplary Embodiment of Step Movement by Pressure

A function for recognizing the intensity of pressure may be further added to the input devices 28-1 and 28-2 of the present disclosure. The input device capable of recognizing pressure follows a conventional method.

In the case of the input devices 28-1 and 28-2 to which the pressure function is added, it is possible to execute a stepwise operation command as follows.

1) A step is divided according to the intensity of pressure, such as Step 1 pressure, Step 2 pressure, Step 3 pressure, Step K pressure, or the like.

2) Within the Step 1 pressure, the step is further divided by time. That is, the step is divided by the time, such as Step 1 time, Step 2 time, Step 3 time, Step K time, or the like.

3) The number of cases in the step are as follows.

Within the Step 1 pressure, there are Step 1 time, Step 2 time, Step 3 time, or Step K time.

Within the Step 2 pressure, there are Step 1 time, Step 2 time, Step 3 time, or Step K time.

Within the Step 3 pressure, there are Step 1 time, Step 2 time, Step 3 time, or Step K time.

Within the Step K pressure, there are Step 1 time, Step 2 time, Step 3 time, or Step K time.

Figure 7:
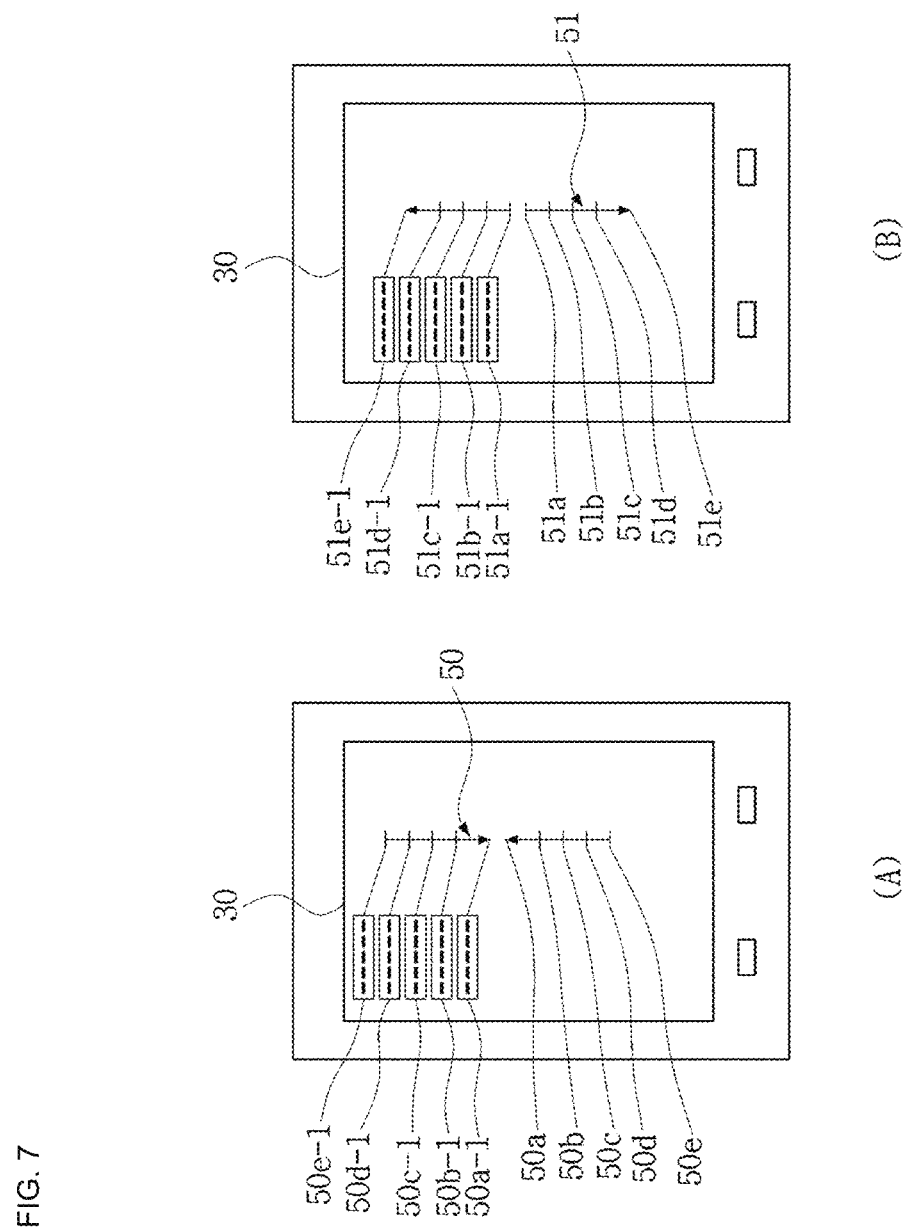
FIG. 7 is a view illustrating an exemplary embodiment for describing the stepwise operation command.

FIG. 7 is a view illustrating an exemplary embodiment for describing the stepwise operation command.

Two points are determined by using two fingers (or two bars) and a movement distance traveled by each point is classified by each step, so that the operation command that enables a command to be recognized according to each step is referred to as the "stepwise operation command". In addition, when the stepwise operation command is executed, a piece of information corresponding to each step is displayed on a screen of a display 30 of a smartphone. The step has a finite number N of at least two steps or more. Too many steps are not preferable, so 10 or five steps or fewer are appropriate.

In addition, to summarize the steps, description is as follows.

1) Steps are determined as Step 1, Step 2, Step 3, and Step N, and a distance or holding time, which are recognized as a single step, is predetermined. Alternatively, a pressure value corresponding to one step applied to a selected point is predetermined.

2) The maximum number of recognizable steps is predetermined. The maximum recognizable distance (or time, or pressure) is also predetermined.

3) A stepwise operation command has a positive (+) direction and, in some cases, has a negative (−) direction as well.

4) When the stepwise operation command is executed, an error range is present.

5) For each step, a piece of information corresponding to each step is present.

Referring to FIG. 7, guiding lines 50 and 51, which are movement paths between two points, are indicated. As shown in FIG. 7(A), the respective steps 50a, 50b, 50c, 50d, and 50e are indicated on the guiding line. (In FIG. 7(B), the steps are respectively 51a, 51b, 51c, 51d, and 51e).

Here, in the case of FIG. 7(A) in which a distance between the two selected points become closer to each other, Step 1 is 50a, Step 2 is 50b, Step 3 is 50c, Step 4 is 50d, and Step 5 is 50e.

In addition, in the case of FIG. 7(B) in which the distance between the two selected points increases, Step 1 is 51a, Step 2 is 51b, Step 3 is 51c, Step 4 is 51d, and Step 5 is 51e.

In addition, when a distance for moving one step is preset to 10 mm, in a case where a point is moved 20 mm by a stepwise operation command, two steps of movement is made. Since the whole step exists up to Step 5, the maximal movement distance becomes 50 mm.

Naturally, the distance is not necessarily the same for each step. For example, it is possible that the distance from Step 1 to Step 2 may be set to 10 mm and the distance from Step 2 to Step 3 may be set to 12 mm. The distance for each step is predetermined.

In addition, when a program is executed by determining an algorithm, the distance for each step may also be variably changed. For example, although a movement distance from Step 1 to Step 2 is 10 mm, the movement distance between the steps may be manually or automatically changed to 12 mm before the stepwise operation command is executed.

In addition, when two points selected by the input device become closer to each other, negative (minus, −) movement is made, whereas when the two points become far away from each other, positive (plus, +) movement is made. (Conversely, when the two points become closer to each other, the positive (+) movement may be determined, whereas when the two points become far away from each other, the negative (−) movement may be determined).

In addition, when a program is executed by determining an algorithm, the distance for each step may also be variably changed. For example, although a movement distance from Step 1 to Step 2 is 10 mm, the movement distance between the steps may be manually or automatically changed to 12 mm before the stepwise operation command is executed.

In addition, when two points selected by the input device become closer to each other, negative (minus, −) movement is made, whereas when the two points become far away from each other, positive (plus, +) movement is made. (Conversely, when the two points become closer to each other, the positive (+) movement may be determined, whereas when the two points become far away from each other, the negative (−) movement may be determined).

In addition, in the present disclosure, when it is desired to execute a stepwise operation command, guiding lines 50 and 51, on which scales for respective steps are indicated, may be allowed to be displayed on the screen of the display 30, as shown in the exemplary embodiment of FIG. 6.

In the present disclosure, the "guiding lines 50 and 52" is one method by which each step and a distance and direction of each step are displayed on the display screen, so as to allow the stepwise operation command to be conveniently executed. Naturally, the guiding lines 50 and 52 are not necessarily displayed on the screen.

As such guiding lines are displayed, it is possible to visually provide information about the movement distance for each step. That is, the points are respectively moved distances corresponding to the scales indicated on the guiding lines 51 and 52, thereby enabling a desired stepwise operation command to be executed.

In FIG. 7, the corresponding pieces of information for each step are "50a-1, 50b-1, 50c-1, 50d-1, and 50e-1" and "51a-1, 51b-1, 51c-1, 51d-1, and 51e-1".

That is, in FIG. 7(A), information corresponding to Step 1 "50a" is "50a-1", and in FIG. 7(B), information corresponding to Step 1 "51a" is "51a-1".

In addition, the exemplary embodiments described above in clauses 1) to 5) may be applied as it is to examples of dividing the steps by the length of holding time (or pressure) as well.

Figure 8:
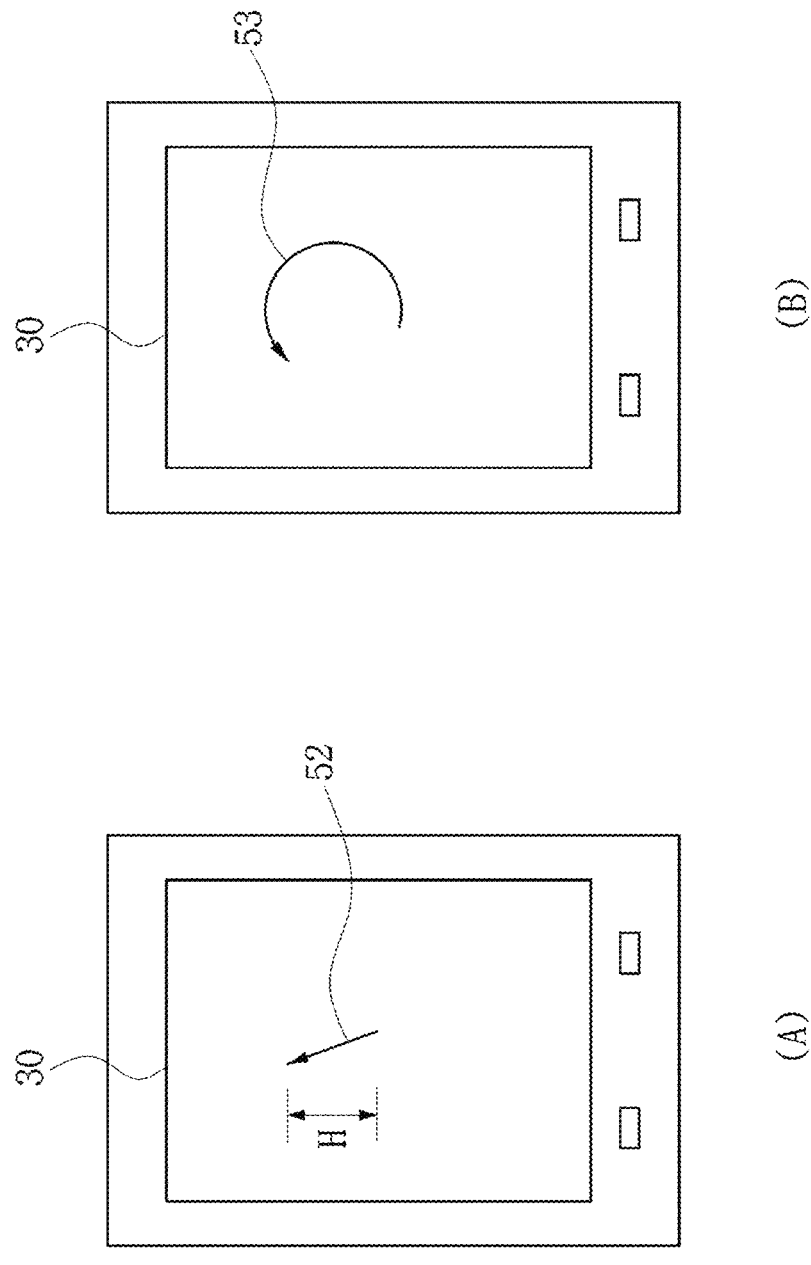
FIG. 8 is a view illustrating yet another exemplary embodiment of the stepwise operation command through the input device.

FIG. 8 is a view illustrating yet another exemplary embodiment of an operation command through the input device.

FIG. 8(A) is a view illustrating an exemplary embodiment in which one point selected by a finger or a bar through the input device is moved, and FIG. 8(B) is a view illustrating an exemplary embodiment describing an angle that is moved by a rotational motion. In addition, a command in a positive (+) step may be determined when a point moves upward or rotates counterclockwise, and a negative (−) direction may be determined opposite to the direction set to be positive (+) direction.

Meanwhile, as yet another exemplary embodiment of the present disclosure, each step may be determined by determining an upward and downward direction and a leftward and rightward direction. That is, the steps may be determined in such a way that an upward movement is Step 1, a rightward movement is Step 2, and a downward movement is Step 3. In addition, such directions may be further subdivided into several directions. That is, starting in a clockwise direction, the entire direction may also be divided into nine steps by dividing the angle of the entire direction by 40 degrees. For example, when a point is moved clockwise at an angle of 80 degrees, the point is moved by two steps, thereby becoming Step 2.

The movement of the step according to the stepwise operation command may be centered on a selection area 32 or a single point, and may be executed on the entire screen without particularly determining the selection area.

Figure 9:
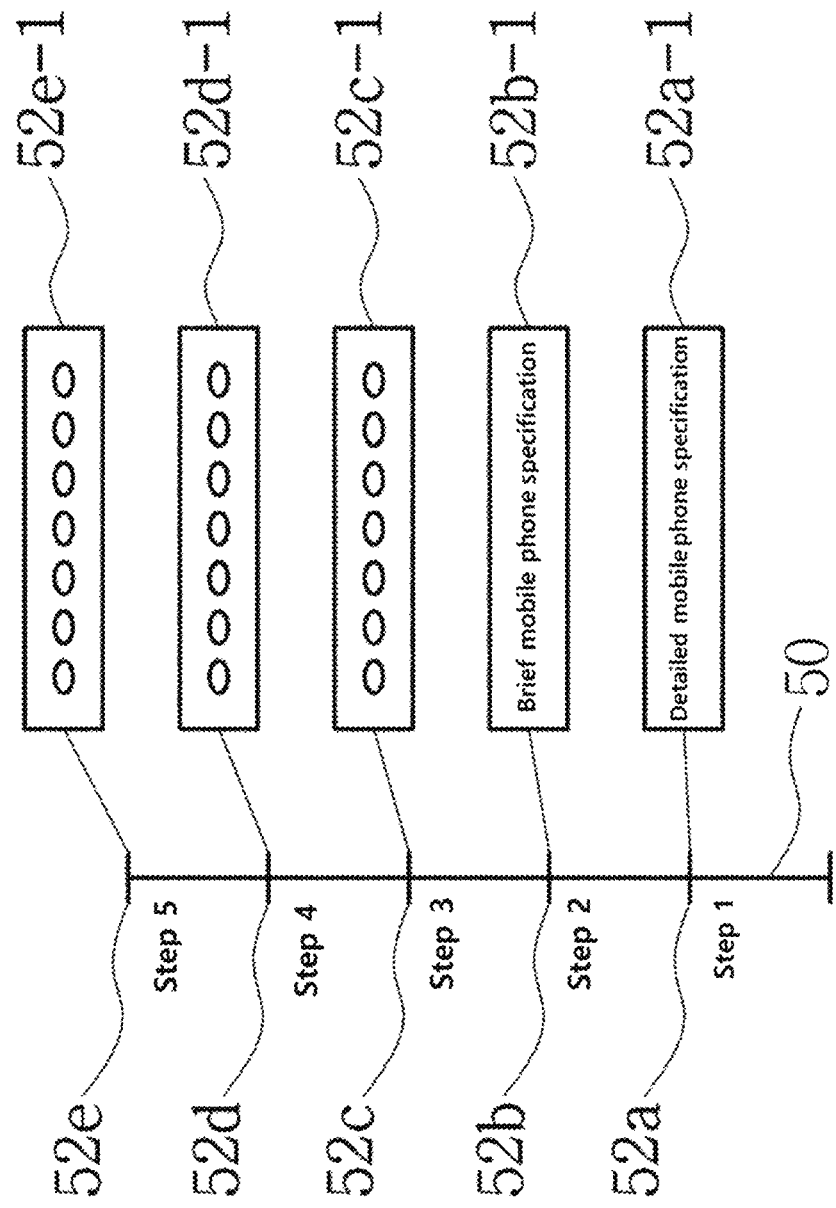
FIGS. 9 and 10 are views illustrating an exemplary embodiment in which each summary corresponding to each step is displayed in the stepwise operation command.
Figure 10:
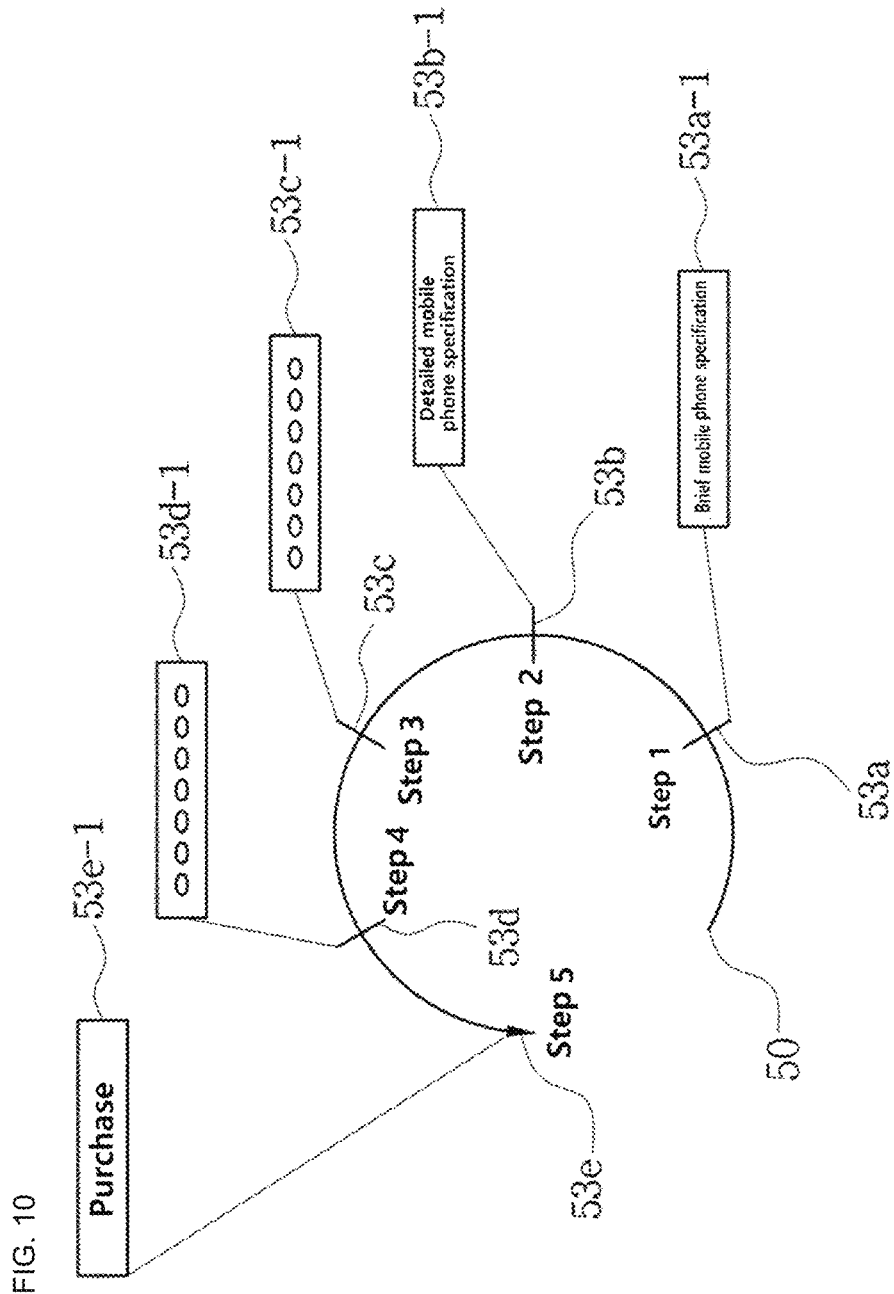

FIGS. 9 and 10 are views illustrating an exemplary embodiment in which each summary corresponding to each step is displayed in the stepwise operation command.

FIG. 9 is a view illustrating an example of a stepwise operation command in which a straight line distance is present, the straight line distance is divided into steps, and each summary content corresponding to each step is displayed.

FIG. 9 is a view illustrating that a movement distance (i.e., upward movement is positive (+) movement, and downward movement is negative (−) movement) is divided into steps, and then characteristics of information (i.e., content of information) in each step may be displayed on the screen. For example, Step 1 is "52*a*", and Step 2 is "52*b*". In addition, Step 1 summary information is "52*a*-1" and Step 2 summary information is "52*b*-1". Accordingly, on the screen of the display 30, the numerals indicating respective steps and the content of pieces of summary information corresponding to the respective steps may be displayed.

That is, in the exemplary embodiment of FIG. 9, numerals indicating steps are displayed on a guiding line 50, and pieces of summary information corresponding to the respective steps are displayed. For example, the summary information corresponding to Step 1 52*a* is "Brief mobile phone specification", and the summary information corresponding to Step 2 52*b* is "Detailed mobile phone specification". Therefore, when Step 2 is selected, information for the detailed mobile phone specification is displayed on the screen of the display.

Data about the design of a guiding line and summary information displayed on the guiding line according to the exemplary embodiment of FIG. 9 may be stored in the memory part 21 of the smartphone 110 and may also be stored in the database 104 of the server 100.

In addition, when a stepwise operation command is selected (i.e., user's selection), the central processing unit 20 of the smartphone displays information on a guiding line and summary information, which are stored in the memory part 21, on the display 30 on the basis of a selection signal of the stepwise operation command.

Meanwhile, when the selection signal for the stepwise operation command is transmitted to the server under the control of the central processing unit 20, the controller 101 of the server searches the database 104 for the guiding line information and summary information, which are stored in the database, and transmits the retrieved information to the smartphone. In addition, the central processing unit 30 of the smartphone 110 displays the received information on the display 30. In addition, FIG. 10 is a view illustrating that a moved angle may be divided into steps, and the respective steps and the characteristics of information (i.e., summary information) for the respective steps may be displayed on the screen.

That is, on the guiding line 50, steps 53*a*, 53*b*, 54*c*, 54*d*, and 54*e* are displayed and summary information 53*a*-1, 53*b*-1, 54*c*-1, 54*d*-1, and 54*e*-1 are also displayed.

—Method of Displaying Information Corresponding to Step on Display—

The execution process according to the exemplary embodiment of the stepwise operation command in the present disclosure is as follows:

1) When a point is selected (i.e., a finger or bar may be used to select the point) through the input device 28 of the smartphone, the input device driving part 27 outputs a position value (i.e., coordinates) of the selected point. In addition, when the point is moved, the input device driving part 27 outputs a movement value (i.e., coordinates) of the point. In this case, each value (i.e., coordinates) may be a number or a symbol.

2) The central processing unit 20 determines the output position and the movement value (i.e., coordinates) of the point, determines a movement step by using a designated algorithm, and determines a selected final step.

For example, when a current step is Step 2 and a point is moved in the positive (+) direction by two steps, the selected final step becomes Step 4.

3) When the selected final step is determined, the central processing unit 20 selects information corresponding to the final step from the memory part 21 (or 21*a*, 21*b*, or 21*c*), and displays the selected information on the display 30. That is, the central processing unit outputs a driving signal that enables the selected information to be displayed on the display.

In this case, the final step is transmitted to the server 100, and the controller 101 of the server may search the database 104 for the information corresponding to the final step and transmit the retrieved information to the smartphone. Then, the smartphone displays, on the screen of the display, the information that is received from the server and corresponding to the final step.

That is, when the final step is Step 3, the central processing unit 20 of the smartphone 110 displays the information stored in Step 3 on the display 30, the information being stored in the memory part 21 of the smartphone or the database 104 of the server.

In addition, the degree to which the smartphone itself is shifted or moved may also be divided into steps.

Meanwhile, the movement on an upper end of the display is allowed to be recognized by an image element, and a signal output from the image element is determined by using an algorithm, so that the degree of movement may be divided into steps. In this case, the shape of a finger, the shape of an eye, or the shape of another image may be used to divide and determine the steps.

That is, like the stepwise operation command, when the steps may be distinguished, divided, and selected, by using any input method on the smartphone, the information corresponding to the final step after executing the stepwise operation command may be displayed on the screen of the display.

—Information Stored in Database of Server and Memory Part of Smartphone—

1) Database information of the server is displayed on the display.

The smartphone 110 may be connected to the server via the wired/wireless Internet or a communication network so that a stepwise operation command may be executed. That is, when the stepwise operation command is input through the input device 28 of the smartphone 110, the input information is transferred to the server through the communication network, the server selects information corresponding to the stepwise operation command from the database to transmit the selected information to the smartphone, and the smartphone may display the received new information on the screen of the display 30.

2) Memory information of the smartphone is displayed on the display.

In addition, the information corresponding to the stepwise operation command may be displayed on the screen of the display by using the central processing unit 20 and the memory part 21 of the smartphone.

Meanwhile, at that time, the smartphone may receive the information on the steps from the server. This case may have the following order.

First, when a program capable of executing a stepwise operation command is executed, or a step capable of executing the stepwise operation command is displayed on the display, the central processing unit of the smartphone transmits, to the server, the execution of the program capable of executing the stepwise operation command.

When the program capable of executing the stepwise operation command is executed, the Step 1 information is normally displayed on the display, but depending on the termination status of the previous program, the Step 1 information is not necessarily displayed on the display.

Second, the controller of the server retrieves information corresponding to the steps from the database and transmits the information to the smartphone.

In this case, information on all steps may be transmitted from the server to the smartphone, but only information on some steps among the whole step may be transmitted from the server to the smartphone.

For example, when Steps 1 to 7 exist, the server may transmit all of the information on Steps 1 to 7 to the smartphone, but the server may transmit only some information on Steps 1 to 7 to the smartphone.

When only some steps are transmitted, the step information of adjacent steps currently displayed on the display is transmitted from the server to the smartphone.

Third, the central processing unit 20 of the smartphone stores the received information in the memory part 21.

Fourth, when the final step is determined as a result of executing the stepwise operation command, information corresponding to the final step is selected from the information that is received from the server and stored in the memory part, and then the selected information is displayed on the display.

3) Mixed use

When information on the step corresponding to a time at which the stepwise operation command is started is displayed on the display, or when the final step is determined as a result of the stepwise operation command and the corresponding information is displayed on the display, the information displayed on the display may be information stored in the memory part 21 or information stored in the database 104 of the server.

That is, the information stored in the memory part 21 may be displayed on the display 30 for the Step 1 information, and the information stored in the database 104 may be displayed on the display 30 for the Step 2 information.

In addition, it is apparent that connection to the server or execution of an algorithm in the smartphone itself may be determined at each time depending on the type of each corresponding program and information. In addition, such determination may be performed by means of a program or by the selection of a user.

Further, it is apparent that in order to display the information corresponding to the steps of the stepwise operation command on the screen of the display, pieces of information corresponding to the respective steps should be classified and stored for each step in the database of the server or the memory part of the smartphone.

Figure 11:
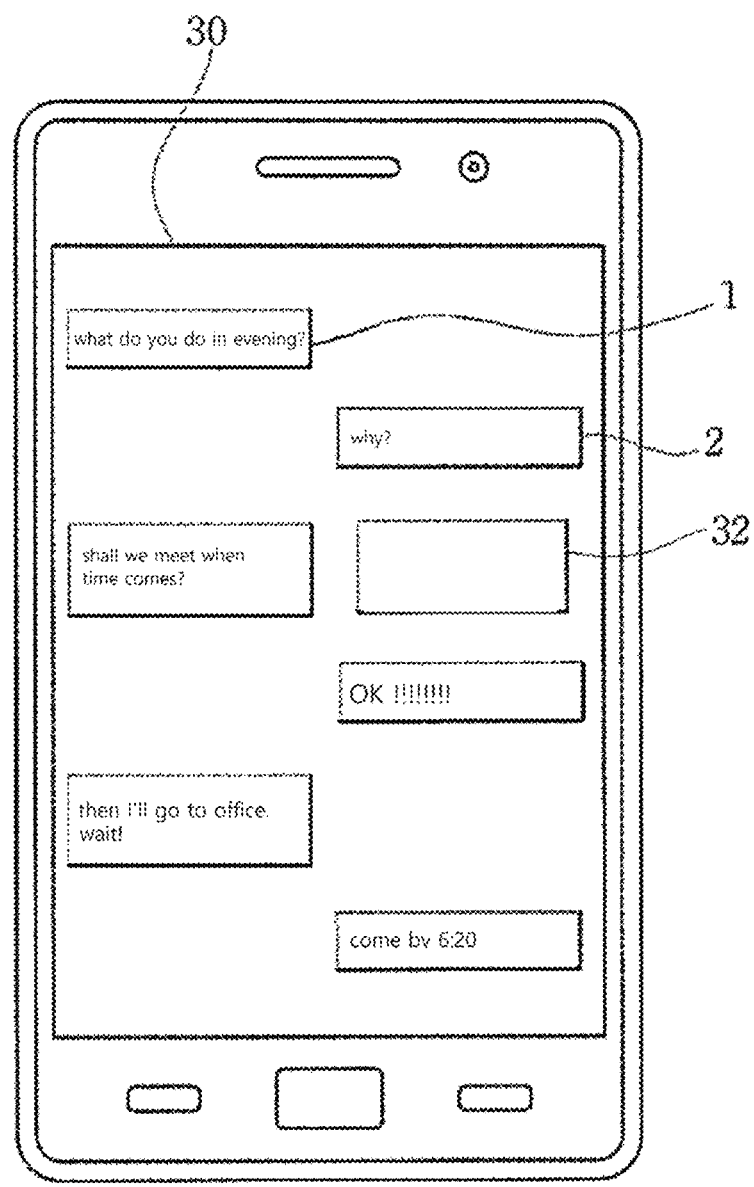
FIGS. 11 to 13 are views illustrating an exemplary embodiment in which a selection area is present in a text message service.
Figure 12:
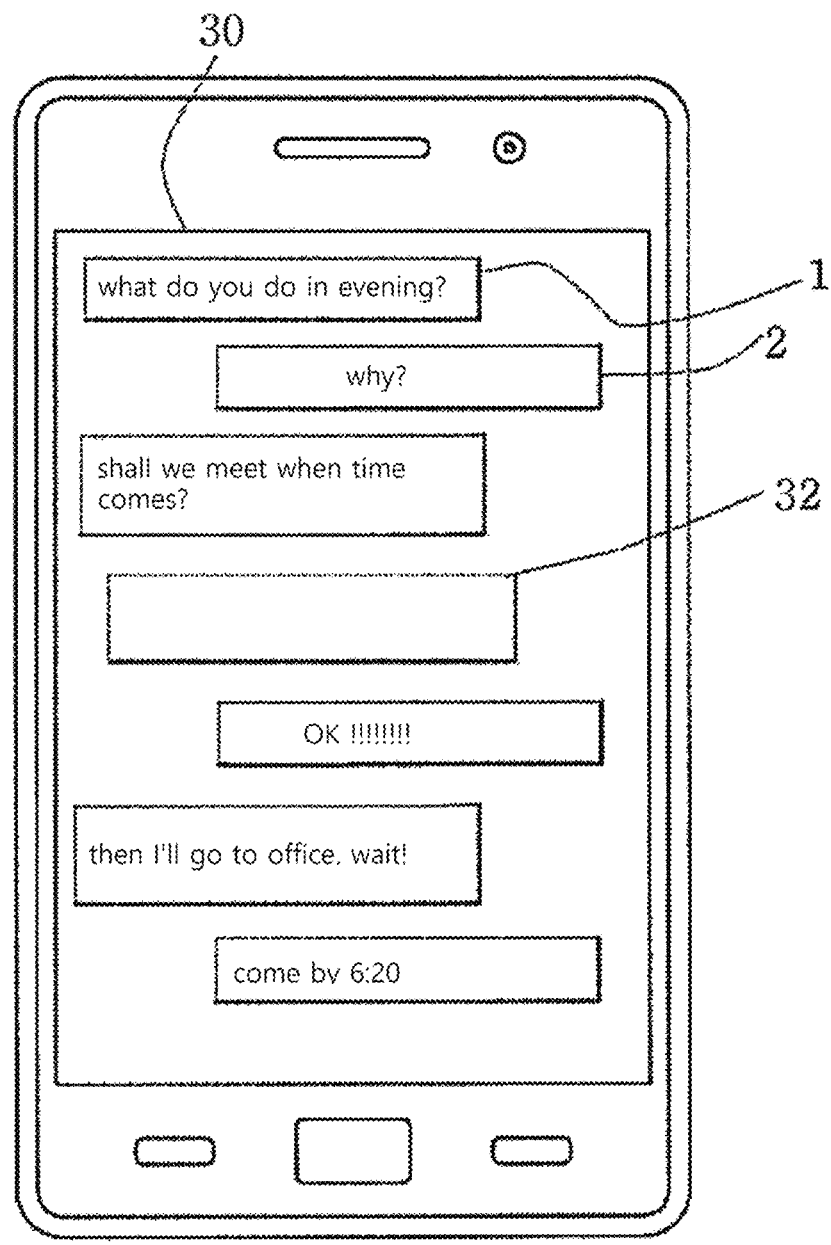
Figure 13:
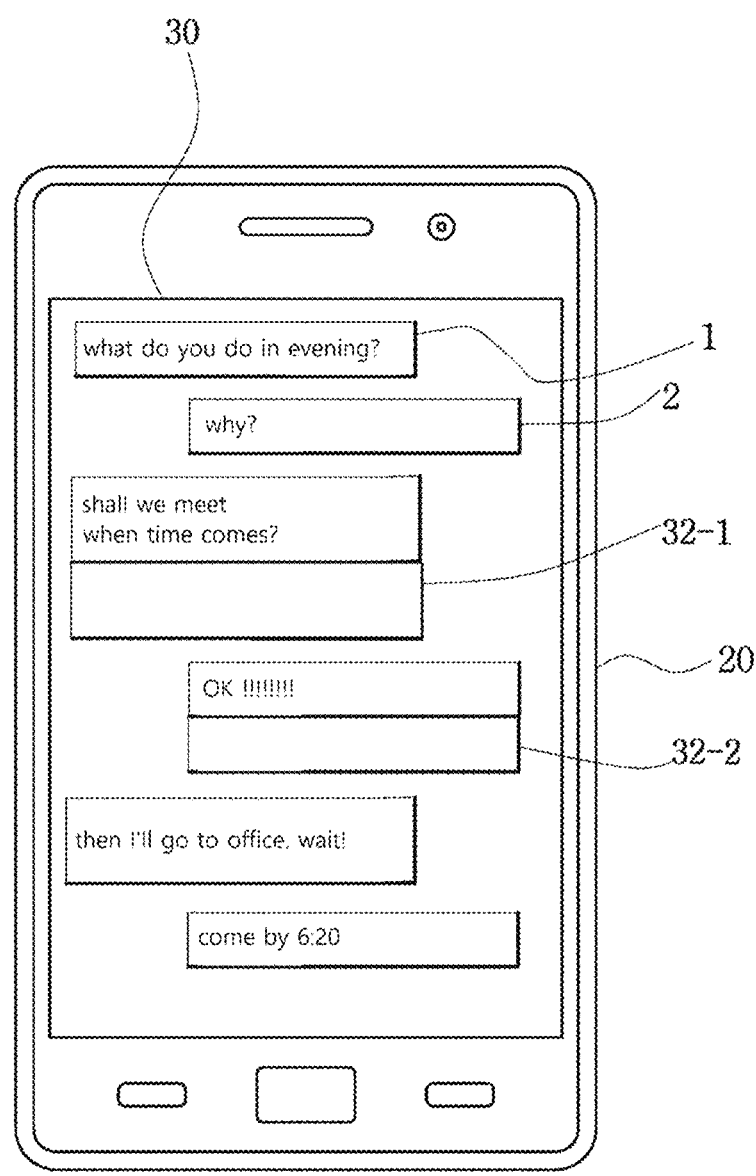

FIGS. 11 to 13 are views illustrating an exemplary embodiment in which a selection area exists in a text message service.

That is, the selection area 32 is present in a text message service, and a stepwise operation command may be executed for the selection area 32.

Referring to FIG. 11, the selection area 32 is positioned on the sides of boxes of text 1 and 2. That is, the selection area 32 is positioned on the side of the box of received text 1, or on the side of the box of transmitted text 2.

In addition, the selection area 32 is present in an area between transmitted/received text, or the selection area may be separated from the transmitted/received text as well, but the selection area 32 may also be attached to the transmitted/received text.

FIG. 12 is an exemplary embodiment in which the selection area 32 is present between the transmitted text 1 and the received text 2.

FIG. 13 is a view illustrating an exemplary embodiment in which the boxes of transmitted/received text 1 and 2 and the selection area 32 are attached to each other.

In this case, the method in which the boxes of the transmitted/received text 1 and 2 and the selection area 32 are attached to each other may vary depending on the shape or design method of the selection area 32.

As a result, FIGS. 11 to 13 illustrate the exemplary embodiment in which the selection area 32 may be present in the area generated between the transmitted/received text 1 and 2, or the transmitted text or received text and the selection area may be attached to each other.

In addition, in the display 30, two or more selection areas existing between the transmitted/received text 1 and 2 are applicable as well.

—Characteristics of Information and Selection Area Existing Between Transmitted/Received Text—

First, the types of Step 1 information while being a selection area are as follows:

1) When transmitted/received text 1 and 2 are displayed, the information displayed between the transmitted/received text is the Step 1 information.
2) A stepwise operation command may be executed for the Step 1 information displayed between the transmitted/received text.

In this case, there may exist a selection area where the stepwise operation command may be separately executed.

3) The Step 1 information is information in which a box exists and text or an image is displayed in the box.
4) The Step 1 information is information in which a box does not exist, but only text or an image is present.
5) The Step 1 information is information that exists as a video. In this case, the video may or may not exist in the box.
6) The box does not necessarily mean a rectangle. Depending on the type of information or the design, various forms such as a shape of a circle are possible.

Second, characteristics of information on Step 2 or higher are as follows:

1) The information on Step 2 or higher is information displayed on the display as a result of executing a stepwise operation command on the Step 1 information.
2) From Step 2 or higher, a selection area may or may not be the selection area in which the stepwise operation command may be executed.

In addition, when there may be provided a selection area in which the stepwise operation command may be executed, the selection area in which the stepwise operation command may be separately executed may exist 3) The information on Step 2 or higher is not necessarily displayed between the transmitted/received text 1 and 2.

The information on Step 2 or higher may be displayed between the transmitted/received text 1 and 2, but may be displayed by being overlapped with the transmitted/received text 1 and 2.

While a menu is displayed at the upper end of the display, the information on Step 2 or higher may be displayed on the entire screen of the display.

While the menu is displayed at the upper end of the display, the information on Step 2 or higher may be displayed on a partial area of the screen of the display.

4) The information is displayed as text, image, or video.

Figure 14:
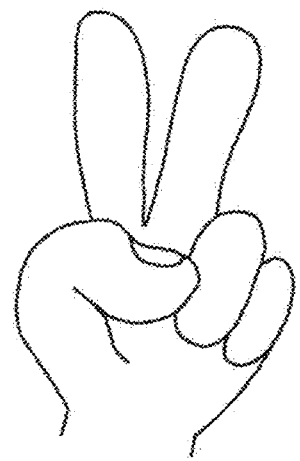
FIG. 14 is a view illustrating an exemplary embodiment of information displayed for each step.
Figure 14:
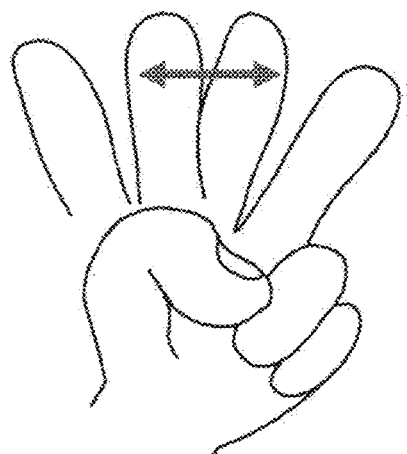
Figure 14:
Figure 14:
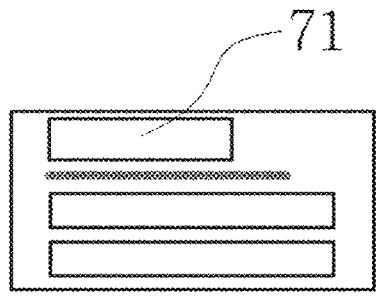
Figure 14:
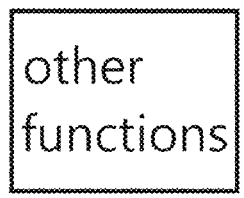
Figure 14:
Figure 14:
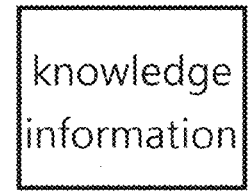

FIG. 14 is a view illustrating an exemplary embodiment of information displayed for each step.

FIG. 14(1) is a form of an image as a form of the Step 1 information. Naturally, the information is not necessarily limited to image information. The general characteristics of the Step 1 information are in accordance with the clauses described in the "Characteristics of Information and Selection Area Existing Between Transmitted/received Text" described above.

In addition, FIGS. 14(2) to 14(7) illustrate the form of information on Step 2 or higher. In addition, the form and characteristics of the information on Step 2 or higher are in accordance with the clauses described in "Characteristics of Information and Selection Area Existing Between Transmitted/received Text" described above.

In this case, FIG. 14(3) is text information on the appearance of a design shape.

In addition, in FIG. 14(4), information on steps is displayed as at least two or more table of contents 71. In addition, when one of the table of contents 71 is selected, additional information about the selected table of contents 71 may be displayed on the display.

Meanwhile, FIG. 14(5) is information that may be linked to other functions, FIG. 14(6) is information that may be linked to other programs, and FIG. 14(7) is information that may be linked to knowledge information.

In addition, when the information corresponding to the exemplary embodiment of the above example is displayed on the display 30, audio information (or voice information) may also be output together. The audio information is output through a speaker provided in the smartphone 110.

Exemplary Embodiment of Information Displayed for Each Step According to FIG. 14

Step 1: Image information is displayed on the display 30. It is possible to execute a stepwise operation command.
Step 2: The video or text information is displayed on the display 30. It may or may not be possible to execute the stepwise operation command.
Step 3: The video or text information is displayed on the display 30. It may or may not be possible to execute the stepwise operation command.
Step 4: One of items of "other functions", "other programs", or "knowledge information" is selected and displayed on the display 30. It may or may not be possible to execute the stepwise operation command.

Figure 15:
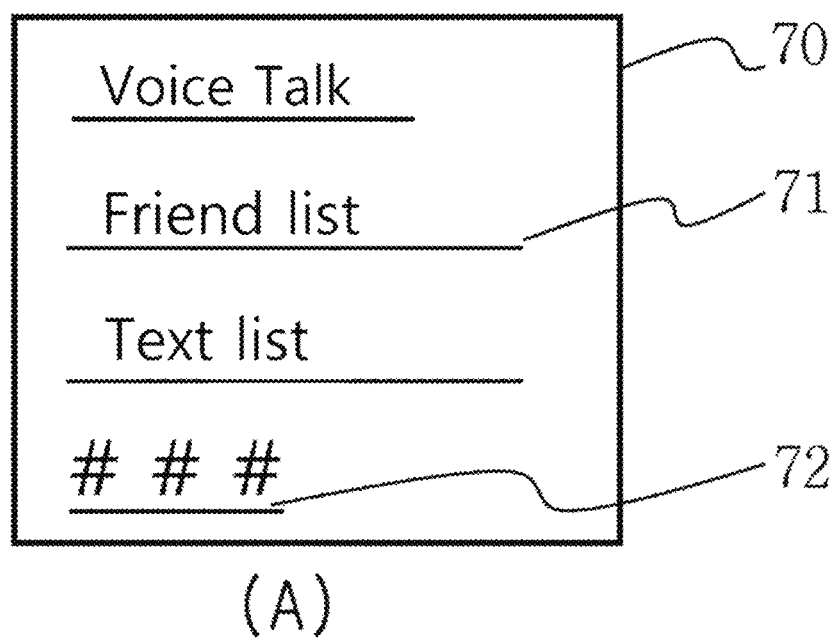
FIGS. 15 to 17 are views illustrating the exemplary embodiment of the information displayed on a display in each step.
Figure 15:
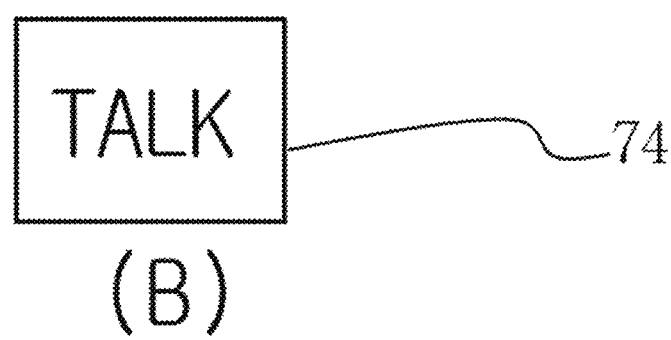
Figure 16:
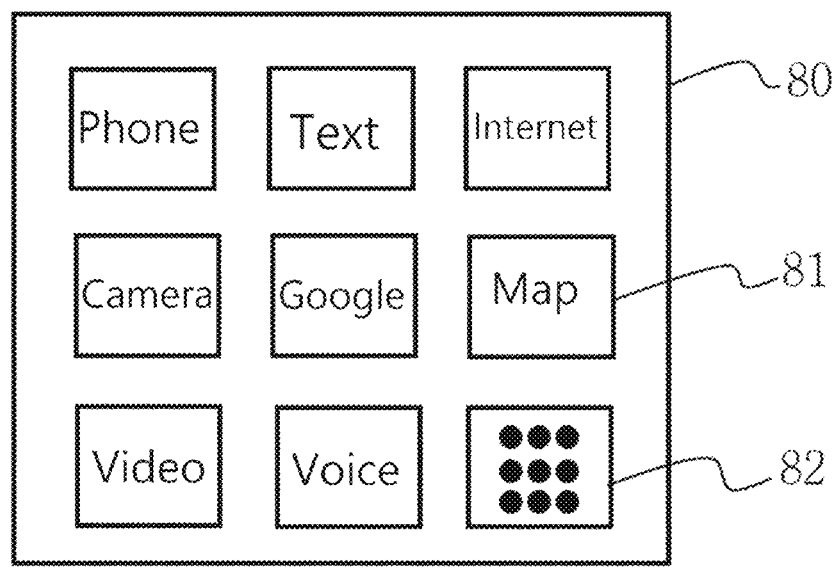
Figure 17:
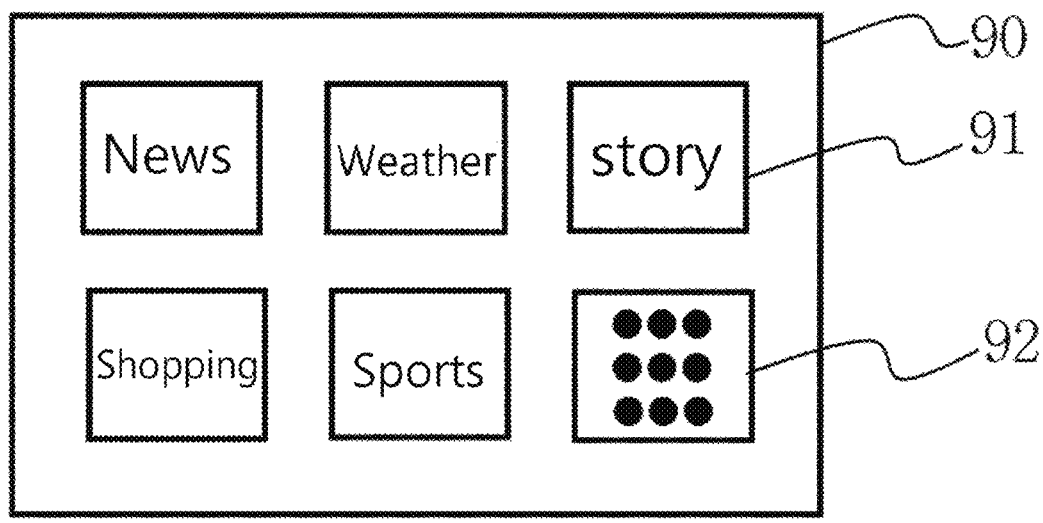

FIGS. 15 to 17 are views illustrating the exemplary embodiment of information displayed on the display in each step.

FIG. 15 is a view illustrating an exemplary embodiment in which names of other functions are displayed as a table of contents and displayed as information on arbitrary steps. In addition, when one item is selected from the table of contents of FIG. 15, the selected other functions are executed.

In this case, other functions refer to as different functions provided within the text service. In the meantime, the text service provides a phone function (i.e., Voice Talk), provides news information or shopping information, and also provides a setting function, so as to enable the text service environment to be changed. Naturally, a friend list is also provided. That is, other functions in the exemplary embodiment of FIG. 15 refer to as various functions provided within the text service.

FIG. 15(A) illustrates information 70 in which the names of other functions are displayed in the form of a table of contents. That is, the information 70 on the other functions is provided in the form of the table of contents 71. For example, when Voice Talk is selected from the table of contents of FIG. 15(A), a link is established so that Voice Talk (i.e., phone) is usable. That is, it is possible to follow a procedure for executing Voice Talk that is a function provided by the text message service.

Naturally, in the table of contents of FIG. 15(A), it is possible to follow the procedure in which when a friend list is selected, the friend list is displayed, when a text list is selected, the text list is displayed, and when text (not shown in the exemplary embodiment of FIG. 15(A)) is selected, transmission of the text is possible (in the text message service).

—Display Reflecting Priority in Table of Contents—

In this case, a priority may be determined. That is, in various functions provided by the text message service capable of executing the stepwise operation command of the present disclosure, the priority of functions among the functions frequently used by a user who uses the text message service may be determined.

For example, when the Voice talk is used the most frequently, a first priority is Voice talk, and when the friend list display is used the second most frequently, a second priority is the friend list display, and when the text list display is used the third most frequently, a third priority is the text list display.

Then, as shown in FIG. 15(A), when displayed in the form of the table of contents, the names of functions corresponding to the first, second, and third priorities described above (for example, Voice Talk, friend list, or text list, etc.) are displayed in the table of contents. Naturally, in some cases, fourth, fifth, and higher priorities may also be displayed. In addition, when one of the table of contents indicating the names of the functions is selected, the selected function is executed. For example, when a voice talk function is selected from the table of contents of FIG. 15(A), the voice talk function may be performed, and when the friend list is selected, the friend list is displayed on the display 30.

FIG. 15(B) is a view illustrating an exemplary embodiment in which only one of other functions 74 is displayed. In this case, when the one of other functions is selected, the selected function is executed. In this case, one function having a higher priority may be displayed as the one of other functions 74.

FIG. 16 is a view illustrating an exemplary embodiment in which names of other programs are displayed as a table of contents, which are information on arbitrary steps. In addition, when one item is selected from the table of contents of FIG. 16, the selected other program is executed.

In this case, the other programs mean other programs or applications provided within the smartphone 110. In the meantime, even within the smartphone 110, various programs are performed in the form of applications in addition to the programs originally provided in the smartphone 110.

For example, in addition to programs such as text messages, phone calls, text lists, and the Internet, which are originally provided in the smartphone, various programs such as games, portal sites, maps, shopping, and the like are provided through applications, and it may be seen that FIG. 16 illustrates the meaning in which these programs are displayed as the table of contents.

FIG. 16 is a view illustrating information 90 in which the names of other programs are displayed in the form of a table of contents. For example, when the phone is selected from the table of contents of FIG. 16, a link is established so as to allow a phone call to be usable. In this case, the phone function is not a voice communication function (i.e., Voice Talk) provided within the text message service (i.e., application program) according to the present disclosure, but a phone program provided by the smartphone itself through a communication service provider.

In addition, when the text is selected from the table of contents of FIG. 16, a link is established so that the text message service is usable. In this case, the text message function is not a text message service provided within the text message service (i.e., application program) of the present disclosure, but a text message delivery program provided by the smartphone itself through the communication service provider.

That is, it is possible to follow a procedure in which the program provided in the smartphone may be executed.

Naturally, when the camera is selected from the table of contents of FIG. 16, a link is established so as to execute a camera program, and when the map is selected, a link is established so as to execute a map program that is an application.

—Display Reflecting Priority in Table of Contents—

In this case, a priority may be determined. That is, in various programs (i.e., applications and programs provided by the smartphone are included, and all functions are included when not provided within the text message service of the present disclosure. In other words, the programs are provided separately from the text message service of the present disclosure) provided in a smartphone capable of executing the stepwise operation command of the present disclosure, priorities may be determined among the programs frequently used by a user who uses the programs.

For example, when a phone program of a communication service provider is the most frequently used, the first priority is the phone program of the communication service provider, and when a text message program of the communication service provider is second most frequently used, the second priority is the text message program of the communication service provider, and when an Internet program of the communication service provider is third most frequently used, the third priority is the Internet program of the communication service provider.

Then, as in the example of FIG. 16, when displayed in the form of the table of contents, the names of functions respectively corresponding to the first, second, and third priorities (e.g., phone, text message, Internet, or the like) are displayed in the table of contents.

Naturally, in some cases, fourth, fifth, and higher priorities may also be displayed. In addition, when one of the table of contents indicating the names of the functions is selected, the selected function is executed. For example, in the table of contents of FIG. 16, when the phone is selected, the phone program may be executed, and when the text message is selected, the text message program may be executed.

Meanwhile, the time of use may also be included in the priority. In other words, the frequency of use and the time of use are reflected in the priority. For example, although the frequency of use is small, when once used with a lot of time, the priority may become higher.

However, determining of how many weights should be applied to each of the frequency of use and the time of use may vary depending on an algorithm of the program.

—Recommended Table of Contents—

Items existing in the table of contents 70, 80, and 90 may be generated by a predetermined algorithm. For example, "user's search word" and "user's input word" may be analyzed to generate the items in the table of contents. In addition, the items in the table of contents may be generated by the recommendation of an operator who operates the content of the present disclosure.

That is, when there are six total items in the table of contents, four items thereof are generated by reflecting priorities by time or frequency, and the remaining two items thereof may be generated by the algorithm determined above or at the operator's recommendation.

—Number of Items in Table of Contents—

The number of items in the table of contents does not necessarily have to be plural. When there is more than one item, the embodiment of the present disclosure may be performed.

FIG. 17 is a view illustrating information of an exemplary embodiment describing knowledge information.

In the present disclosure, the knowledge information 90 is referred to as knowledge information related to news, weather, stories, shopping, sports, and the like.

In addition, the exemplary embodiment shown in FIG. 17 is also in accordance with the exemplary embodiments shown in FIGS. 15 and 16. That is, the knowledge information 90 is displayed as a table of contents 91, and when one item is selected from the table of contents 91, information corresponding to the selected table of contents 91 is displayed on the display 30.

In addition, in the knowledge information 90, a method of priority in which the tables of contents are displayed is also in accordance with the exemplary embodiments of FIGS. 15 and 16.

—Selection and Execution of Table of Contents—

The process of selection and execution of the table of contents in FIGS. 15 to 17 is as follows.

1) A selection area is selected through the input device 28 and a stepwise operation command is executed.
2) The central processing unit 20 determines a movement step determined according to the result of execution of the stepwise operation command, and determines the final step.

In this case, the final step is a step reflected by adding or subtracting the movement step from the initial step. (refer to the previous exemplary embodiment of the present disclosure)

3) The central processing unit 20 selects the information corresponding to the final step from the memory part 21, or receives the information from the server, thereby displaying the information on the display 30.

In this case, the central processing unit 20 transmits a value of the final step through the R/F part 24 and the communication network, and the controller 101 of the server selects the information corresponding to the final step from the database 104 and transmits the information to the smartphone 110.

Naturally, the central processing unit of the smartphone 110 may receive the information corresponding to each step in advance from the server and store the information in the memory part 21.

4) When the information corresponding to the final step is a table of contents, the central processing unit 20 displays the information corresponding to the final step on the display 30 in the form of the table of contents.

5) When one item is selected from the table of contents through the input device 28, the central processing unit 20 may display the knowledge information about the selected table of contents on the display 30, execute the program for the selected table of contents, or perform other functions for the selected table of contents.

In this case, the central processing unit 20 may proceed with the result for the selected table of contents through the algorithm or the information stored in the memory part 21, and may also receive the information from the server or is connected to the server, thereby processing the result for the selected table of contents.

—Group Item Representing One Item and One Group Item—

In FIGS. 15, 16, and 17, there are group items 72, 82, and 92. In addition, when the group item is selected, another table of contents is generated.

That is, in the exemplary embodiments of FIGS. 15, 16, and 17, when an item in the table of contents is selected, other functions or programs corresponding to the selected item are executed, or the knowledge information is displayed. However, when the group item 72, 82, and 92 is selected, another table of contents is displayed.

Accordingly, when the information corresponding to the step is displayed on the display 30, an item and a group item may be displayed together.

Meanwhile, the exemplary embodiments of the group items 72, 82, and 92 are as follows:

1) There are cases where the group items, such as a group item 72 marked with "#" and group items 82 and 92 marked with "•", are not indicated as words but are indicated as symbols, and when the group items 72, 82, and 92 are selected, a separate window 97 (i.e., a window displayed in the form of a box on the display) is generated and information in the form of the table of contents is displayed in the separate window.

For example, when the group item 72 marked with "#" is selected, items such as "Friend Search", "Notification", "Remittance", "Security", and "Version Information" may be displayed as the table of contents in a separate window.

2) Words may be displayed in the group items 72, 82, and 92. For example, when a word "Game" is displayed in the group item 82 representing the program, and when an item marked as "Game" is selected, game items such as "StarCraft", "Diablo", "Tetris", and the like may be displayed as the table of contents in a separate window.

That is, in a case where the words of a category concept is displayed as group items 72, 82, and 92, when the group items 72, 82, and 92 are selected, the items respectively corresponding to the words are displayed as the table of contents in the separate window.

In this case, it may be said that the concept of a hierarchical structure of words is used.

3) When the group table of contents 72 marked with "#" and the group items 82 and 92 marked with "•" are selected, a low priority table of contents may be displayed in a separate window.

For example, in the examples of FIGS. 15, 16, and 17, when items displayed in the table of contents have high priorities, the items displayed in the table of contents displayed in the separate window are items of low priorities.

Meanwhile, in FIGS. 15, 16, and 17, it has been described that the table of contents is displayed separately for other functions, other programs, and knowledge information, but as the items in the same table of contents, it is not necessary that only other functions exist, only other programs exist, or only knowledge information exist. For example, other programs, other functions, or knowledge information may exist together as respective items in the same table of contents.

Figure 18:
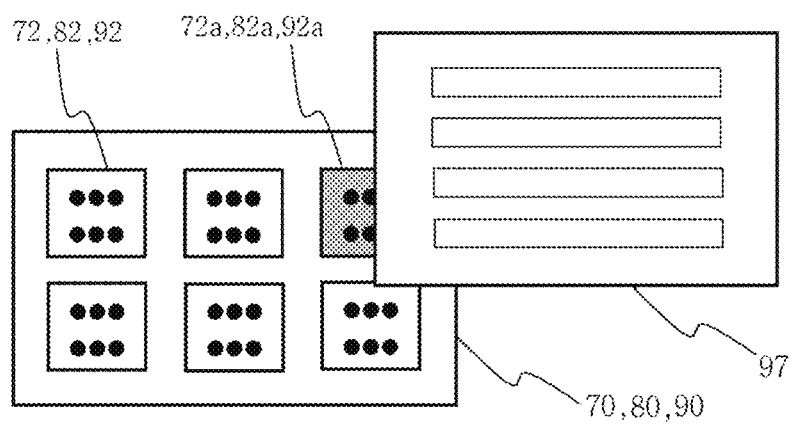
FIG. 18 is a view illustrating an exemplary embodiment in which a group item is selected.

FIG. 18 is a view illustrating an exemplary embodiment in which a group item is selected.

When there are group items 72, 82, and 92 within the table of contents 70, 80, and 90, respectively, and when one of the group items 72, 82, and 92 is selected, the selected items 72a, 82a, and 92a are displayed separately from the unselected group items 72, 82, and 92. That is, the group items are distinguished by color, thickness of a line, brightness, and the like, or are displayed to be visually distinguished by flickering.

In addition, as for additional information on the selected items 72a, 82a, and 92a, new items 97a are displayed as a table of contents in a separate window 97.

—Display of Separate Window—

1) There are items and group items in the table of contents.

The table of contents may be composed only of items, or the table of contents may be composed of only group items. In addition, both items and group items may exist in the table of contents together.

2) When any item 71, 81, or 91 in the table of contents 70, 80, and 90 is selected, information on the selected item is displayed in the separate window 97. The exemplary embodiment of FIG. 18 describes a case in which group items 72, 82, and 92 are selected in the table of contents, but the exemplary embodiment of FIG. 18 is also applied to a case where items 71, 81, and 91 are selected in the table of contents 70, 80, 90.

Meanwhile, when an item or a group item is selected, the corresponding information may be displayed in the separate window 97, but it is possible that the corresponding information is displayed on the entire screen of the display. However, even when the corresponding information is displayed on the entire screen of the display, the selection menu, control menu, and the like are displayed together. (Here, menu refers to the commonly used menu displayed at the upper end of the screen or a part of the screen).

3) The order of displaying the separate window is as follows:

One item 71, 81, and 91, or one group item 72, 82, and 92 is selected from among the table of contents 70, 80, and 90 through the input device 28.

The input device outputs the selected position value to the central processing unit, and the central processing unit determines which item 71, 81, and 91 or which group item 72, 82, and 92 is selected.

The central processing unit 20 displays information corresponding to the selected item or group item on the display.

The information corresponding to the selected item or group item may be stored in the memory part 21. Alternately, the information corresponding to the selected item or group item may be the information transmitted from a server.

When information is the information stored in the memory part, the central processing unit selects the information corresponding to the selected item or group item from the memory part and displays the selected information on the display.

When information is the information to be received from the server, the central processing unit 20 transmits the status (i.e., a specified code may be used) of the selected item or group item to the server, and the controller 101 of the server selects the information corresponding to the selected item or group item from the database 104 and transmits the selected information to the smartphone through the communication network. Then, the central processing unit 20 of the smartphone displays the information received from the server on the display.

Meanwhile, in the present disclosure, items and group items are distinguished from each other in the table of contents, and are described as examples for expression of description, but in an actual exemplary embodiment, the items and group items are not used separately.

Figure 19:
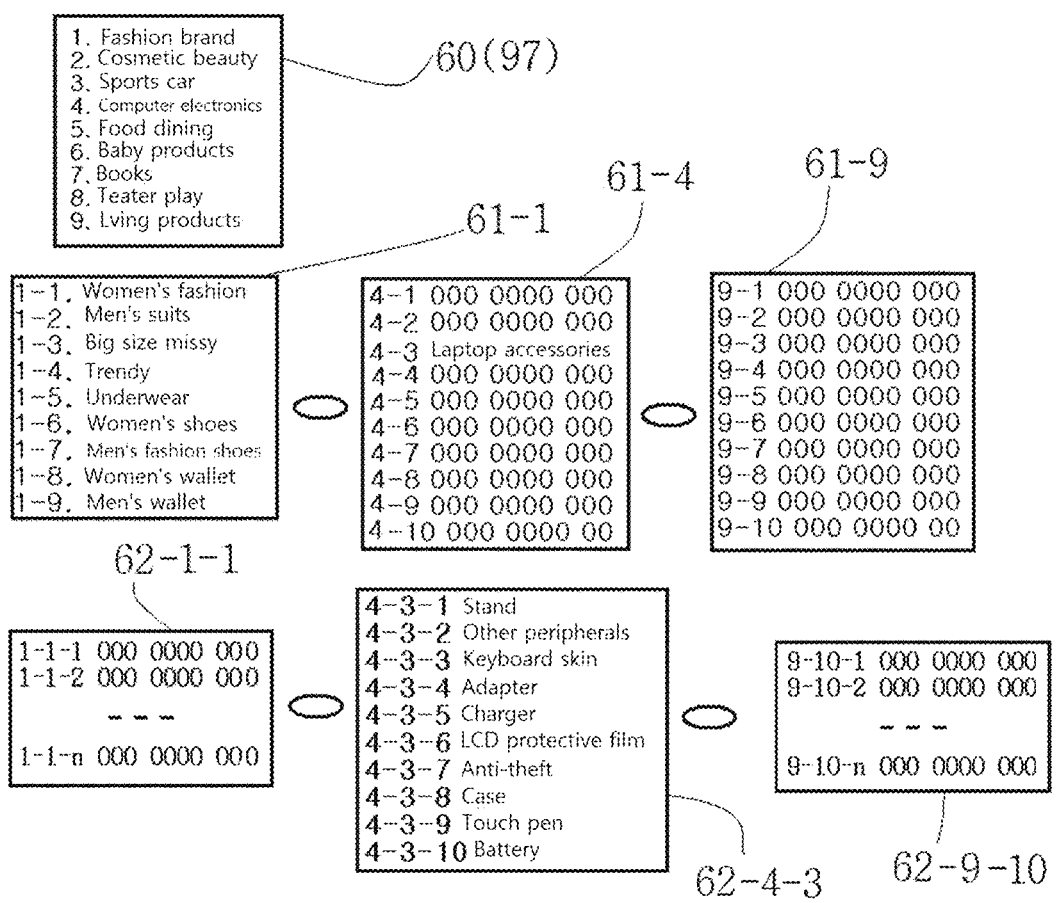
FIGS. 19 to 21 are views illustrating an exemplary embodiment for describing a concept of a hierarchical structure.
Figure 20:
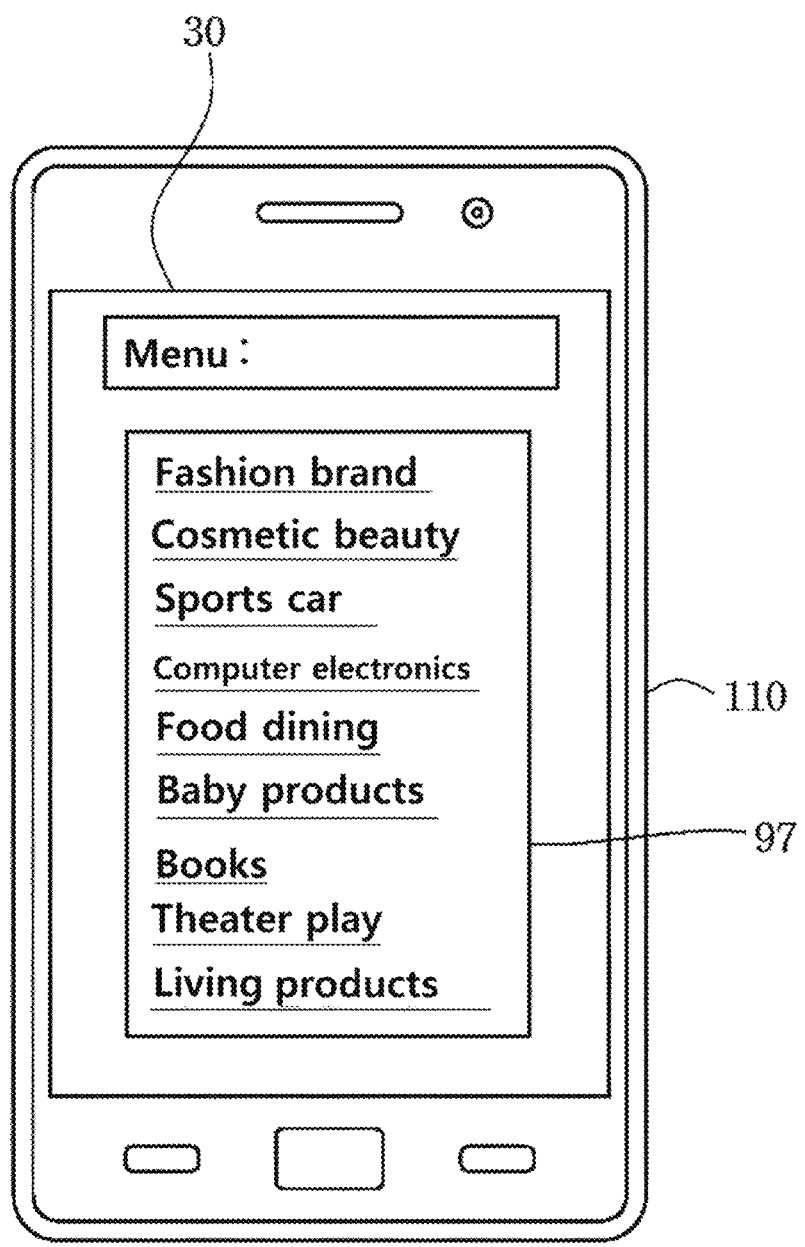
Figure 21:
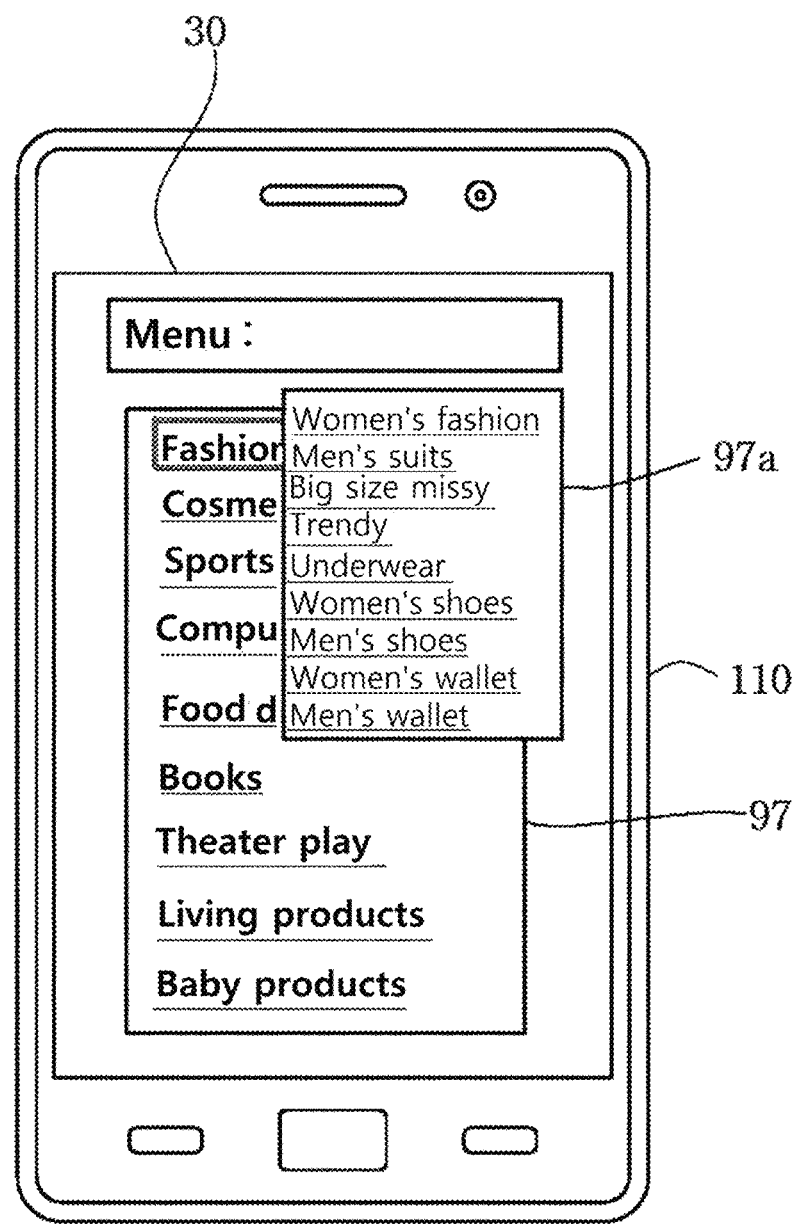

FIGS. 19 to 21 are views illustrating an exemplary embodiment for describing a concept of a hierarchical structure.

FIG. 19 is a view illustrating an exemplary embodiment of the hierarchical structure. FIG. 19 is the view illustrating the exemplary embodiment, assuming that "Shopping" is selected in the table of contents of FIG. 17. When the "Shopping" is selected in the table of contents of FIG. 17, items related to shopping are displayed in a separate window 97. In addition, in the present disclosure, for convenience of description, the table of contents that is first displayed in the separate window is referred to as a first layer.

In the first layer 60, items from No. 1 "Fashion Brand" to No. 9 "Household living products" exist. In addition, a second hierarchical structure is composed of nine tables of contents. In addition, the number of tables of contents in third hierarchical structure is present as much as the number of all items existing in the table of contents of the second hierarchy structure.

Meanwhile, in the above example, the description that the items are nine is for merely one exemplary embodiment, and it is possible that the number of items may be one or more.

That is, in the second hierarchical structure, the table of contents is a lower layer of the item "1. Fashion Brand" among the table of contents of the first layer 60. In addition, in the second hierarchical structure, the table of contents 61-9 is a lower layer of the item "9. Household living products" among the table of contents of the first layer 60.

In addition, in the third hierarchical structure, the table of contents 61-1-1 is a lower layer of the item "1-1. Women's clothing fashion" among the table of contents of the second layer 61-1. In addition, in the third hierarchical structure, the table of contents 61-9-10 is a lower layer of the item "10. 000 0000 00" among the table of contents of the second layer 61-9.

That is, when one item is selected from among the items in the table of contents of the first layer, information corresponding to the selected item appears in the table of contents, and this table of contents becomes the second layer, and other items exist in a table of contents of the second layer.

In addition, when one item is selected from among the items in the table of contents of the second layer, information corresponding to the selected item appears in the table of contents, and this table of contents becomes the third layer, and other items exist in a table of contents of the third layer. Accordingly, in this way, the fourth layer and the fifth layer may also exist.

For example, when the item "Newspaper" is selected, a new table of contents with items such as Newsweek, New York Times, and Washington Post is displayed. In addition, when the item "Internet" is selected, a new table of contents with items such as Google, Yahoo, and Naver is displayed.

In addition, when the item "Messenger" is selected, a new table of contents with items such as KakaoTalk, Telegram, Line, and WeChat is displayed, and when Telegram is selected from among the items, a link to Telegram is established.

FIG. 20 is a view illustrating an exemplary embodiment in which the first layer is displayed in a separate window 97 on the display 30. In addition, FIG. 21 is a view illustrating an exemplary embodiment in which the second layer is displayed in an additional separate window 97*a*.

Consequently, the table of contents is determined by reflecting priorities, input words, recommendations, etc., but is also determined by the concept of the hierarchical structure.

—Stepwise Operation Command—

In the present disclosure, there are steps ranging from the lowest step, that is Step 1, to the highest step, that is Step K. A stepwise operation command, which is a movement method from current Step N (i.e., Step N is any one step from Step 1 to Step K) to any step, will be described. In addition, in FIGS. 5 to 10 of the present disclosure, various exemplary embodiments of the stepwise operation command have been described.

The stepwise operation command is a method capable of moving two or more steps from the current step by using the stepwise operation command. In addition, as moving from Step 1 to Step 3, there is provided a stepwise operation command that enables current step to be moved in a higher step direction (i.e., Step K direction). In addition, as moving from Step 3 to Step 1, there is provided a stepwise operation command that enables current step to be moved in a lower step direction (i.e., Step 1 direction).

In this case, when a stepwise operation command is executed by a method such as distance movement or angle movement, both movement in the higher step direction and movement in the lower step direction are possible. However, when a stepwise operation command is executed by a method of holding time (or a method of determining steps by the intensity of pressure), it is possible to move in the higher level direction, but it is not easy to move in the lower level direction. Therefore, the present disclosure is intended to present a more various stepwise operation commands.

1) Moving to a higher step executes a stepwise operation command by the method of holding time (or the method of applying pressure, but moving to a lower step performs a stepwise operation command by the method of the distance movement or angle movement.

Moving to the higher step is possible with the stepwise operation command by the method of the exemplary embodiment in FIG. 6, and moving to the lower step is possible with the stepwise operation command by the method shown in FIG. 5 or 8.

For example, when moving from Step 1 to Step 3, the stepwise operation command is executed by the method of holding time of one second, and when moving from Step 3 to Step 1, the stepwise operation command is executed by the method of movement by 2 cm or movement by 30 degrees.

2) In Step 1, it is possible to move more than two steps, but after Step 2, the stepwise operation command may not be executed.

Alternatively, only one step movement may be possible after Step 2, or one step movement in the lower step direction (i.e., Step 1 direction) may be possible after Step 2.

Naturally, when adjusting the method of the step that is moved by the stepwise operation command after Step 2, the step for movement is not limited to two steps. From Step 3 or higher, a step movement rule of the clause 2) may be applied, and from any Step N, the step movement rule of the clause 2) may be applied.

Meanwhile, in any Step N, only J-step movement may be necessarily enabled, where N is from 2 or more to K, and J is 2 or more. The J-step movement may be performed either in the higher step direction or the lower step direction.

3) Moving to the higher step executes a stepwise operation command by the method of dividing the length of holding time into steps (or the method of dividing steps by the intensity of pressure), but a stepwise operation command is possible to be executed by selecting a specific mark (i.e., operation mark 34a in FIG. 22) for the lower step.

Figure 22:
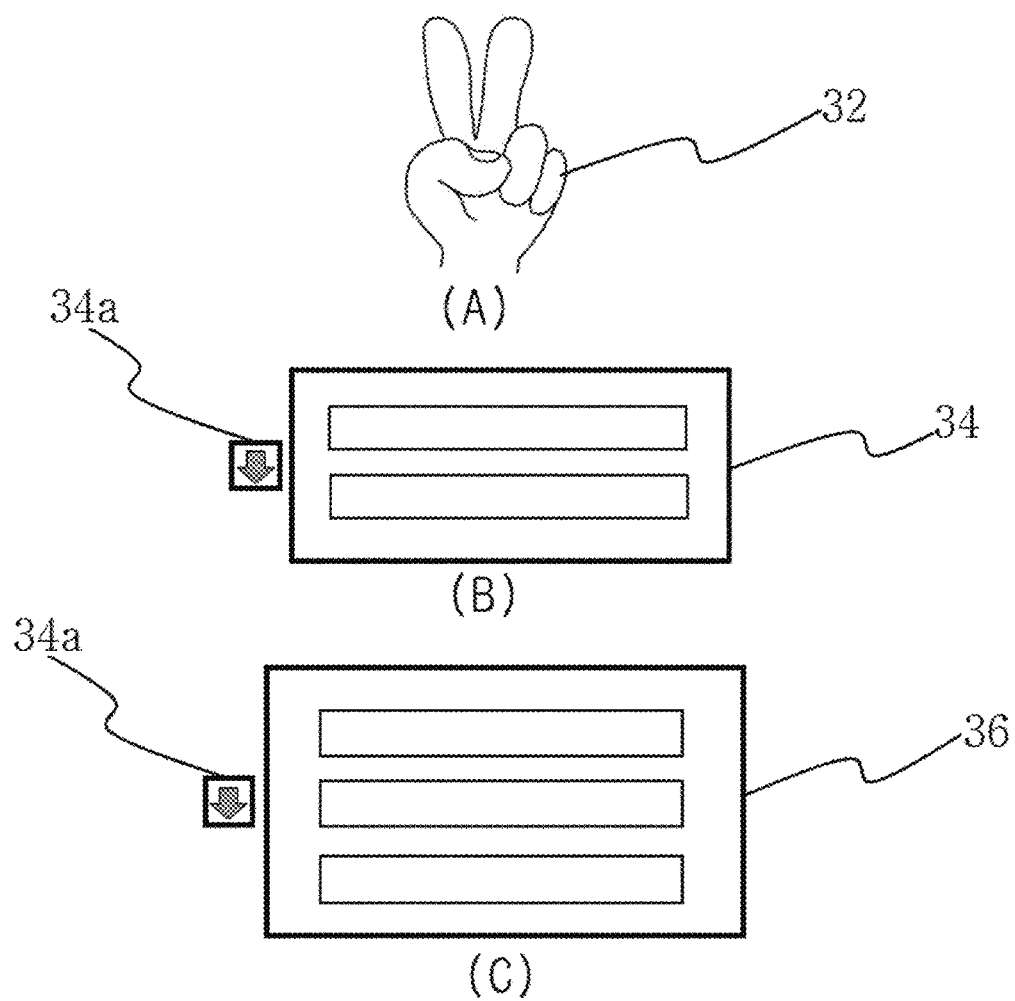
FIG. 22 is a view illustrating an exemplary embodiment describing the method of the exemplary embodiment of the clause 2.

FIG. 22 is a view illustrating an exemplary embodiment describing the method of the exemplary embodiment of the clause 2).

FIG. 22(A) is a view illustrating Step 1 in which a stepwise operation command is executable, and corresponds to the selection area 32 in the previous exemplary embodiment of the present disclosure. In FIG. 22(A), Step 1 information is shown as an image, but it may be text information, video information, or the like.

The image (in Step 1) of FIG. 22(A) is selected through the input device 28, and depending on the selected length of holding time, FIG. 22(B), which is Step 2 (reference numeral 34), may be displayed on the display 30, and FIG. 22(C), which is Step 3, may be displayed on the display 30.

However, there are difficulties in using the method of dividing the length of holding time into steps (or method of dividing the steps by the intensity of pressure), in order to move from Step 3 to Step 1 or 2, or to move from Step 2 to Step 1.

That is, in the present disclosure, a method of the stepwise operation command for moving in the lower step direction (i.e., Step 1 direction) is provided in various exemplary embodiments below.

1) When touched once, a step moves only one step in the lower step direction (i.e., Step 1 direction).
2) When an exit button conventionally used on smartphones is selected, the step moves only one step in the lower step direction (i.e., Step 1 direction).
3) When an operation mark 34a in FIG. 22 is selected, the step moves in the lower step direction (i.e., Step 1 direction).

That is, in FIG. 22, when Step 1 (reference numeral 32), Step 2 (reference numeral 34), or Step 3 (reference numeral 36) is selected and a stepwise operation command is executed, the step is moved in the higher step direction.

However, when the operation mark 34a is selected and the stepwise operation command is executed, the step is moved in the lower step direction. Moving to the lower step means moving from Step 3 to Step 1.

Here, the fad that the steps 32, 34, and 36, or the operation mark 34a is selected means that a selection area where the steps 32, 34, and 36, or the operation mark 34a is displayed is selected on the display through the input device.

Figure 23:
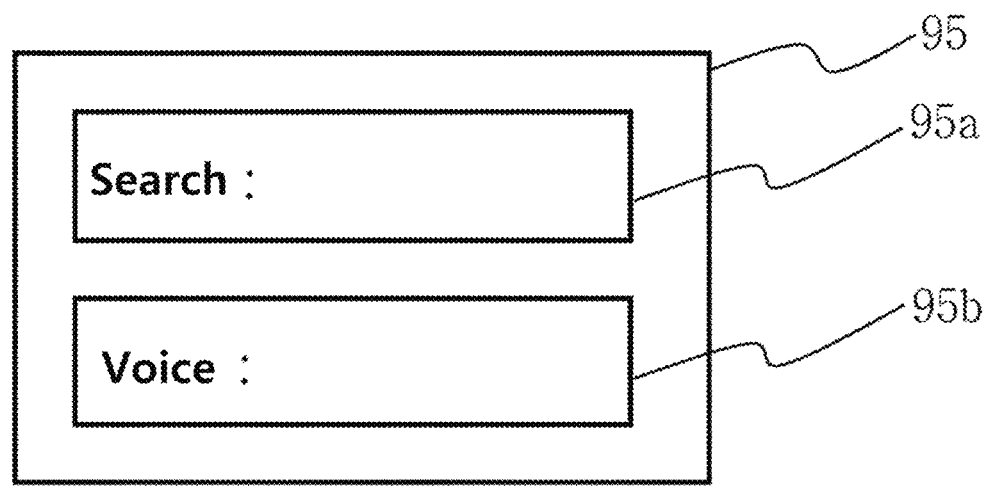
FIG. 23 is a view illustrating another exemplary embodiment of information that may be expressed as a step.

FIG. 23 is a view illustrating another exemplary embodiment of information that may be expressed as steps.

Figure 24:
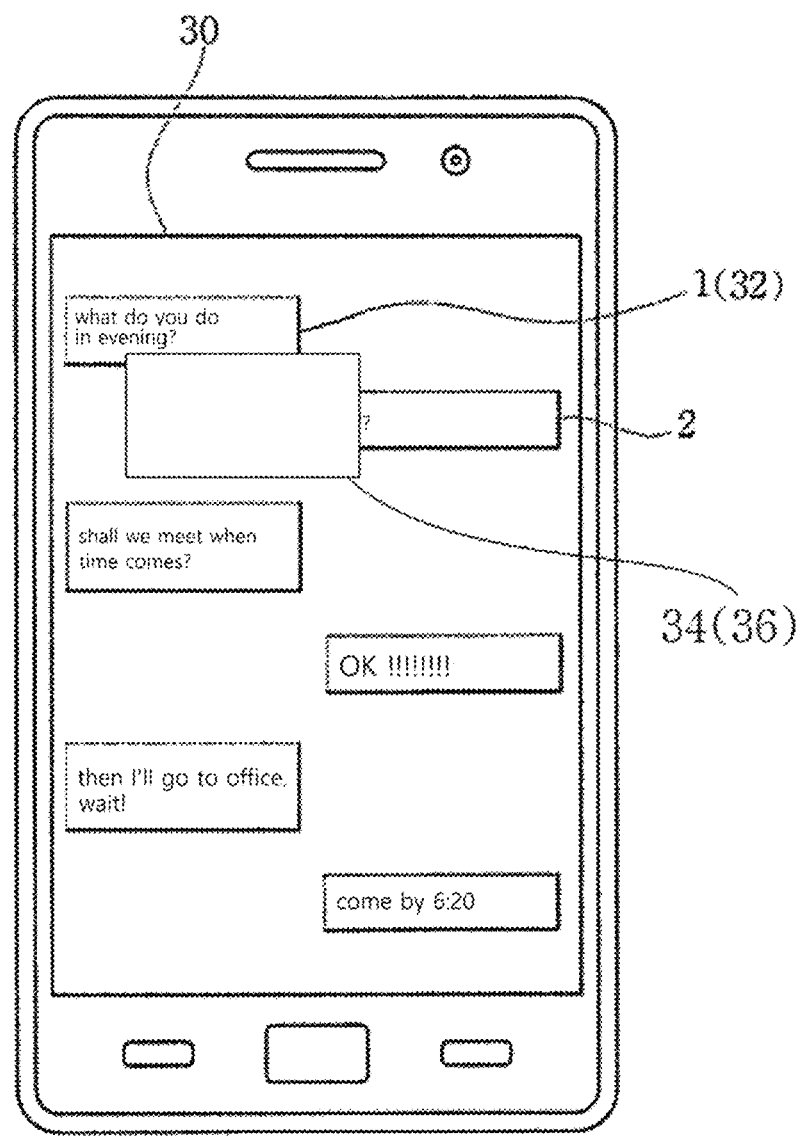
FIG. 24 is yet another exemplary embodiment of information that may be displayed as steps.

In FIGS. 14 to 18, various exemplary embodiments of information that may be displayed as steps have been described. In addition, FIG. 24 illustrates yet another exemplary embodiment of information that may be displayed as steps.

Referring to the exemplary embodiment of FIG. 23, a search window 95 is displayed on the display 30 as information corresponding to an arbitrary Step N (where N is any N from 1 or more to K or less), a word search window 95a may exist within the search window 95, and a voice search window 95a may exist. It is apparent that an image search window may additionally exist.

Meanwhile, through the search window, information may be searched for, other functions may be searched for, and other programs may be searched for.

In addition, when other functions are searched for and selected, the other functions are performed or linked. In addition, when other programs are searched for and selected, the other programs are performed or linked.

FIG. 24 is a view illustrating an exemplary embodiment in which text is a selection area.

As shown in FIG. 24, when the received text 1 and 32 are selected as selection areas, and when a stepwise operation command is executed for the received text 1 and 32, which are selected, the information corresponding to Step 2 or Step 3 (reference numeral 34 or 36) is displayed on the display 30.

In addition, according to the method for embodiment, information corresponding to Step 4, Step 5, or higher steps are also displayed on the display 30.

Meanwhile, even when the transmitted/received text 1 and 2 respectively become selection areas and each stepwise operation command is executed, the method of the exemplary embodiment of the present disclosure is applied as it is.

For example, when the transmitted/received text 1 and 2 respectively become selection areas 32 and each stepwise operation command is executed for the transmitted/received text 1 and 2, the information corresponding to Step 2, Step 3, or Step N is displayed on the display 30.

Then, a search window as the information corresponding to an arbitrary Step N may be displayed on the display 30. In addition, various searches such as keyword search, friend list search, and phone number search may be performed through the search window.

In this case, the keyword search may include: a search through the Internet network, a word search within text transmitted and received, a search for other functions, or a search for other programs within a smartphone.

Figure 25:
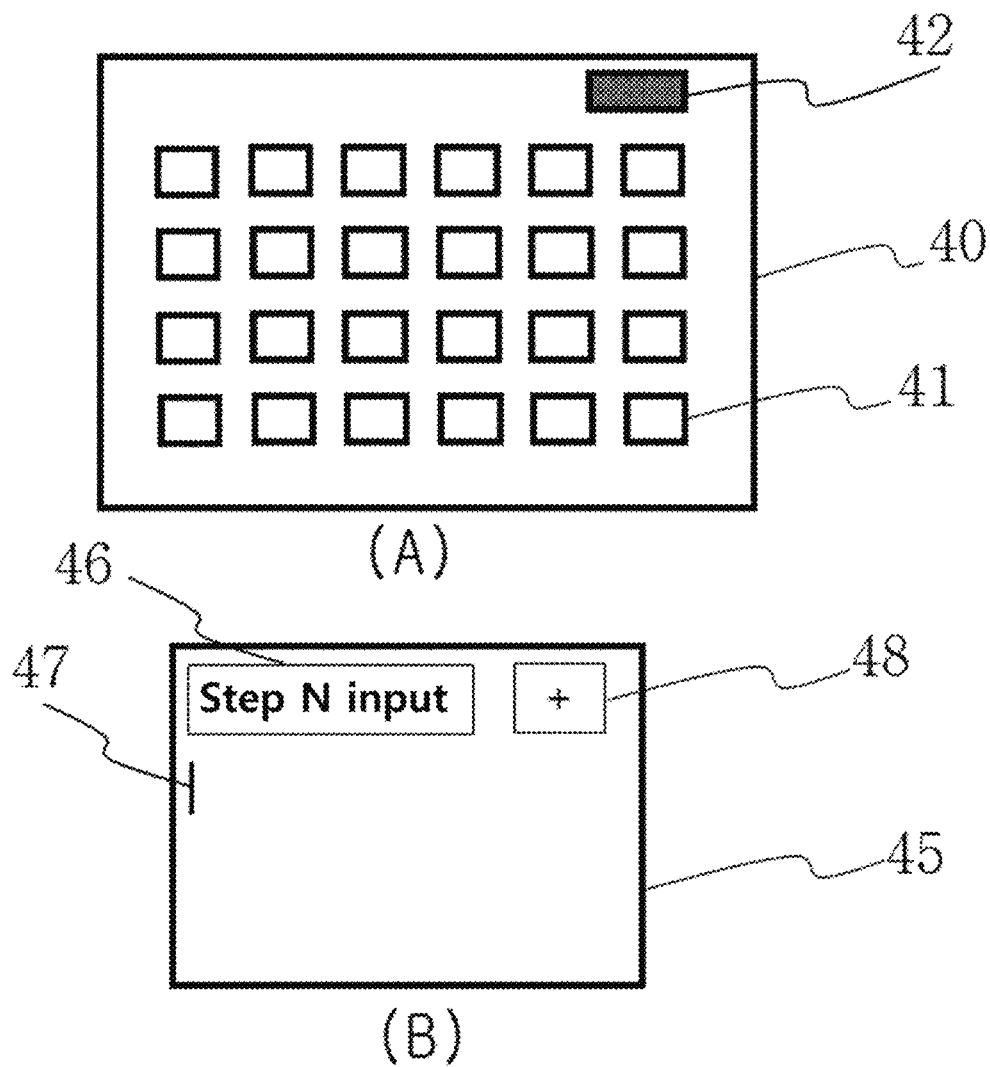
FIG. 25 is an exemplary view in which a stepwise information provision method is applied to an emoticon service used in the text service.

FIG. 25 is an exemplary diagram in which a stepwise information provision method is applied to an emoticon service used in the text service.

FIG. 25(A) is a view illustrating information provided by a service operator. That is, a selection window 40 is displayed, and selection items 41 exist in the selection window 40. In addition, one item is selected from among the selection items 41. That is, it may be said that the principle in use in the present disclosure is similar to selecting one emoticon image from among the emoticon images provided in a typical text message service.

In addition, when a step input 42 is selected in FIG. 25(A), an input window 45 is displayed as shown in FIG. 25(B). That is, FIG. 25(B) shows a new method that does not exist in the conventional emoticon service.

As shown in FIG. 25(B), the input window 45 includes: an input space 47 configured to input information, a step display 46 configured to display a step of input information, and an attachment mark 48 configured to attach other data (i.e., text, image, or video). Here, the step display 46 indicates what step information is the information currently input in the input space 47. That is, when "Step 3" is displayed on the step display 46, the information input to the input space 47 is Step 3 information.

In addition, although not shown in FIG. 25(B), it is natural that an input mark for inputting information and an additional step input mark for inputting an additional step may also exist.

In this case, when the input mark is selected, the information input in the input space 47 is stored. (The information may be stored in the memory part 21, and may be transmitted to the server so as to be stored in the database 104 of the server).

In addition, when the additional step input mark is selected, the information of the next step may be allowed to be input. A new input window 45 is displayed and information of the new step may be input into the input window 45. That is, when the information input to the current input window 45 is Step 3 (or Step N), the information input into the new input window 45 is Step 4 (or Step N+1).

Figure 26:
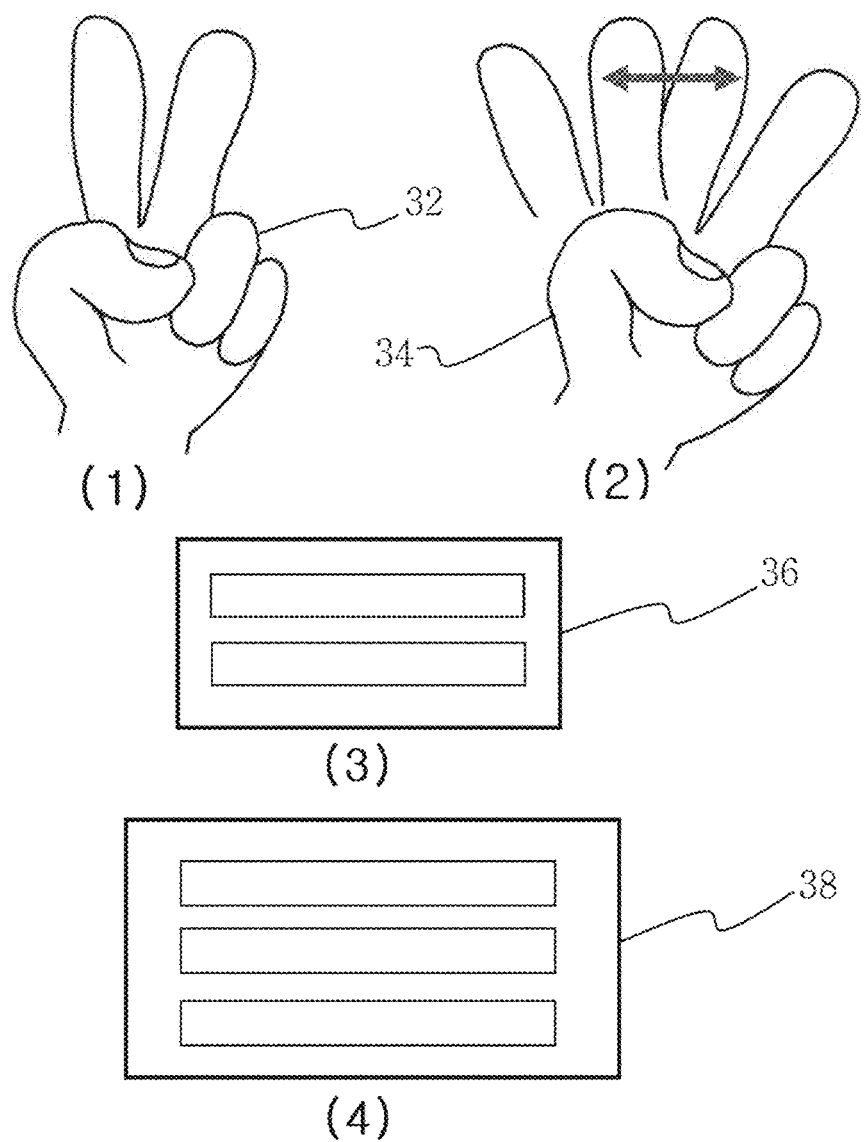
FIG. 26 is a view illustrating the exemplary embodiment of FIG. 25 and illustrates a case where the exemplary embodiment is applied to an emoticon.

FIG. 26 is a view illustrating the exemplary embodiment of FIG. 25 and illustrates a case where the exemplary embodiment is applied to an emoticon.

FIG. 26(1) is a view illustrating Step 1, which is a selection area 32 and an image, FIG. 26(2) is a view illustrating Step 2 (reference numeral 34) information as a video, FIG. 26(3) is a view illustrating Step 3 (reference numeral 36) information, and FIG. 26(4) is a view illustrating Step 4 (reference numeral 38) information. (In this case, Step 1 and 2 information is not limited to images or videos. Text data or data in which text and an image are mixed are also possible, and data in which text and a video are mixed is also possible. In addition, the same is also true for the data constituting other step information).

Figure 27:
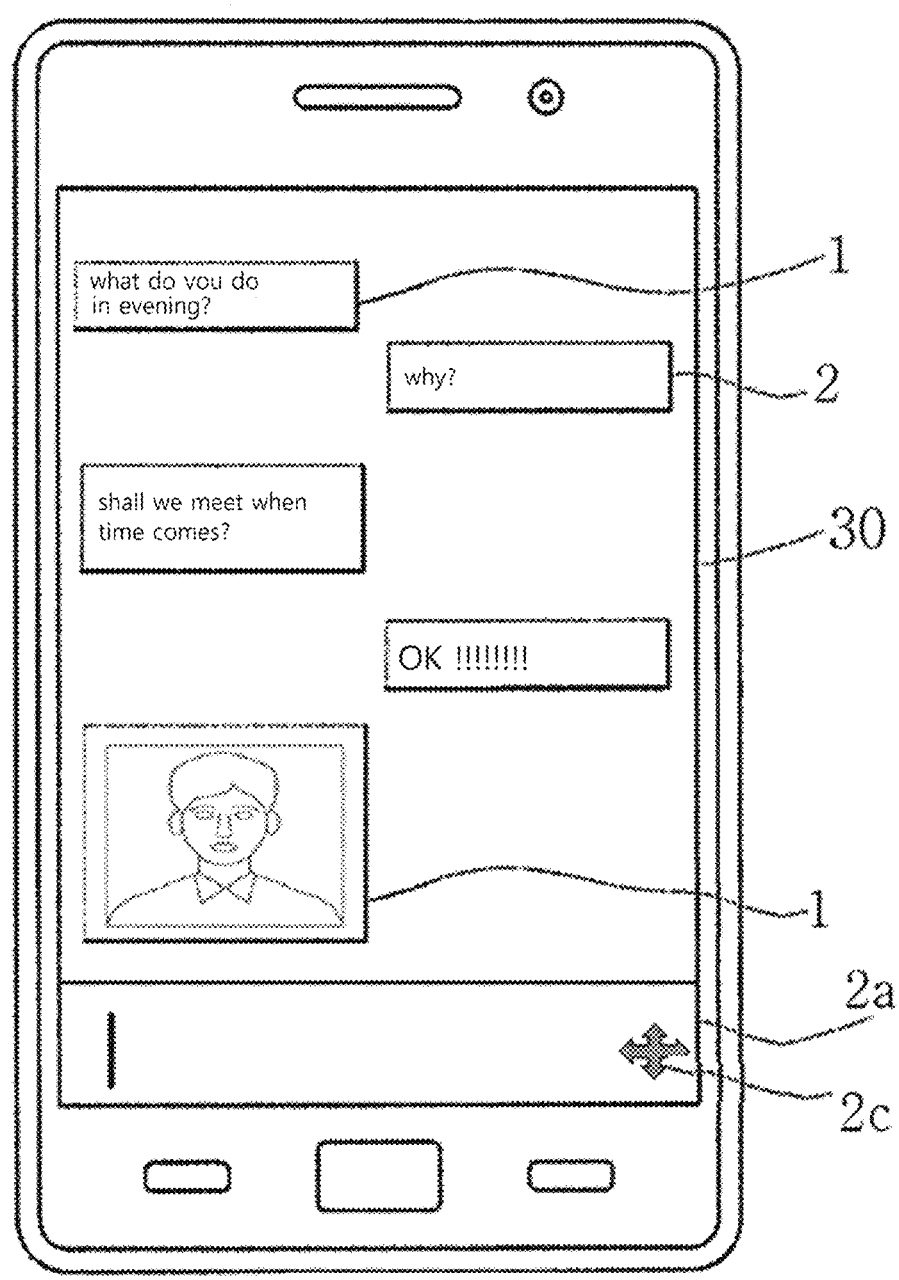
FIG. 27 is a view illustrating an exemplary embodiment in which the embodiment of the present disclosure is applied to text retransmission.

FIG. 27 is a view illustrating an exemplary embodiment in which the present disclosure is applied to text retransmission.

Conventionally, it is possible to retransmit (or forward) the received text 1. In this case, in the present disclosure, a step input function is further added. When "step input" is selected from a retransmission menu 2b of the exemplary embodiment of FIG. 27, an input window 45 for inputting information according to steps is displayed, and information about the steps is input.

In this case, the input window 45 may be displayed in a text input window 2a, which is an area where text is normally input when using a text service.

Figure 28:
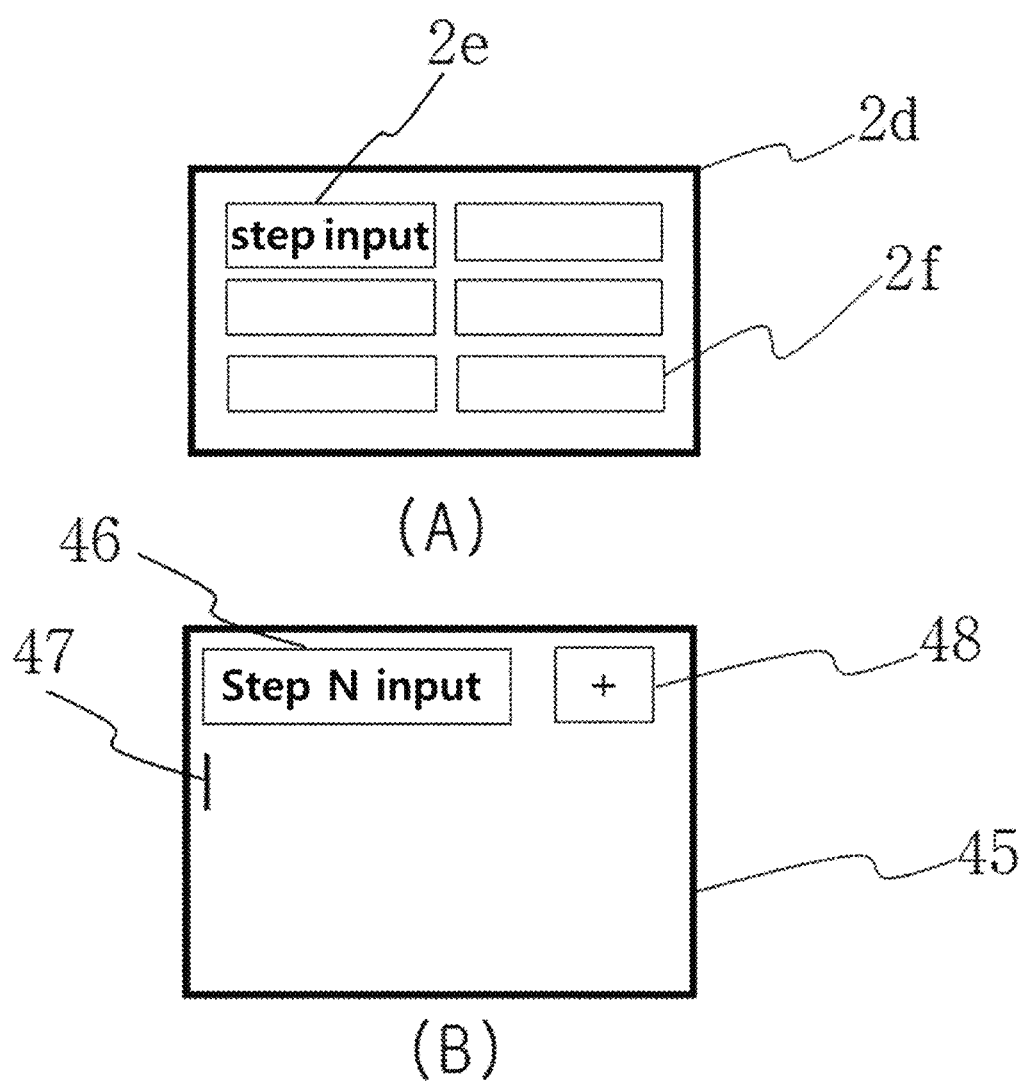
FIGS. 28 is a view illustrating an exemplary embodiment for describing a method of inputting information for each step.

FIG. 28 is a view illustrating an exemplary embodiment describing a method for inputting information for each step.

As shown in FIG. 27, an input mark 2c is present in the text input window 2a, and the input mark 2c has no significant difference in function from the input mark used in general text content. Accordingly, the input mark 2c may be selected through the input device 28.

FIG. 28 is a view illustrating an exemplary embodiment describing a method in which the input mark 2c is displayed on the display 30 when selected through the input device 28. That is, as shown in FIG. 28(A), when the input mark 2c is selected, a selection window 2d is displayed in the text input window 2a or on the display 30. In addition, in the selection window 2d, several items that are selectable are displayed as a table of contents.

In addition, a step input item 2e exists in the above various items, and other input item 2f also exist. Naturally, in FIG. 28, a description of the other input item 2f is omitted.

In this case, when the step input item 2e is selected through the input device 28, the input window 45 is displayed on the display 30 as shown in FIG. 28(B). Then, information about the step is input through the input window 45.

Meanwhile, the method of the exemplary embodiment of FIG. 25 of the present disclosure is applied to the method of inputting information through the input window 45. In the exemplary embodiment of FIG. 25, the information on some steps is simply provided by an operator, but in the exemplary embodiments of FIG. 28, all information from Step 1 (i.e., the lowest step) to Step K (i.e., the highest step) is input through the smartphone 110. That is, a user who uses the present disclosure inputs all information from Step 1 (i.e., the lowest step) to Step K (i.e., the highest step).

In addition, when all information on the steps is input, the input information is transmitted to the server or stored in the memory part 21.

Meanwhile, being transmitted to the server may mean that the information of the input step is transmitted as text to the other smartphone that is connected, via the text service, to the smartphone of the present disclosure. Naturally, the information may be transmitted in a method for other content service other than the text service.

Figure 29:
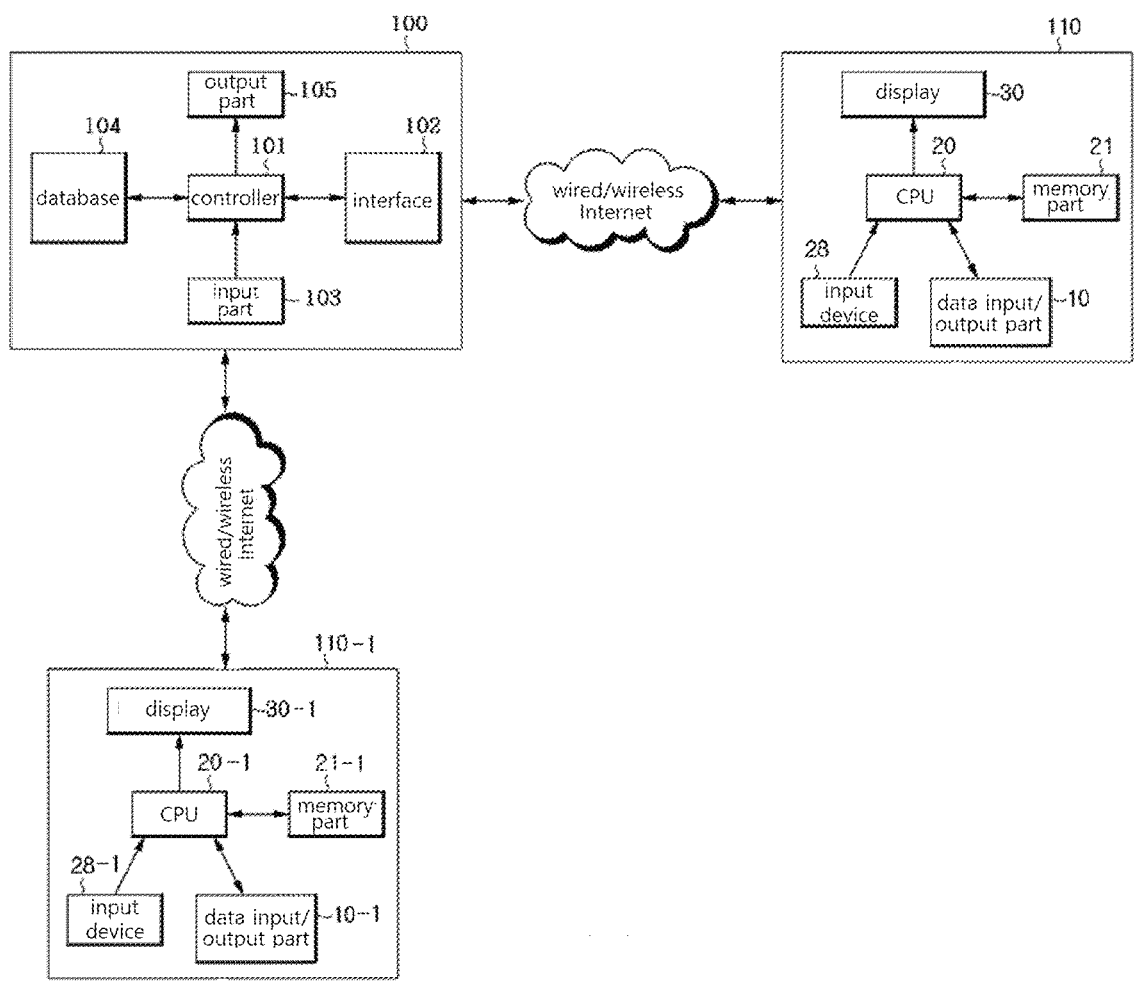
FIG. 29 is a view illustrating an exemplary embodiment for describing a block diagram when the other smartphone capable of inputting steps is connected to the server.

FIG. 29 is a view illustrating an exemplary embodiment for describing a block diagram when the other smartphone capable of inputting steps is connected to the server.

FIG. 29 is a view illustrating the other smartphone 110-1 in which the stepwise information provision method of the present disclosure is performed. In addition, it may be seen that the step input is input from the other smartphone 110-1. In this case, the other smartphone 110-1 or portable terminal is substantially the same as or has the same characteristics as the smartphone 110 or portable terminal described in the present disclosure. Therefore, all exemplary embodiments of the present disclosure are also applied to the other smartphone 110-1.

—Sequence for Step Input—

1) The step input is selected through the input device 28-1 of the other smartphone 110-1. At this time, the other smartphones 110-1 may be two or more.
2) When the step input is selected, the central processing unit 20-1 of the other smartphone 110-1 displays the input window 45 on the display 30.
3) When step information is input through the input device 28-1, the central processing unit 20-1 of the other smartphone 110-1 transmits the step information about the input step to the server.
4) The controller of the server transmits the information on the input step to the smartphone 110 through the communication network. Meanwhile, the controller of the server may store the information on the above step in the database.
5) When the information display for the step is selected through the input device 28 in the smartphone 110 that has received the information about the step, the central processing unit 20 of the smartphone 110 displays the information about the step on the display 30.

In this case, the exemplary embodiment described in the present disclosure is applied to the method of displaying the information about the step on the display.

Figure 30:
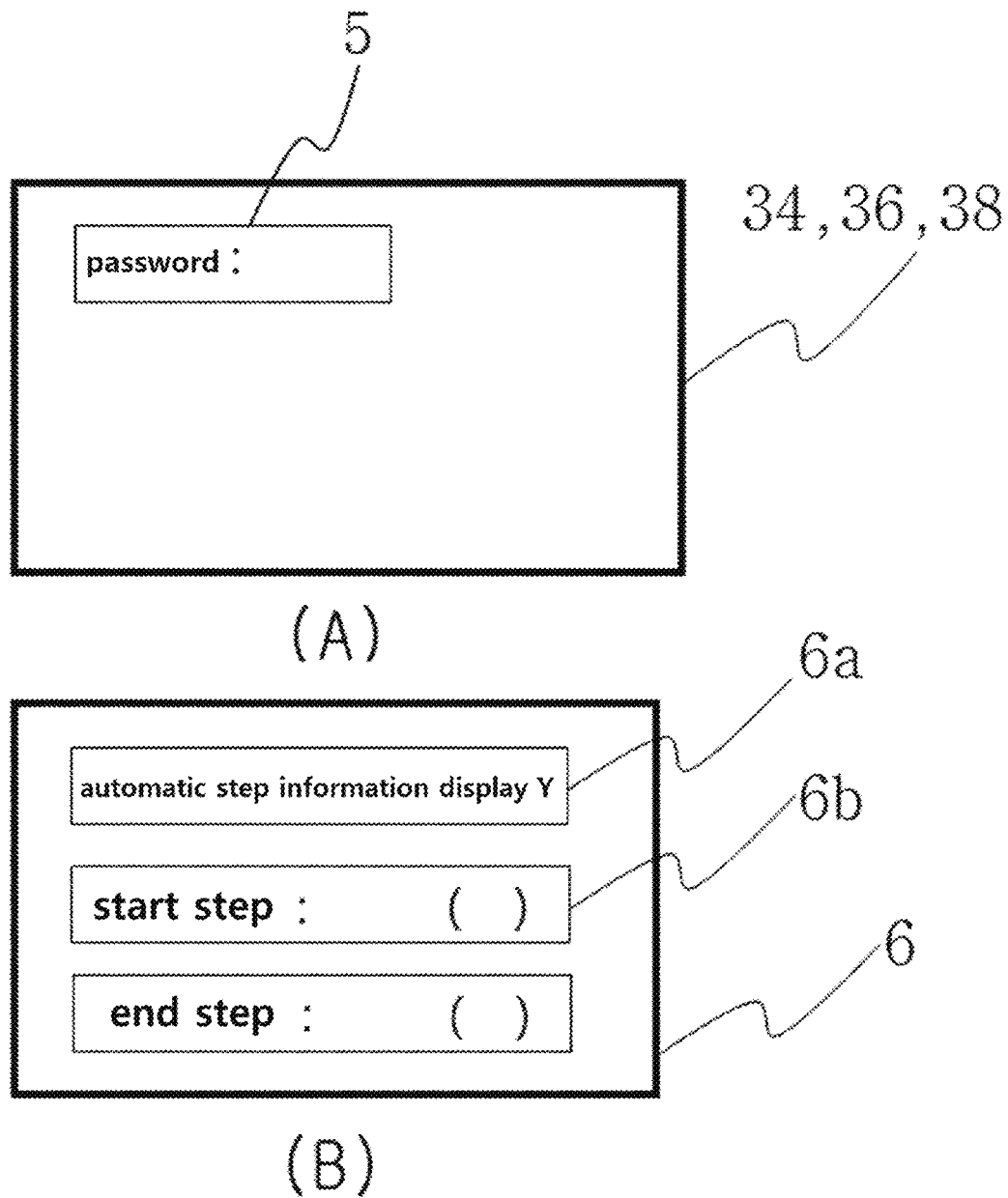
FIG. 30 is a view illustrating an exemplary embodiment for describing still another exemplary embodiment of the present disclosure.

FIG. 30 is a view illustrating an exemplary embodiment for describing still another exemplary embodiment of the present disclosure.

FIG. 30(A) is a view illustrating an exemplary embodiment in which a password input window is displayed on the display 30. For example, when a password is set for information about a certain step, only after entering the password, the information about the step is displayed on the display 30.

That is, in a case where information of Step N, which is any one step in a range from Step 2, Step 3, and Step 4 (reference numerals are 34, 36, and 38) or Step 1 (i.e., the lowest step) to Step K (i.e., the highest step), is displayed on the display 30, and when a password is set in the information on Step N, the password input window 5 is displayed on the display 30 as shown in FIG. 30(A).

In addition, when the password is input in the password input window 5 and the input password matches the preset password, the central processing unit 20 or the controller 101 of the server displays the information about the step on the display 30. A conventional method is used as the method in which the controller of the server determines whether the password matches or not and displays the information on the display.

FIG. 30(B) is a view illustrating an exemplary embodiment describing a method in which step information is automatically displayed.

In the exemplary embodiment of the present disclosure, when a user inputs step information, the user may use an automatic step information display setting function. That is, when the user inputs the step information and selects the automatic step information display, an automatic setting window 6 is displayed.

In addition, automatic display may be specified or may not be specified in the automatic step information display 6a. In the automatic step information display 6a of FIG. 30(B), when "Y (yes)" is selected, the automatic display is set, and when "N (no)" is selected, the automatic display is not set.

In addition, when the automatic display is set, it is possible to designate a step that is automatically displayed on the display. For example, in a case where the entire step is from Step 1 to Step 5, when Step 1 is designated as a start step in the step setting window 6b, and when Step 4 is designated as an end step in the step setting window 6b, the step information is automatically displayed only from Step 1 to Step 4. In addition, the Step 5 information is not automatically displayed on the display, but is displayed on the display only when the stepwise operation command is executed.

In this case, the automatic displaying of the step information means that the step information is automatically displayed from Step 1 to Step 4 in sequence. In addition, when the time is designated in parentheses of the step setting window 6b, the time at which each step is displayed when the step information is sequentially and automatically displayed is designated.

Meanwhile, it is apparent that the automatic setting may be set not only by the user of the smartphone 110, but also by the server operator. In addition, it is also possible to cancel the automatic display setting. That is, when the user, who desires the step information for which the automatic display setting is designated to be displayed on the display 30, cancels the designation of the automatic display setting, the step information is not displayed automatically.

Figure 31:
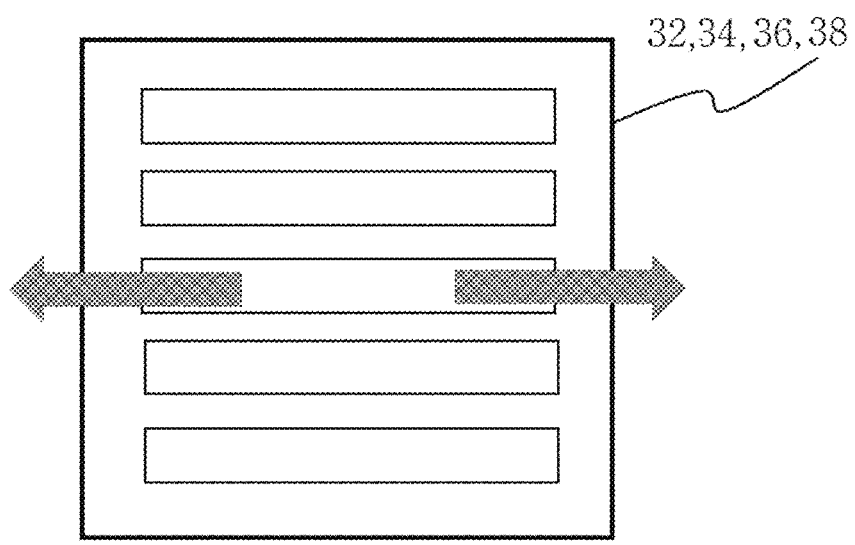
FIG. 31 is a view illustrating an exemplary embodiment in which speed is reflected to execute the stepwise operation command.

FIG. 31 is a view illustrating an exemplary embodiment in which speed is reflected so as to execute the stepwise operation command.

That is, in a case where information of Step N, which is any one step in a range from Step 1, Step 2, Step 3, and Step 4 (reference numerals are 32, 34, 36, and 38) or Step 1 (the lowest step) to Step K (the highest step), is displayed on the display 30, a stepwise operation command may be executed in the direction of the arrows shown in FIG. 31.

That is, in FIG. 31, when the step information displayed on the display is selected and a selection point is moved in the direction of the left arrow, the step moves by one step in the lower direction (i.e., Step 1 direction). Then, when the step information displayed on the display is selected and the selection point is moved in the direction of the right arrow, the step moves by one step in the higher direction (i.e., Step K direction).

Meanwhile, the movement speed may be reflected. That is, when moving in the direction of the arrows, when the contact time is long (i.e., speed is slow), more steps may be moved. For example, when the time in which the selection point is moved in the direction of the arrows is 0.5 seconds or less, the step moves by one step (in the lower direction or higher direction), and when the time in which the selection point is moved in the direction of the arrows is one second, or greater than or equal to 0.5 seconds, or less than or equal to one second, the step is moved by two steps (in the lower direction or higher direction).

In this case, various exemplary embodiments (i.e., circular movement, angular movement, etc.) of the present disclosure are applied to the method by which the selected point is moved, and the exemplary embodiment of the present disclosure is also applied to the step movement according to a predetermined time or a predetermined range.

In addition, as in the exemplary embodiment of the present disclosure, even though the selection point is moved in the direction of the arrows, the step does not move further by Step 1 or less, and does not move further by Step K or more.

Figure 32:
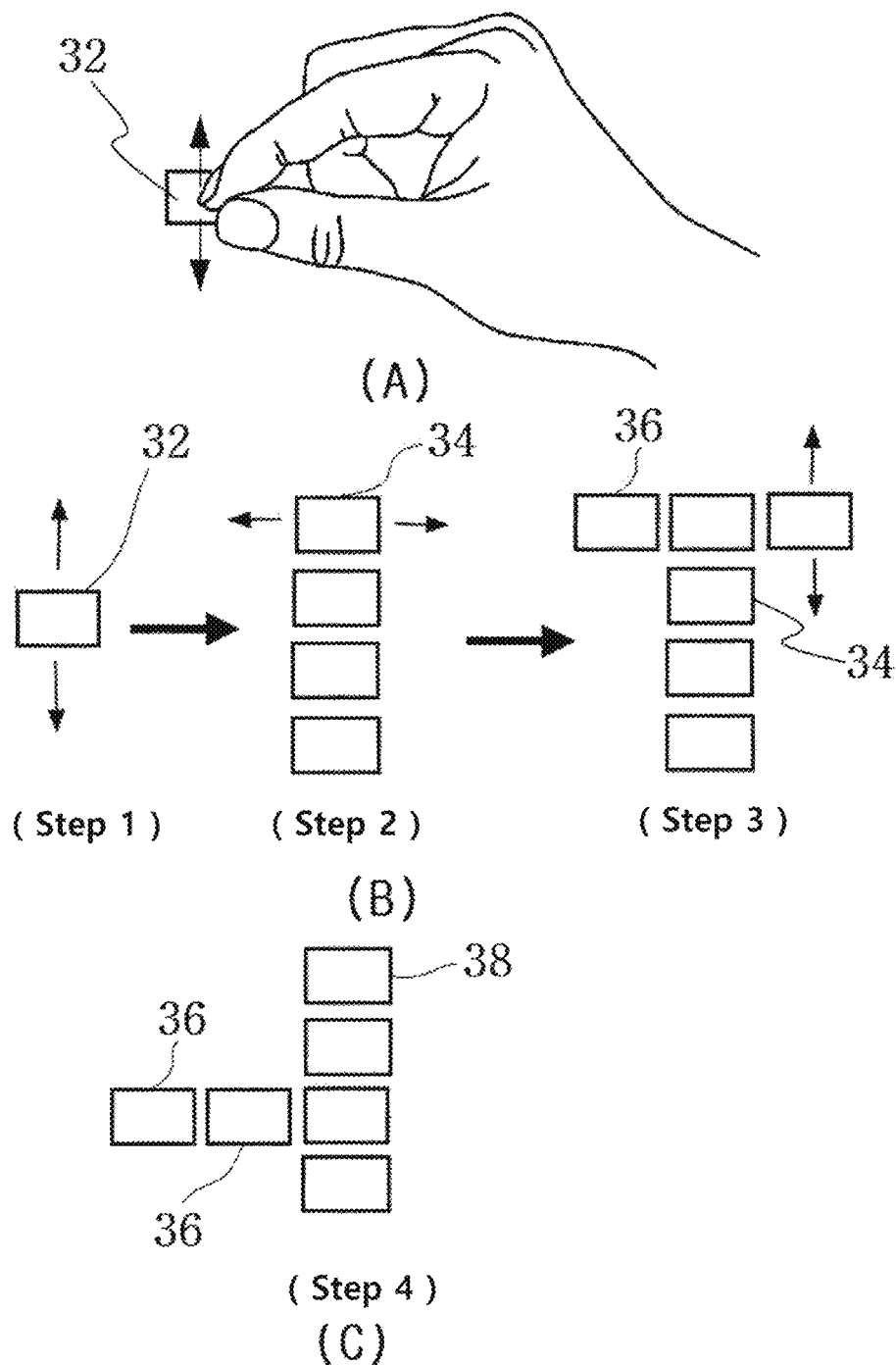
FIGS. 32 to 34 are views illustrating an exemplary embodiment in which the stepwise operation command is executable in two different methods for the same selection area.
Figure 33:
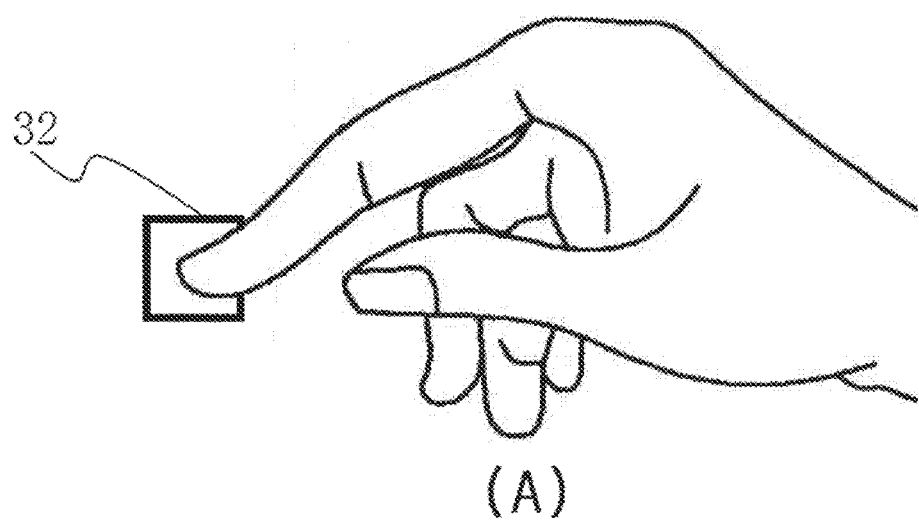
Figure 33:
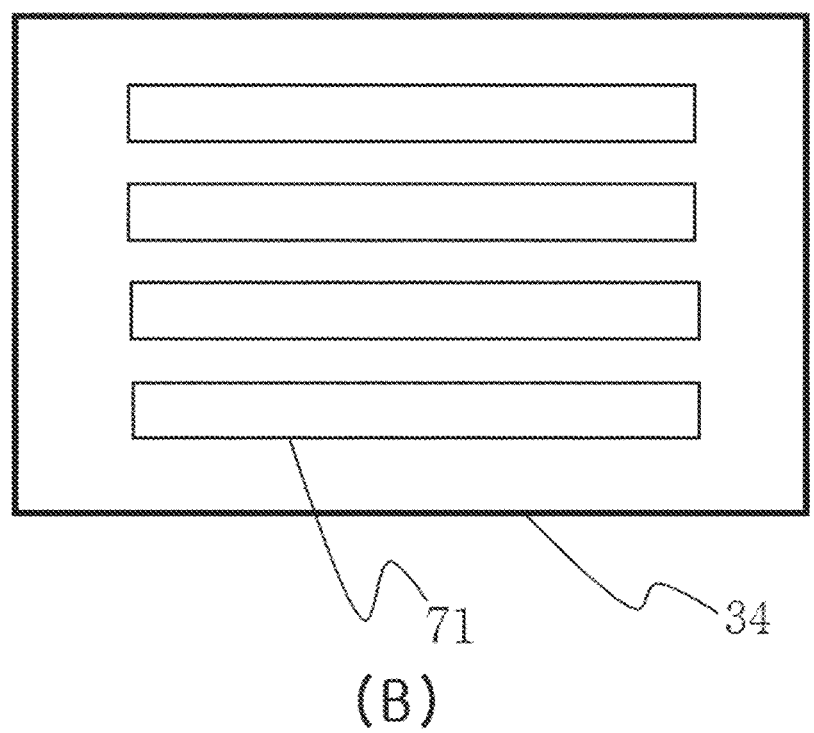
Figure 34:
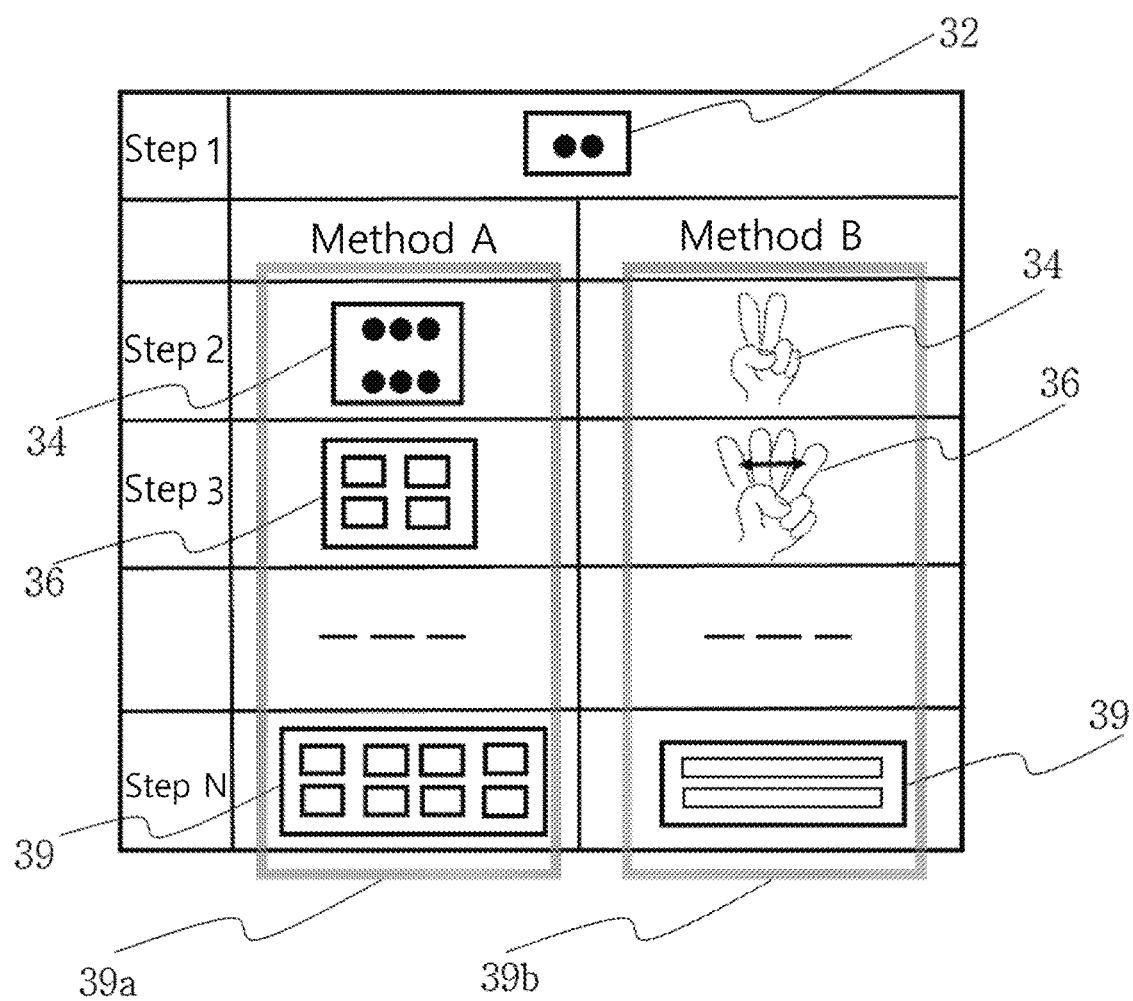

FIGS. 32 to 34 are views illustrating an exemplary embodiment in which a stepwise operation command is possibly executed in two different ways for the same selection area.

Referring to FIG. 32(A), the selection area 32 is selected, and a stepwise operation command may be executed in the method of the exemplary embodiment of FIG. 5. Naturally, the stepwise operation command may also be executed in the method of the exemplary embodiment of FIG. 7.

In addition, when the selection area 32 is selected and the stepwise operation command is executed as shown in FIG. 32(B) (as shown in Step 1 of FIG. 32(B), the stepwise operation command is executed in the upward and downward direction (i.e., arrow direction)), and Step 2 information 36 is displayed on the display 30. In FIG. 32(B), although the Step 2 information is shown in the form of four boxes, it is not necessarily limited to the number of four. Any N number is applicable.

In addition, when one of four pieces of Step 2 information in FIG. 32(B) is selected and a stepwise operation command is executed in the leftward and rightward direction (indicated by the arrows in the leftward and rightward direction in the view), the Step 3 information is displayed on the display 30. Similarly, in the views, the Step 3 information is indicated as three boxes, but the number is not limited to three. Any N number is applicable.

In addition, when one of three pieces of Step 3 information is selected,
the information indicated by arrows in the upward and downward direction in Step 3 of FIG. 32(B) is displayed, and when the stepwise operation command is executed, the Step 4 information is displayed on the display 30 as shown in FIG. 32(C).

FIG. 33 is a view illustrating an exemplary embodiment in which a stepwise operation command is executed by the method of the exemplary embodiment of FIG. 6. That is, by the method of the exemplary embodiment of FIG. 32, the selection area 32 in which the stepwise operation command is executable is selected. Then, according to the degree to which the selection area is selected and maintained for a predetermined time, the information on Step 2, Step 3, and higher step is displayed on the display 30, (or the steps are divided by the magnitude of the applied pressure).

Consequently, for the same selection area 32, the information "displayed on the display (hereinafter, displayed on the display by Method A) when a stepwise operation command in which the step is divided by a movement distance (or angle) is executed", and the information "displayed on the display (hereinafter, displayed on the display by Method B) when a stepwise operation command in which the step is divided by holding time is executed" are different from each other.

FIG. 34 is a view illustrating an exemplary embodiment by Method A and an exemplary embodiment by Method B, which are different from each other. As an example, the Step 2 (reference numeral 34) information displayed on the display when Step 2 is reached by Method A, and the Step 2 (reference numeral 34) information displayed on the display when Step 2 is reached by Method B are different from each other for the same selection area 32 that is Step 1. That is, when the method of executing the stepwise operation command is different, the same pieces of Step 2 (reference numeral 34) information are also different from each other.

Exemplary Embodiment when Method of Stepwise Operation Command is Different

1) When executing stepwise operation commands of different methods for the same selection area 32, the pieces of information 39 of Step N, which is any one step in a range from Step 2 that is the next step of the lowest step to Step K that is the highest step, are different from each other.
That is, although pieces of N Step information are the same, when the methods of the stepwise operation command are different, the pieces of Step N information 39 are different from each other.
2) In the information displayed as a result of the method of clause 1) above, all the information on Step 2 through Step K are all not different.
That is, from Step 2 to Step K, when the methods of the stepwise operation command are different, there are at least one or more of steps having the information different from each other even in the same step.
3) In the exemplary embodiment of FIGS. 32 to 34, when the methods of the stepwise operation command are different, two different methods are used, but in practice, two or more different methods may be used.
4) The sets exist.
In the present disclosure, the information from the Step 1 information to the Step N information is defined as one set (where Step N is any one step from Step 2 to Step K)

When the stepwise operation command is executed by Method A, information from the Step 1 information to the Step N information is a first set 39a, and when the stepwise operation command is executed by Method B, information from the Step 1 information to the Step N information is a second set 39b.

Similarly, when the stepwise operation command is executed in Method C, information from the Step 1 information to the Step N information is a third set.

In addition, in the first set, the second set, and the third set, the Step 1 information (i.e., Step 1 selection area) 32 is all the same. However, when the sets are different, there are at least one or more of steps having pieces of information different from each other in a range from Step 2 to Step K. Naturally, when the sets are different, the information from Step 2 to Step K may all be different (as in the view of FIG. 34).

5) The place where the sets are stored is the memory part 21 of the smartphone, and also the database 104 of the server.

Accordingly, when information in the set 39a and 39b is displayed on the display 30 of the smartphone, the central processing unit 20 of the smartphone selects the information from the memory part 21 of the smartphone or displays the information received from the server on the display 30.

6) An example of the method of the stepwise operation command is as follow.

First exemplary embodiment Method A is a method in which a point is selected and moved. Method B is a method in which a step is determined by holding time.

Second exemplary embodiment Method A provides upward and downward movement (i.e. one point or two points are selected). Method B provides leftward and rightward movement. In addition, Method C is a method in which the step is determined by holding time.

Third exemplary embodiment Method A is a method in which a point is selected and moved. Method B is a method in which a step is determined by angle so as to be moved. In addition, Method C is a method in which the step is determined by holding time.

Fourth exemplary embodiment Method A is a method in which two points are selected and the selected points are narrowed or widened. Method B is a method in which a step is determined by holding time.

Other than the methods above, other methods exist, including: a method in which a step is determined by the shape of a finger image; and a method in which a step is determined by the number of tapping of a selected area.

That is, there are cases in which various exemplary embodiment methods are present other than the above-described methods of the exemplary embodiment.

Figure 35:
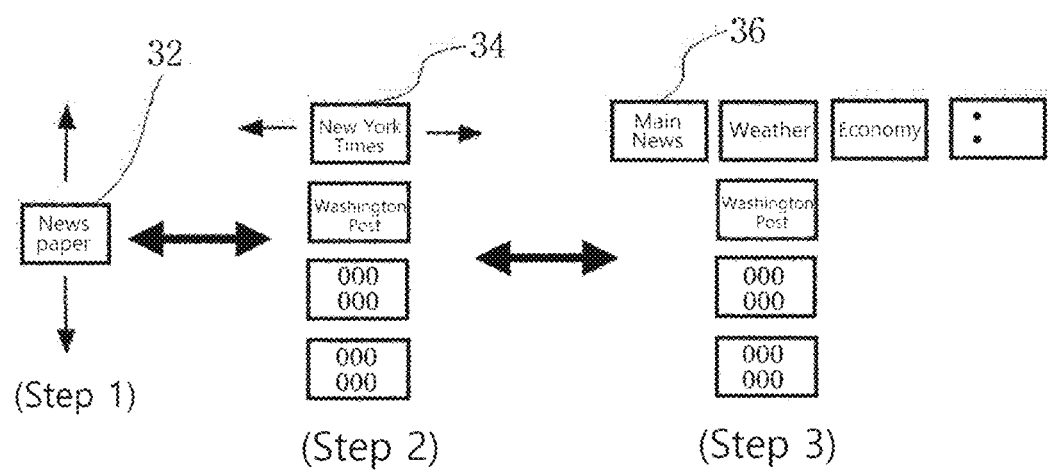
FIG. 35 is another example in which the stepwise operation command is executed in two methods with respect to the same selection area.
Figure 35:
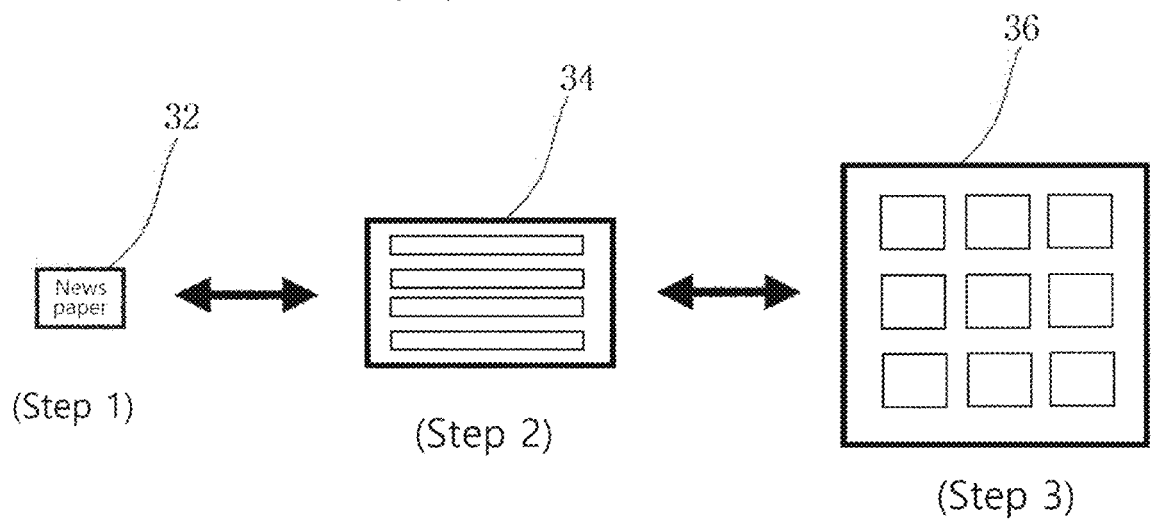

FIG. 35 is another example in which the stepwise operation command is executed in two methods with respect to the same selection area.

FIG. 35(A) is a case in which a stepwise operation command is executed by the method of the exemplary embodiment of FIG. 5 or 8 of the present disclosure.

When Step 1 (reference numeral 32) is "Newspaper" information, and when the stepwise operation command is executed in Step 1, the newspaper company information appears as the Step 2 (reference numeral 34) information (i.e., table of contents). That is, "New York Times" and "Washington Post" are displayed on the display as items in the table of contents.

When one newspaper company (i.e., item) is selected from the Step 2 (reference numeral 34) information (i.e., table of contents) on the newspaper company and a stepwise operation command is executed, the Step 3 (reference numeral 36) information (i.e., table of contents) is displayed on the display. That is, classification information of news within a newspaper company is displayed as items such as "Main News", "Weather", and "Economy".

In addition, although not shown in the view of FIG. 35, when the item "Weather" or "Main news" is selected in (Step 3) of FIG. 35(A), the selected information "Weather" or the detailed information on "Main news" is displayed on the screen of the display, or is linked to an Internet site where the selected information is displayed.

FIG. 35(B) is a case in which a stepwise operation command is executed by the method of the exemplary embodiment of FIG. 6 of the present disclosure. That is, information different from the method of FIG. 35(A) is displayed on the display.

In addition, the content or type of information displayed in each step in FIG. 35(B) is in accordance with the method of the exemplary embodiment of the present disclosure.

—Sequence of Stepwise Operation Command Displayed in Multiple Dimensions—

1) An example of a stepwise operation command displayed in multiple dimensions is illustrated as a case in FIG. 35(A). Step 1 information (i.e., selection area) 32 is selected and a stepwise operation command is executed.

2) When the Step 1 information (i.e., selection area) 32 is selected and the stepwise operation command is executed, a Step 2 table of contents (i.e., information) 34 is displayed.

The number of items in the table of contents displayed in Step 2 is related to a movement distance of a point selected in order to execute the stepwise operation command on Step 1 selection area.

For example, in the exemplary embodiment of FIG. 32(B), when moving from Step 1 to Step 2, four items in the Step 2 table of contents (i.e., information) 34 are displayed in (Step 2) of FIG. 32(B). However, depending on the distance (i.e., the distance the point selected by the stepwise operation command moves) moved in the direction of the arrows (displayed in the upward and downward direction in the view) indicated in (Step 1), only two items or six items may be displayed.

In addition, in a case where the Step 2 table of contents (i.e., information) 34 consisting of four items in (Step 2) of FIG. 32(B) is displayed on the display, when a stepwise operation command is executed in the above state (i.e., the stepwise operation command is executed to move the selection points in the direction of the arrows indicated in the upward and downward direction in the view), the four items displayed above are increased to five items or more. (i.e., Naturally, the number of items are increased only by the maximum specified number). In addition, when the stepwise operation command is executed in the opposite directions of the arrow directions, the displayed four items may be reduced up to one item according to the movement distance of the selected point.

For example, when the stepwise operation command is executed in the direction in which the selected two points are widened, the number of items in the Step 2 table of contents (i.e., information) 34 increases (Naturally, the number of items is not increased more than the predetermined number). Meanwhile, when the stepwise operation command is executed in the direction in which the selected two points are narrowed, the number of items in the Step 2 table of contents (i.e., information) 34 is reduced up to one item. Naturally, the number of items to be increased or the number of items to be reduced is determined according to the predetermined movement distance.

3) When any one item from among the Step 2 table of contents 34 is selected and the stepwise operation command is executed, the Step 3 table of contents (i.e., information) 36 is displayed.

In this case, the number of items generated in Step 3 table of contents (i.e., information) 36 depends on the method in which Step 2 table of contents (i.e., information) is displayed.

4) When any one item of Step N table of contents is selected and the stepwise operation command is executed, Step N+1 table of contents (i.e., information) is displayed.

In this case, the number of items generated in the Step N+1 table of contents (i.e., information) 36 depends on the method in which the Step 2 table of contents (i.e., information) is displayed.

5) The "stepwise operation command displayed in multiple dimensions" is an expression that mimics the example of mathematics that displays two dimensions, three dimensions, and four dimensions.

That is, the "direction of the stepwise operation command" increasing the number of items in Step 1 is different from the "direction of the stepwise operation command" increasing the number of items in Step 2. That is, the "direction of the stepwise operation command" increasing the number of items in Step N is different from the "direction of the stepwise operation command" increasing the number of items in Step N+1.

6) When the Step 2 information (i.e., table of contents) is selected and a stepwise operation command (i.e., the direction in which the selected point is moved) is executed in the upward and downward direction, the number of items in the Step N information (i.e., table of contents) is increased or decreased. In this case, when one item is selected from the Step N information (i.e., table of contents) and a stepwise operation command (i.e., the direction in which the selected point is moved) is executed in the leftward and rightward direction, the lower step information (i.e., lower level information in the hierarchical structure example of FIG. 19) about the selected item is displayed as Step N+1 information (i.e., table of contents). In addition, the Step N+1 information (i.e., table of contents) is displayed with two or more items (i.e., as a very exceptional case, only one item is possible).

In addition, although the lower level information is displayed, information other than the lower level information may be displayed.

7) The direction in which the stepwise operation command is executed in any Step N or Step N+1 does not need to be particularly limited.

8) A method for using stepwise operation command displayed in multiple dimensions is exemplified.

A stepwise operation command in which the number of items in the table of contents increases and decreases by a movement distance to which the selected point is moved is executed.

In addition, when the stepwise operation command in which a step is determined by the time for which one item is selected and maintained in the table of contents is executed, an item having information different from the information of the selected item is displayed. (Alternatively, an item having information of a lower layer (refer to the exemplary embodiment of FIG. 19) of the information of the selected item is displayed).
9) When there is only one item in the selection area (i.e., table of contents), the "method in which a stepwise operation command is executed by a movement distance" and the "method in which a stepwise operation command is executed by holding time" may be used interchangeably.

Exemplary Embodiment where Two Methods of Stepwise Operation Commands are Executed for Same Selection Area In the exemplary embodiment below, Method A and Method B are selected from among methods including: a method of dividing a step by time that a selected point is maintained; a method of dividing a step by a magnitude of pressure applied to the selected point; and a method of dividing a step by a distance or an angle at which the selected point moves.

1) First Exemplary Embodiment (a) When a stepwise operation command of Method A is executed,
as in Step 1, Step 2, and Step 3, the amount of data displayed on the display increases as the step increases.
When the data is increased, the amount of data is increased in a state that data existing in the previous step exists.
Information of the same layer (in the hierarchical structure example of FIG. 19) is increased.
For example, the more the step increases, the more the number of items or table of contents increases.
For example, according to the exemplary embodiment of FIG. 32, "London Times" exists in Step 1, but when a stepwise operation command is executed, "New York Times", "Washington Post", Korea Times", and the like will additionally appear as Step 2.

(b) When the stepwise operation command of Method A is executed,
as in Step 1, Step 2, and Step 3, the information displayed on the display becomes different as the step increases.
For example, the Step N+1 information does not include the Step N information.
Information of the lower layer (in the hierarchical structure example of FIG. 19) is displayed.

2) In a case where a subject of a selection area is a phone number list,
(a) when a stepwise operation command of Method A is executed,
one item (i.e., name, title, or number) is selected from the phone number list (i.e., table of contents), and a stepwise operation command is executed for the selected item. In addition, as the step increases, the data of information related to the phone number increases.
The phone number is additionally displayed.
Information related to the selected name is additionally displayed. Other phone numbers, e-mail addresses, addresses, memos, and the like are additionally displayed.
Information editing, and the like are additionally displayed.

A text function is displayed.
(b) When a stepwise operation command of Method B is executed,
A link is established for programs or content in which text and mails may be used.
Other programs or a table of contents other than the phone appears.

3) In a case where a subject of the selection area is a map,
(a) when a stepwise operation command of Method A is executed,
additional information about the map is displayed.
The detail level of the map is increased.
When a certain point (i.e., shop or restaurant) is selected on the map and a stepwise operation command is executed, information about additional shops or restaurants is displayed.
For example, in a case where there is a plurality of shops or restaurants at a point (which may be generally a building or a place), when a stepwise operation command is executed, the number of shops or restaurants displayed on the display increases.
(a) In a case where a stepwise operation command of Method B is executed,
when a specific point (i.e., shop or restaurant) is selected on the map and a stepwise operation command is executed, additional information about the selected point is displayed.
The additional information above is the products or menus handled by the above-mentioned stores or restaurants.
A window for ordering the products or menus is displayed.
A window for payment for the products or menus is displayed.
A window for transmitting a message to the stores or restaurants is displayed.
A window for sending an e-mail to the stores or restaurants is displayed.

4) In a case where a subject of the selection area is an icon, the icon is in accordance with the "method for executing the multi-dimensionally displayed stepwise operation command", the method being described in the previous exemplary embodiment of the present disclosure.

Figure 36:
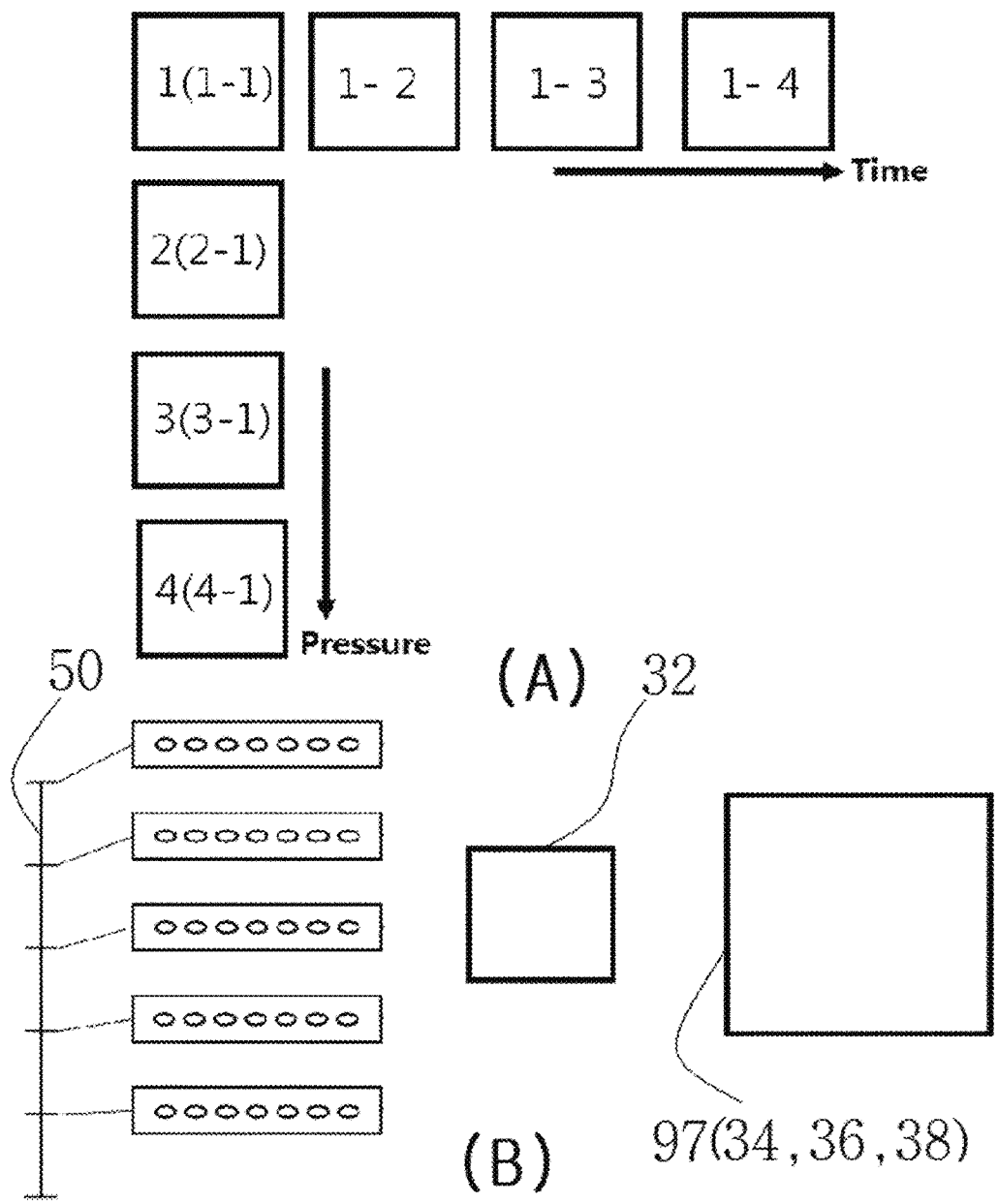
FIG. 36 is a view illustrating an exemplary embodiment illustrating a stepwise operation command having a two-dimensional step.

FIG. 36 is a view illustrating an exemplary embodiment illustrating a stepwise operation command having a two-dimensional step.

FIG. 36(A) is a view illustrating an exemplary embodiment in which each step of information is shown in a two-dimensional method or a three-dimensional method.

An initial Step 1 (i.e., Step 1-1) is present, and Step 2, Step 3, Step 4, or Step N is displayed according to the magnitude of the applied value.

In addition, in Step 1, Step 1-1, Step 1-2, Step 1-3, step 1-4, or step 1-N is present.

In addition, in Step 2, Step 2-1, Step 2-2, Step 2-3, Step 2-4, or step 2-N is present as well.

Similarly, even in Step N, Step N-1, Step N-2, Step N-2, step N-4, or step N-N is present.

The method of the stepwise operation command by which the step is moved to Step 1 (Step 1-1), Step 2 (Step 2-1), Step 3 (Step 3-1), Step 4 (Step 41), or Step N (Step N-1) may be called Method A. In addition, the method of the stepwise operation command by which the step is moved to Step N-1, Step N-2, Step N-3, Step N-4, or Step N-N may be called Method B.

In addition, the method used as the stepwise operation command in the present disclosure includes pressure, time, distance movement, angle movement, and the like.

Therefore, as a first exemplary embodiment, Method A may be a method of applying the intensity of pressure, and Method B may be a method of applying holding time.

In addition, as a second exemplary embodiment, Method A may be a method of the holding time, and Method B may be a method of distance movement.

In addition, as a third exemplary embodiment, Method A may be a method of applying speed, and Method B may be a method of the distance movement.

In addition, as a fourth exemplary embodiment, Method A may be a method of "distance movement in a rightward (or leftward) direction, i.e., horizontal direction", and Method B may be a method of "distance movement in a downward (or upward) direction, i.e., vertical direction".

That is, a combination of the numbers of various cases is possible so that Method A and Method B are not the same.

In addition, the result of the stepwise operation command is as follows.

When a step is moved by two steps in Method A and the step is moved by three steps in Method B, the icon of Step 2-3 is displayed on the display.

As another example, when a step is moved by N steps in Method A and the step is moved by N steps in Method B, the icon of the Step N-N is displayed on the display.

In addition, the characteristics (or summary) of information of each step is displayed in the icon of Step 2-3 or Step N-N. The descriptions of characteristics (or summary) of information are described in the exemplary embodiments of FIGS. 9 and 10 of the present disclosure.

In addition, when a user desires to check the information of Step 2-3 or Step N-N in more detail, the user may select the icon of Step 2-3 or Step N-N, (i.e., selecting on the display through an input device)

FIG. 36(B) is a view illustrating another exemplary embodiment in which each step of information is shown in a two-dimensional method or a three-dimensional method.

In Step 1, when a selection area 32 is selected on the display through an input device, a guiding line is displayed on the display, and the guiding line 50 indicates the characteristics (or summary) of information for each step.

In addition, when a stepwise operation command is input by the guide of the guiding line 50, information corresponding to the final step (i.e., Step 2, 3, 4, or N) generated by the stepwise operation command is displayed in a separate window 97.

Even at this time, Method A and Method B described in the exemplary embodiment of FIG. 36(A) exist, so as to allow the information of Step N-N to be displayed in a separate window.

Meanwhile, when executing the stepwise operation command, Method A or Method B may be displayed on the display.

—Step of Three Dimensions—

Even in Step 1-1 (Step 1-1-1), Step 1-1-2, Step 1-1-3, Step 1-1-4, or Step 1-1-N is present.

In addition, in Step 2-2 (Step 2-2-1), Step 2-2-2, Step 2-2-3, Step 2-2-4, or Step 2-2-N is present.

Similarly, in Step N-N, Step N-N-1, Step N-N-2, Step N-N-3, Step N-N-4, or Step N-N-N is present.

That is, when a step movement in a one-dimensional direction is called Method A, and a step movement in a two-dimensional direction is called Method B, a step movement in a three-dimensional direction may be called Method C. A stepwise operation command in Method C may also be executed in accordance with the method of the stepwise operation command of Method A and Method B.

In addition, when viewed hierarchically, it may be said that when information movement in the same layer is called Method A and information movement in a direction lower by one layer is called Method B, information movement in a direction lower by two layers may be called Method C. The description of the hierarchical structure is in accordance with the exemplary embodiments of FIGS. 19 and 20 of the present disclosure.

Figure 37:
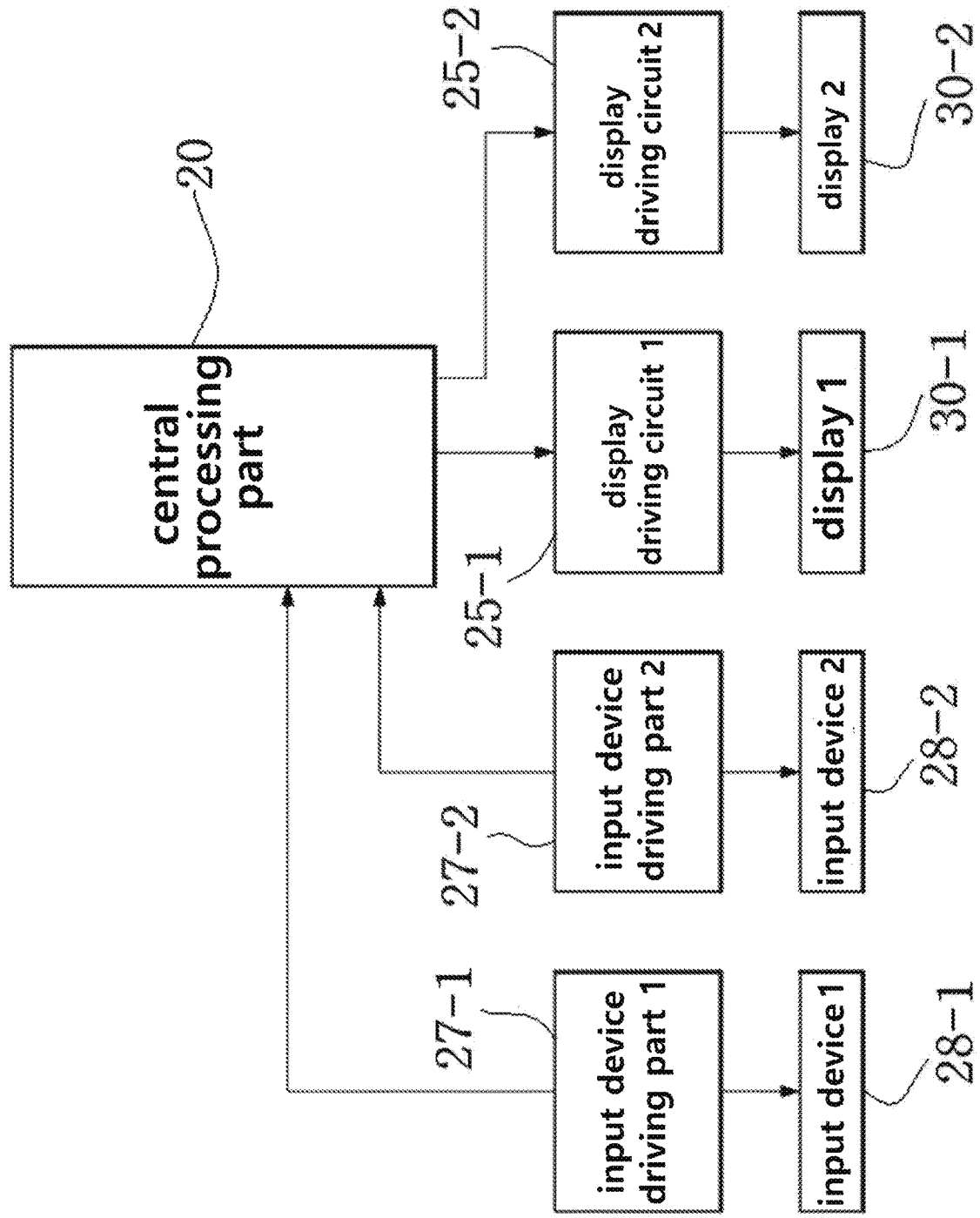
FIGS. 37 and 38 are views illustrating an exemplary embodiment in which two or more displays are provided.
Figure 38:
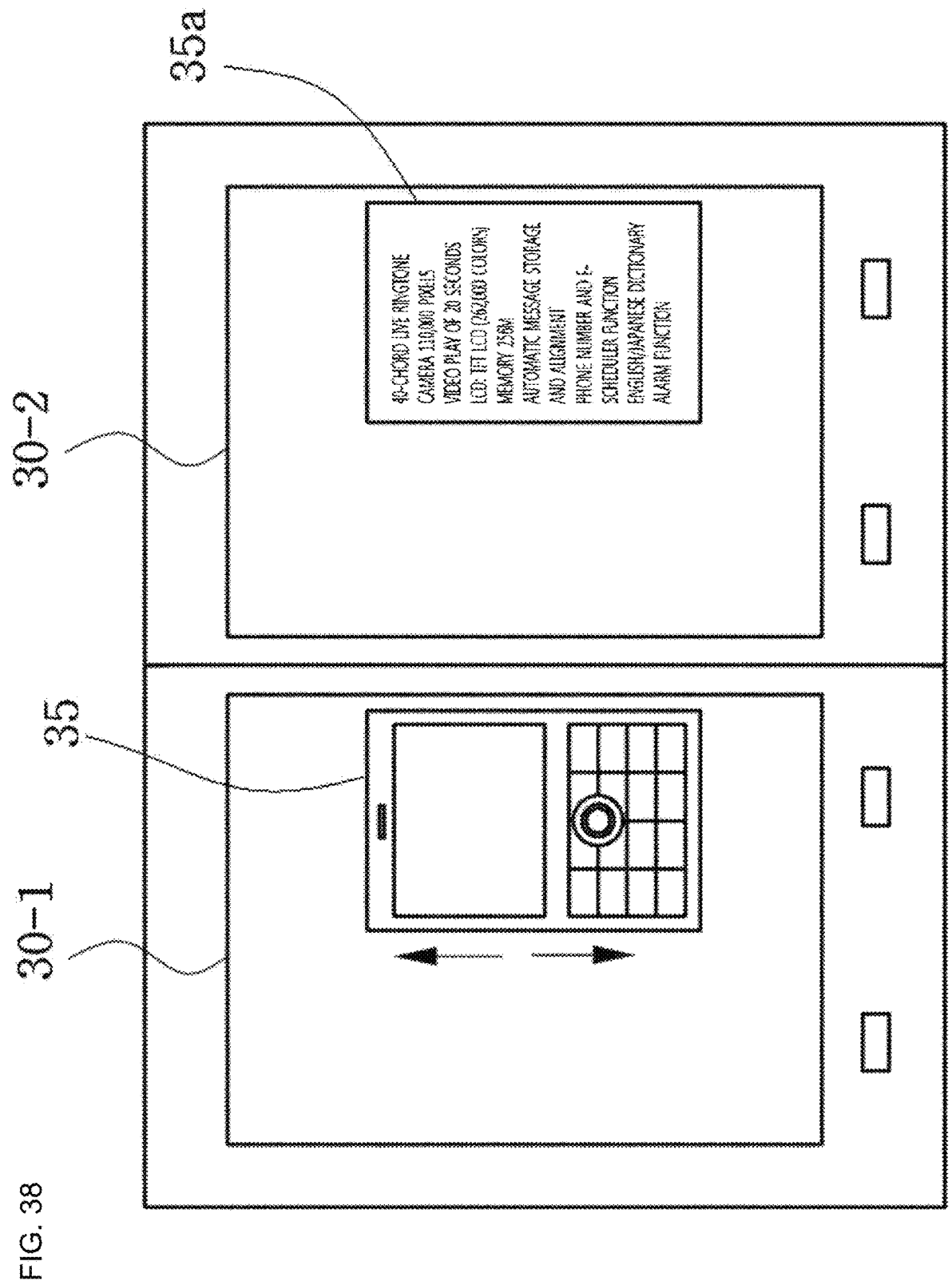

FIGS. 37 and 38 are views illustrating an exemplary embodiment in which two or more displays are provided.

As shown in FIG. 37, a first display 30-1 and a second display 30-2 are provided, and first and second display driving circuits 25-1 and 25-2 are also provided.

In addition, a first input device 28-1 is provided in the first display, and a second input device 28-2 is provided in the second display. In addition, first and second input device driving parts 27-1 and 27-2 for driving the input devices are provided.

In this case, the two displays 30-1 and 30-1 and the two input devices 28-1 and 28-2 are controlled by a single central processing unit 20.

FIG. 38 is a view showing an exemplary embodiment in which a stepwise operation command is displayed on two displays. That is, when a stepwise operation command is executed on the first display 30-1, the results of the execution are displayed on the second display 30-2. Naturally, when a stepwise operation command is executed on the second display, the results of the execution may be displayed on the first display.

For example, when a selection area (i.e., current Step 1) is selected on the first display 30-1 and is moved by two steps through the stepwise operation command, the final step is Step 3, and information corresponding to Step 3 is displayed on the second display 30-2.

The function of FIG. 38 may be executed on the central processing unit of the smartphone (or the controller of the server) by an algorithm stored in the memory part of the smartphone (or the database of the server). That is, information corresponding to the final step, selected as a result of executing the stepwise operation command input through the first input device 28-1 provided in the first display, is displayed on the second display.

Meanwhile, when step information input is selected through the first display 30-1, the input window 45 is displayed on the second display 30-2, so that the user of the present disclosure uses the smartphone 110, whereby information corresponding to the step may be input. That is, the information corresponding to the step is input into the input window 45.

In addition, when the step input 42 is selected through the first display 30-1, the selection window 40 is displayed as shown in the exemplary embodiment of FIG. 25(A).

As in the previous description, when a step is increased, data may be increased or decreased compared to a previous step, new data not present in the previous step may be added, or information of the new step may be displayed only with information that did not exist in the previous step. In addition, each step is displayed on the display through the stepwise operation command, and even though the stepwise operation command is executed, each step may not proceed further lower than the lowest step or higher than the highest step.

The present disclosure provides a wide variety of exemplary embodiments. In addition, the smartphone, the server, and the method of the stepwise operation command, which are the basis for implementing the exemplary embodiment, may be applied to each other in each exemplary embodiment.

Providing one or two examples, in the present disclosure, the selection region is an area in which a stepwise operation command may be executed, and the area may use only a part of the entire screen as a target area or the area may use the entire screen (except for areas where menus, and the like are displayed, even in the entire screen) as the target area. Then, the concept of the selection area is applied to all exemplary embodiments of the present disclosure.

In addition, when there is a concept that "the initial Step 1 should be a selection area, but from Step 2 to Step K that is the highest step, there is no selection area and Step N (i.e., any one step from Step 2 to Step K) in which only the information of the corresponding step is displayed also exists". the above concept is also applied to all exemplary embodiments of the present disclosure.

Figure 39:
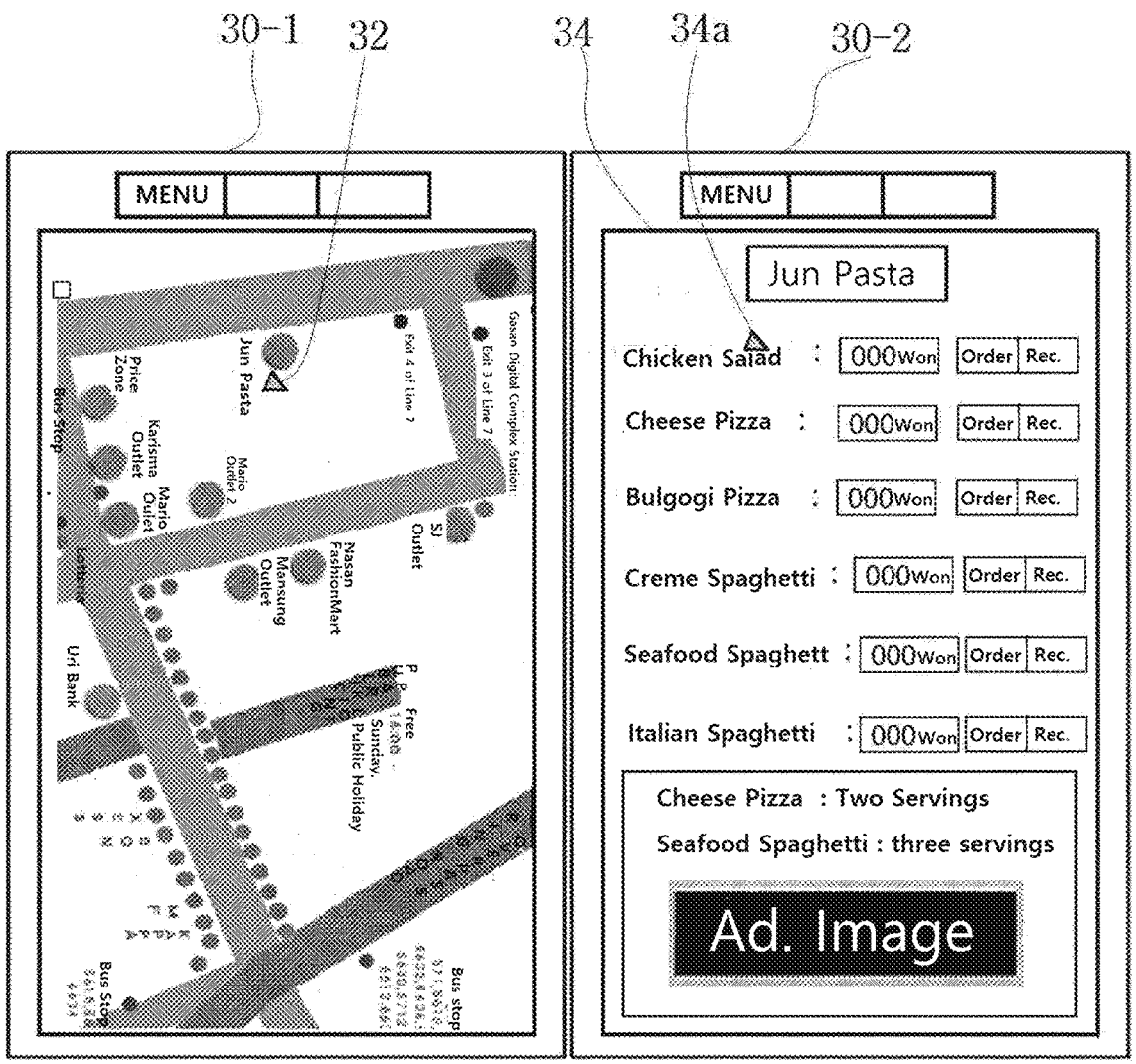
FIG. 39 is a view illustrating an exemplary embodiment in which the embodiment of the present disclosure is applied to a map.

FIG. 39 is a view illustrating an exemplary embodiment in which the present disclosure is applied to a map.

FIG. 39 is a view illustrating an exemplary embodiment in which the first display and the second display exist. Alternatively, in the exemplary embodiment of FIG. 39, one display is divided into two areas so that the display may be applied as it is even when there are the first area and the second area.

A map is displayed on the first display 30-1 (or the first area), and a selection area 32 exists in the map. The selection area may be a shop, a station, or a specific place of a building in the map.

In addition, the selection area 32 is then selected and a stepwise operation command is executed. Then, the execution result of the stepwise operation command is displayed on the second display 30-2 (or the second area).

In the exemplary embodiment of FIG. 39, a menu is displayed, and a view of an exemplary embodiment in which an order may be placed through the menu is illustrated.

In this case, the stepwise operation command may be executed for the entire first display 30-1 (or the first area). In the present disclosure, the described method is a method of dividing a distance into steps. In this case, the execution result of the stepwise operation command is displayed on the first display 30-1 (or the first area) as it is.

However, the stepwise operation command may be executed on the selection area 32 existing in the first display 30-1 (or the first area). The stepwise operation command is a method of dividing the length of time into steps or dividing the magnitude of pressure into steps. In this case, the result of the stepwise operation command is displayed on the second display 30-2 (or the second area).

In addition, a selection area 34a may exist in the second display 30-2 (or the second area). When the stepwise operation command is executed on the selection area 34a existing in the second display 30-2 (or the second area), the result may be again displayed on the first display 30-1 (or the first area).

When the stepwise operation command is executed on the first display 30-1 (or the first area), the results may appear on the first display (or the first area), and the results may appear on the second display (or the second area). In addition, when the stepwise operation command is executed on the second display 30-2 (or the second area), the results may appear on the second display (or the second area), and the results may appear on the first display (or the first area).

In the case where the stepwise operation command is executed on the first display 30-1 (or the first area), when the stepwise operation command is executed in Method A, the results is displayed on the first display 30-1 (or the first area), and when the stepwise operation command is executed in Method B, the results is displayed on the second display 30-2 (or the second area).

In addition, when the stepwise operation command is executed for all information displayed on the first display 30-1 (or the first area), the result is displayed on the first display 30-1 (or the first area). Then, when the stepwise operation command is executed on the selected area displayed on the first display 30-1 (or the first area), the result is displayed on the second display 30-2 (or the second area).

That is, the central processing unit 20 displays the result on the first display and the second display according to the algorithm (i.e., method) described in the exemplary embodiment of FIG. 39. Alternatively, the central processing unit 20 displays the result on the first and second areas of the display 30 according to the algorithm (i.e., method) described in the exemplary embodiment of FIG. 39.

Figure 40:
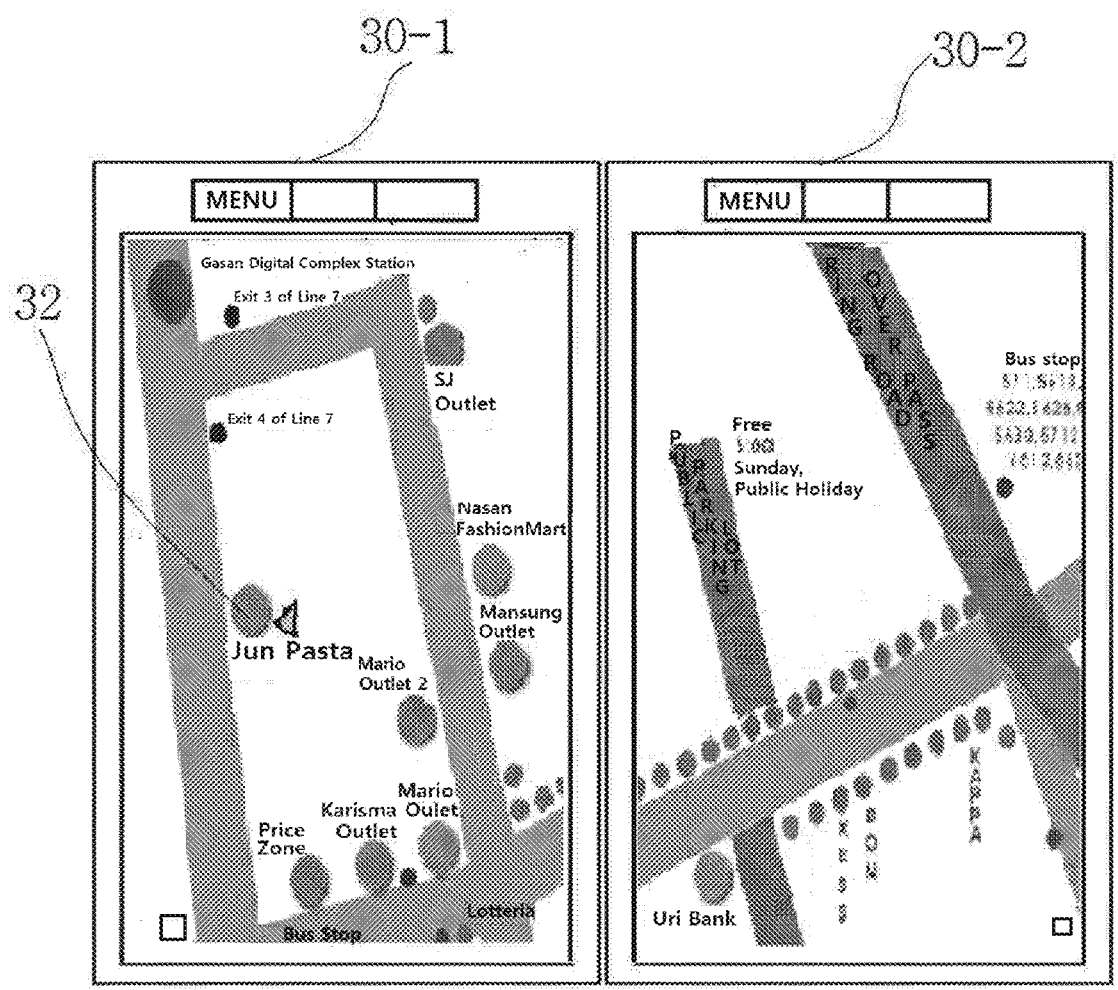
FIGS. 40 and 41 are views illustrating another exemplary embodiment using two displays.
Figure 41:
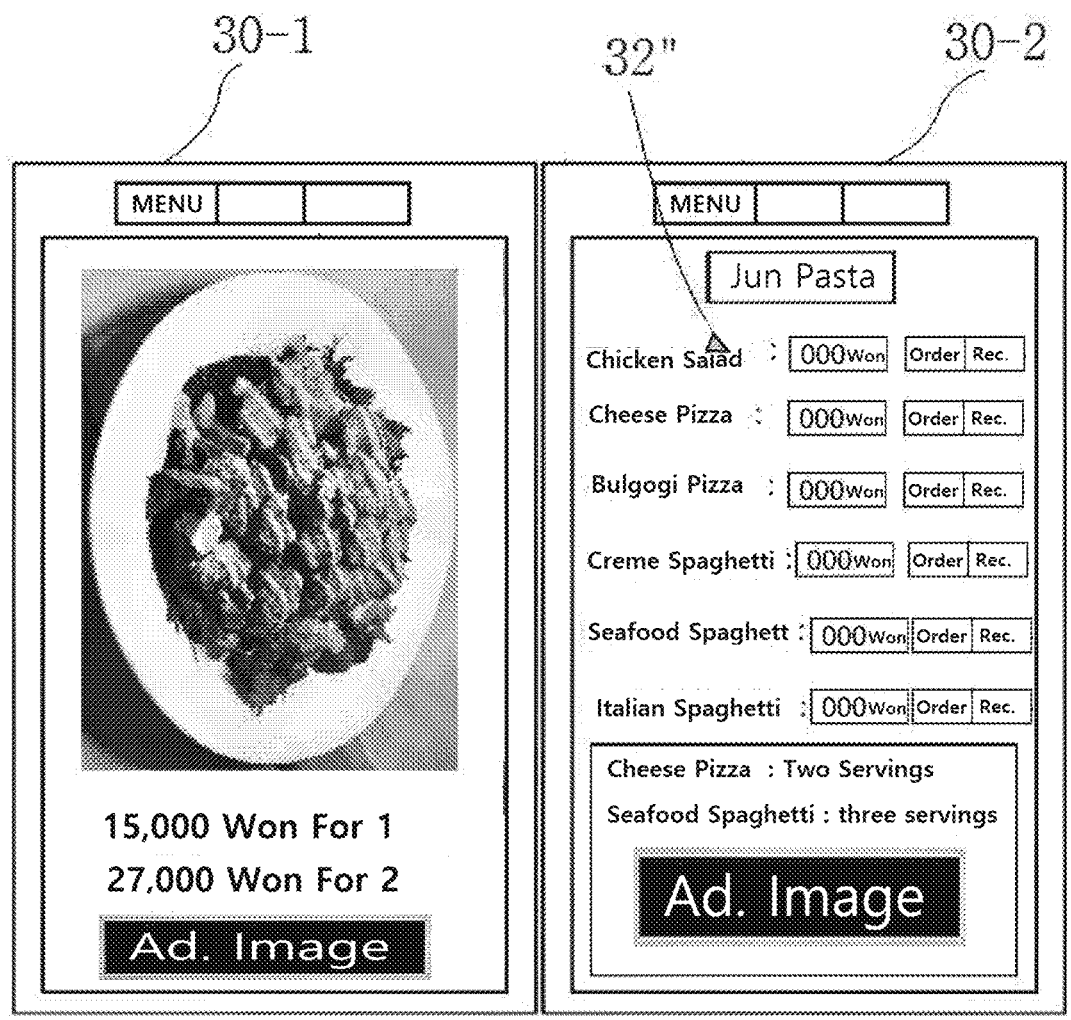

FIGS. 40 to 41 are views illustrating another exemplary embodiment using two displays.

Figure 42:
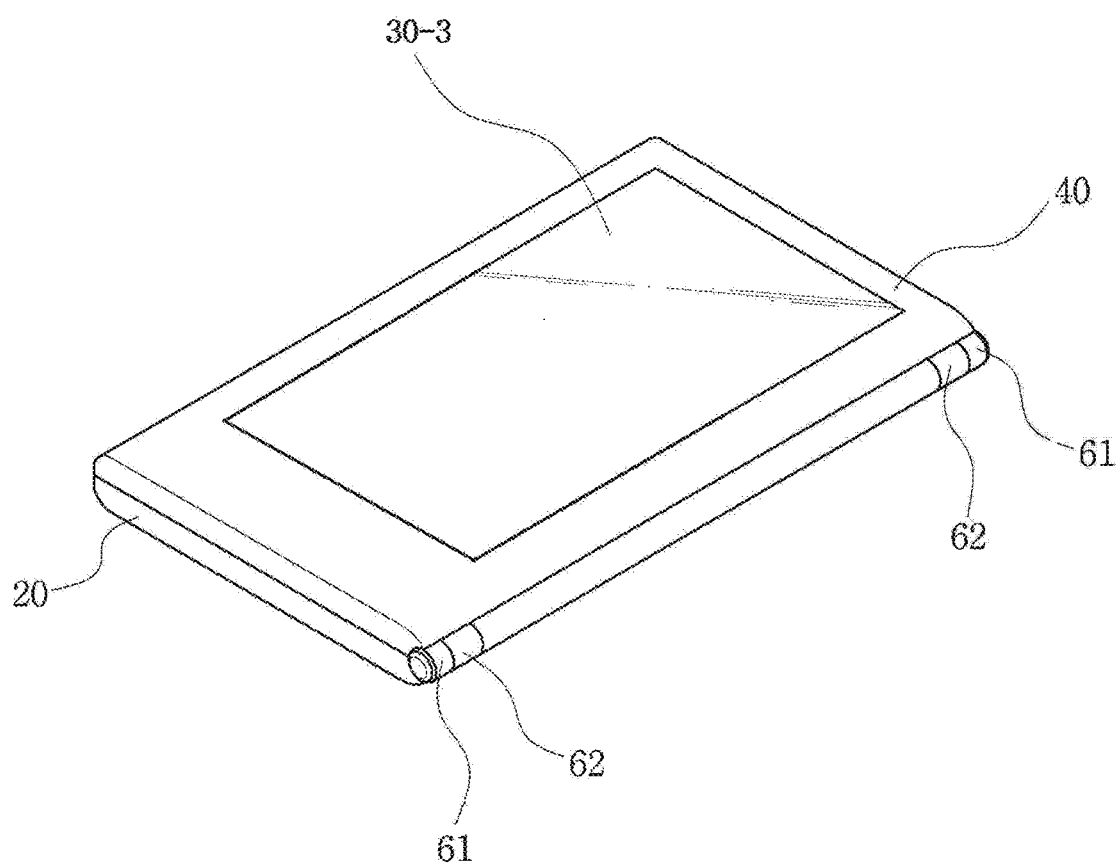
FIGS. 42 to 47 are views illustrating examples of a foldable smartphone.
Figure 43:
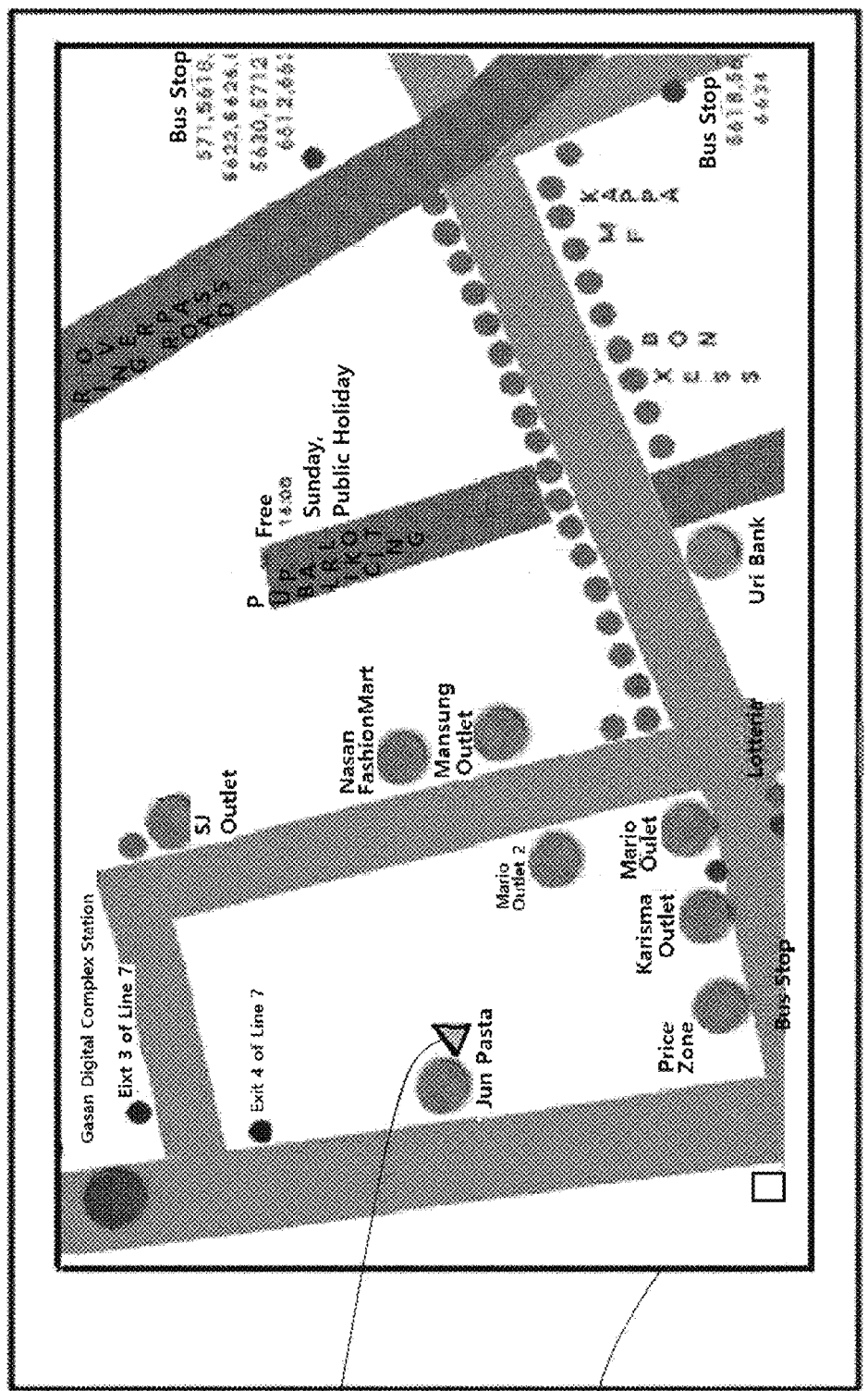
Figure 44:
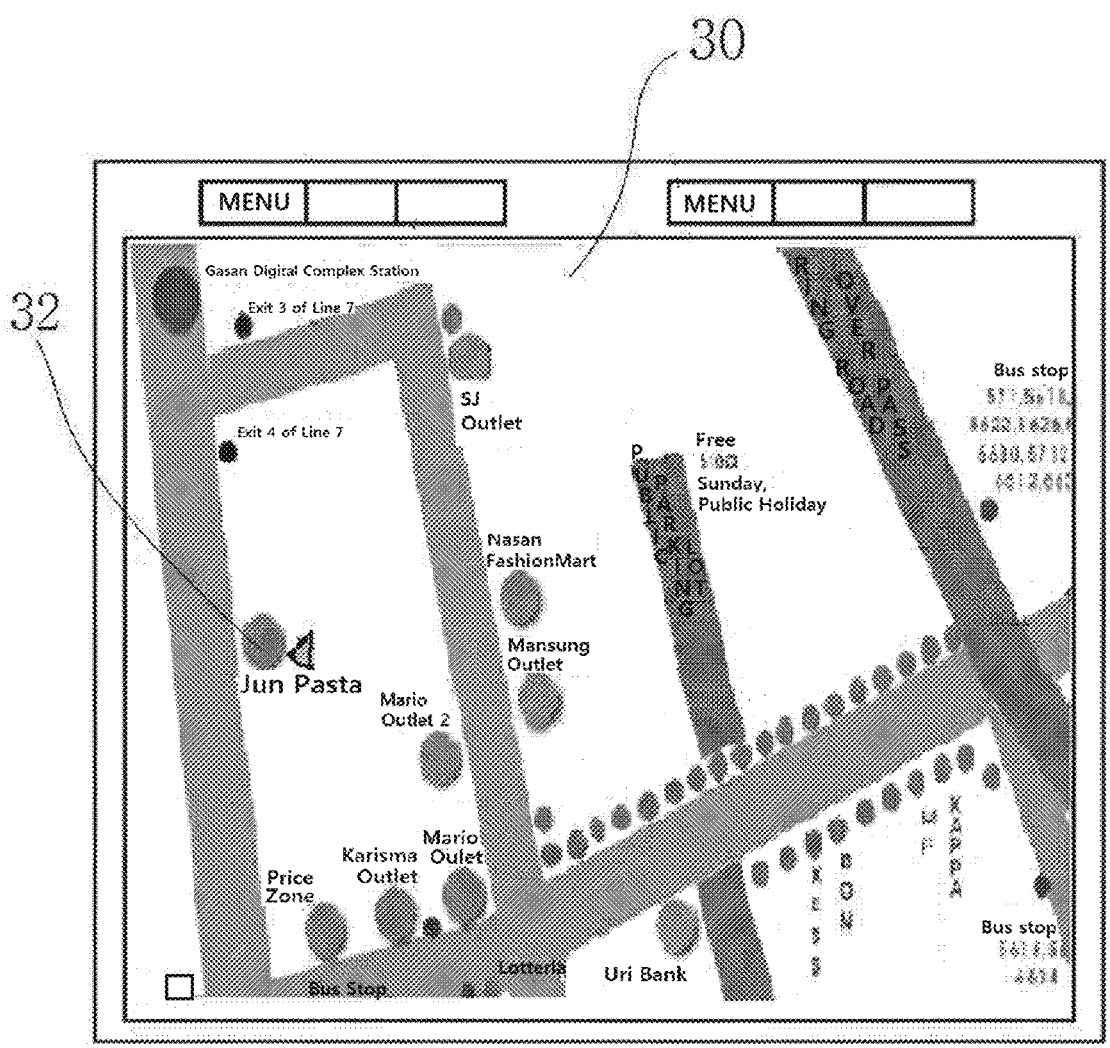

Meanwhile, the exemplary embodiments of FIGS. 41 and 42 may be applied as it is even when the first area and the second area are displayed on one display.

The exemplary embodiment is for a case where any initial information (i.e., a map in the exemplary embodiment of FIG. 40) is displayed over the entire two displays 30-1 and 30-2 (or when displayed on one display 30), and the embodiment method is as follows.

(1) For initial information (i.e., a map in the exemplary embodiment of FIG. 40) displayed on the two displays 30-1 and 30-2 (or one display 30), when a stepwise operation command that divides a distance into steps or a stepwise operation command that divides an angle into steps is executed, the result of the stepwise operation command is displayed on the two displays 30-1 and 30-2 (or one display 30).

(2) In a case where the selection area (i.e., the shop, restaurant, or building in the map in the exemplary embodiment of FIG. 40) exists in the initial information (i.e., the map in the exemplary embodiment of FIG. 40) displayed across the two displays 30-1 and 30-2 (or one display 30), when the stepwise operation command is executed for the selected area, the result is displayed as in the exemplary embodiment of FIG. 39.

The steps includes: Step 1 in which a selection area within the initial information displayed across the two displays 30-1 and 30-2 (or one display 30) is selected as a point through the input device, so as to execute a stepwise operation command for the selection area;

Step 2 in which a position of a point is output from the input device to the central processing unit;

Step 3 in which the central processing unit determines a final step that is moved from a current step of the selection area; and Step 4 in which the central processing unit causes the initial information to be displayed on the first display 30-1 (or the first area) and the second display 30-2 (or the second area) displays the information on the final step of the selection area determined in Step 3 above. (In the exemplary embodiment of FIG. 39, it may be said that the result of Step 4 is displayed on the second display 30-2 (or the second area)).

Thus, the above-described steps are included.

Naturally, the initial information is allowed to be displayed on the second display 30-2 (or the second area), and the information on the final step of the selection area determined in Step 3 may be displayed on the first display 30-1 (or the first area).

In this case, in Step 3, the central processing unit determines the final step that is moved from the current step by means of the time for which a point of Step 1 is maintained or the intensity of the pressure applied through the point.

In addition, in Step 4, when a stepwise operation command is executed, the stepwise operation command dividing a distance or an angle into steps for information displayed on the second display (or second area) (refer to the view of the exemplary embodiment of FIG. 39), the result of the stepwise operation command is displayed on the second display (or second area).

Meanwhile, in Step 4, when the selection area exists in the information displayed on the second display (or second area) and the stepwise operation command is executed on the selected area, the result is displayed on the first display (or the first area) (refer to the exemplary embodiment of FIG. 41).

That is, in FIG. 41, a table of contents for food is displayed. In addition, an item ("Chicken salad" in the exemplary embodiment of FIG. 41) among the table of contents for the food may be the selection area. Then, when the stepwise operation command for dividing time or pressure into steps is executed for the item ("Chicken salad" in the exemplary embodiment of FIG. 41), the result is displayed on the first display (or first area).

FIGS. 42 to 47 are views illustrating examples of a foldable smartphone.

That is, in the folded state of a smartphone, an external display 30-3 is present outside, and in the unfolded state of the smartphone, the internally unfolded display 30 (or the first display and the second display) is present.

In addition, the method of controlling the external display 30-3 by the central processing unit 20 is the same as the method of controlling the display 30 and the first and second displays 30-1 and 30-2.

(1) For initial information (i.e., a map in the exemplary embodiment of FIG. 43) displayed on the external display 30-3, when a stepwise operation command that divides a distance into steps or a stepwise operation command that divides an angle into steps is executed, the result of the stepwise operation command is displayed on the external display 30-3.

Figure 47:
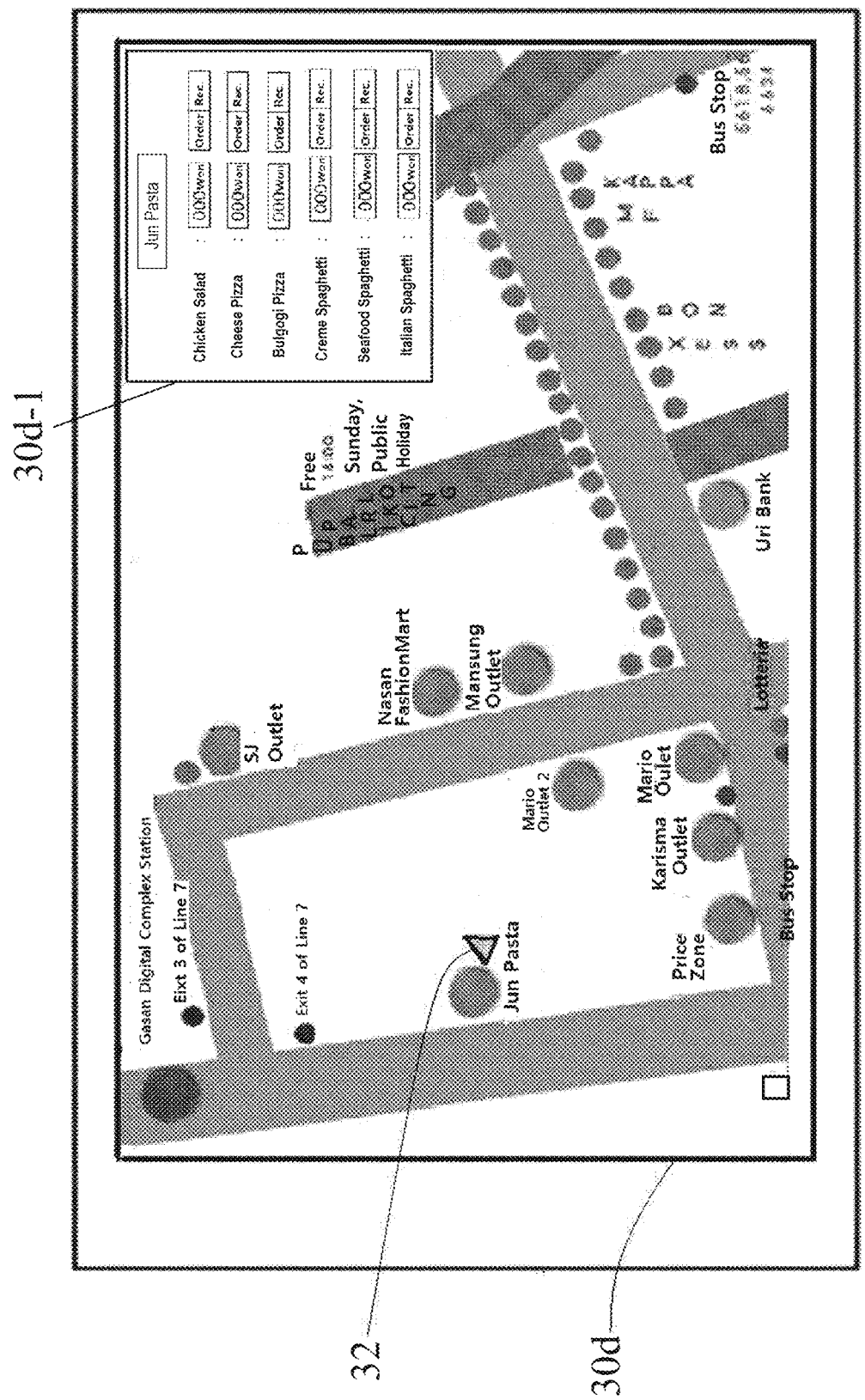
Figure 48:
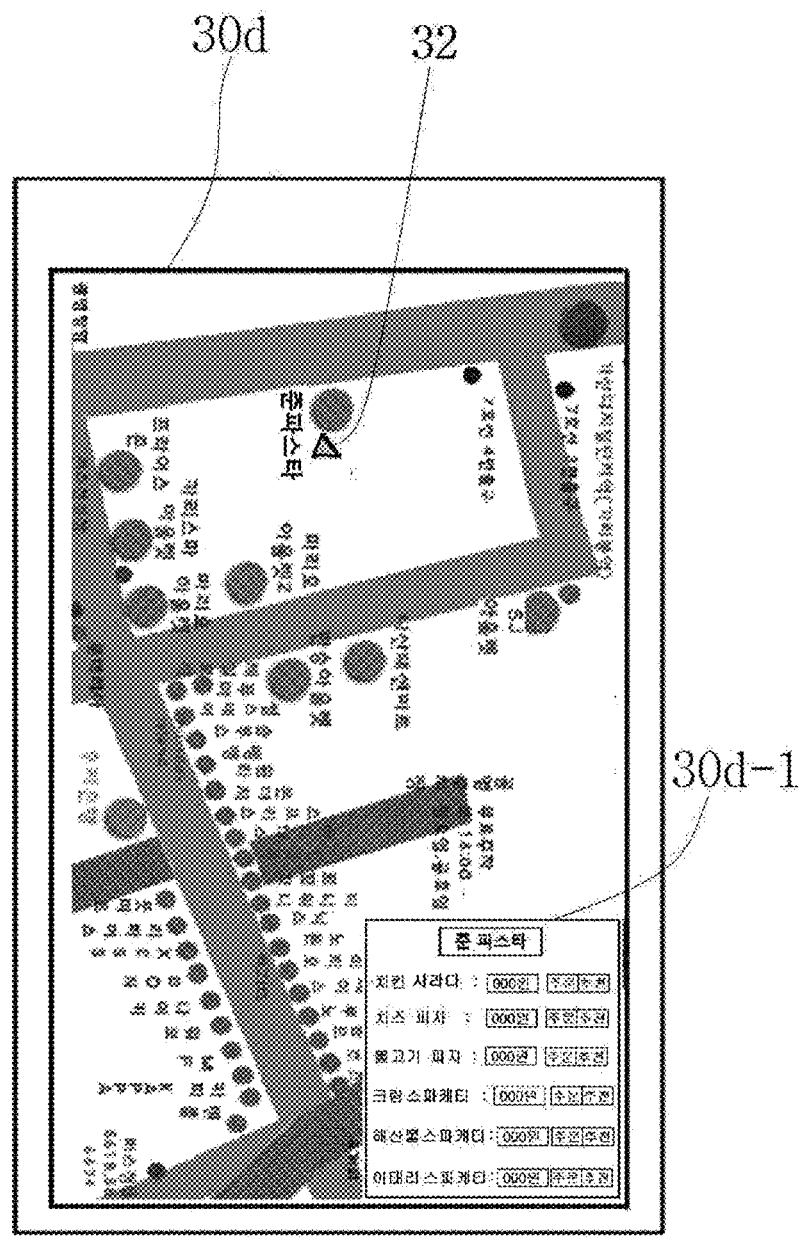

(2) In the case where the selection area exists in the initial information (i.e., the map in the exemplary embodiment of FIG. 43) displayed on the external display 30-3, when a stepwise operation command is executed for the selection area, a screen is divided and displayed. In addition, the steps are as follows:

Step 1 in which a selection area in initial information is selected by a point through an input device, and a stepwise operation command is executed on the selection area;

Step 2 in which a position of the point from the input device is output to the central processing unit;

Step 3 in which a central processing unit determines a final step moved from a current step of the selection area; and Step 4 in which the central processing unit causes the initial information (i.e., the map in the exemplary embodiment of the present disclosure) to be displayed on a part of the external display 30-3, and causes the information on the final step of the selection area determined in Step 3 to be displayed on another part of the external display 30-3 (i.e., a separate window 30d-1 in the exemplary embodiment of FIG. 47).

Thus, the above-described steps are included.

In this case, in Step 3, the central processing unit 20 determines the final step that is moved from the current step by means of the time for which a point of Step 1 is maintained or the intensity of the pressure applied through the point.

Meanwhile, when the smartphone is unfolded, there is a display therein (refer to the exemplary embodiment of FIG. 44), and the display 30 inside is divided, so that the initial information (i.e., a map in the exemplary embodiment of the present disclosure) and the Information on the final step of the selection area determined in Step 3 are simultaneously displayed. (i.e., the exemplary embodiment of FIG. 45).

Figure 45:
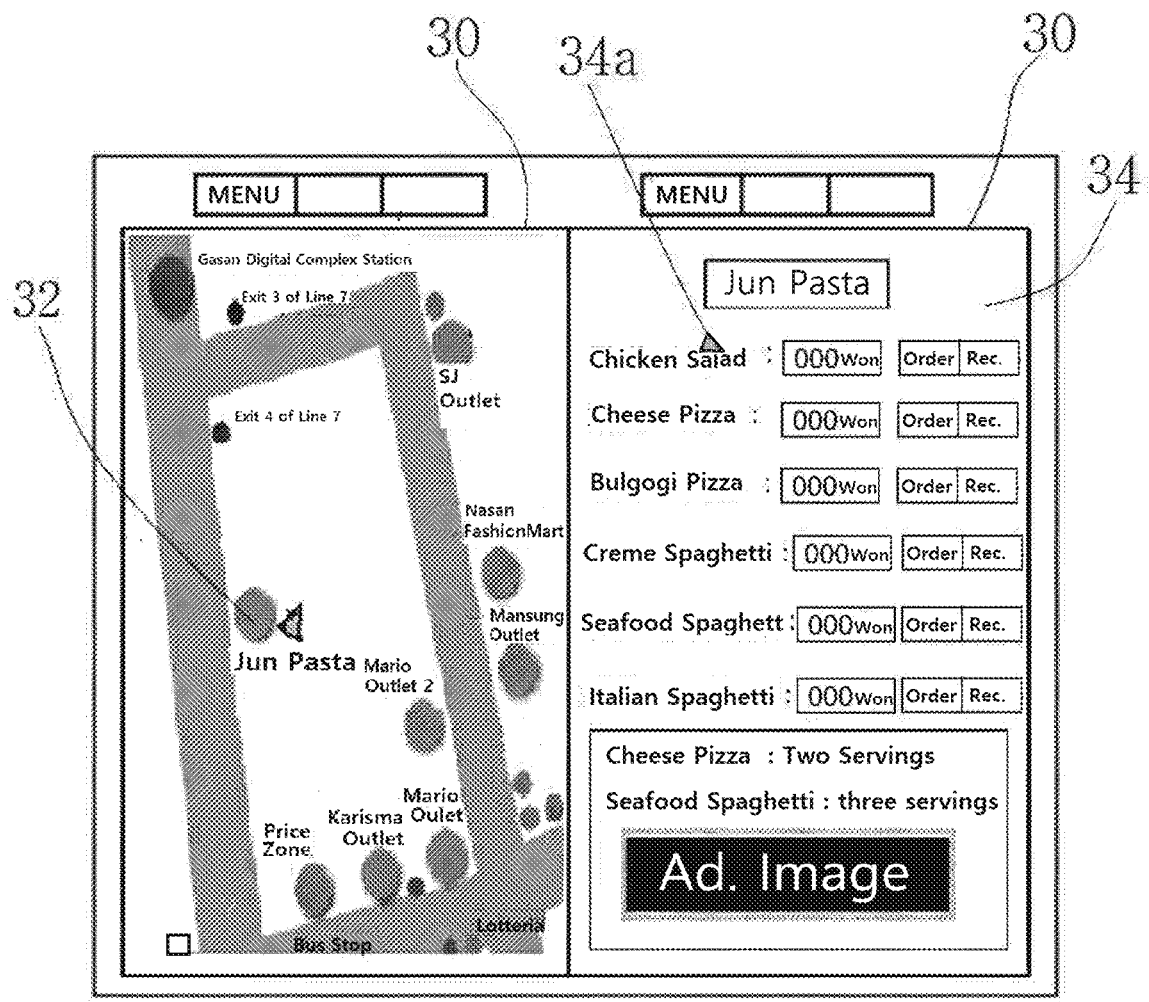

Another Application of Exemplary Embodiment of FIG. 45

The exemplary embodiment of FIG. 45 may be applied as it is even when the first display 30-1 and the second display 30-2 exist.

That is, when a foldable display in which an external display 30-3 exists is unfolded, a first display and a second display may exist therein.

That is, when the smartphone is unfolded, the initial information (i.e., the map in the exemplary embodiment of the present disclosure) is displayed on the first display (or second display), and the information on the final step of the selection area determined in Step 3 is displayed on the second display (or the first display). (i.e., the exemplary embodiment of FIG. 45).

—Describing Process in Steps—

(1) When the foldable smartphone is unfolded, the display 30 is present inside the smartphone. For the initial information (i.e., the map in the exemplary embodiment of FIG. 44) displayed on the display 30, when a stepwise operation command that divides a distance into steps or a stepwise operation command that divides an angle into steps is executed, the result of the stepwise operation command is displayed on the display 30 that is unfolded.

Figure 46:
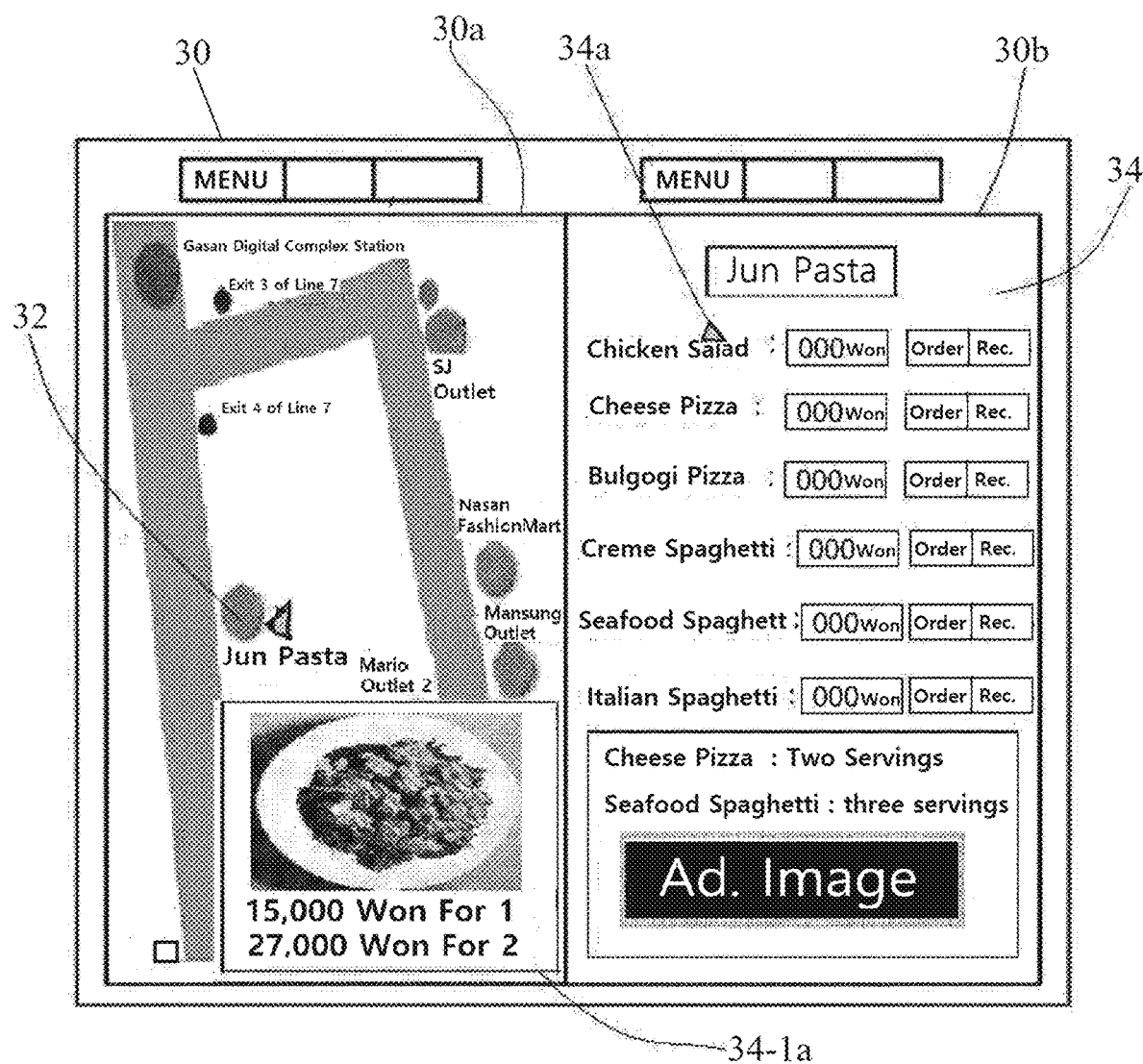

(2) In the case where the selection area exists in the initial information (i.e., the map in the exemplary embodiment of FIG. 44) displayed on display 30 that is unfolded, when a stepwise operation command is executed for the selection area, a screen is divided and displayed. For example, as shown in FIG. 46, the pieces of information is respectively displayed in the first area 30a (or the first display) and the second area 30b (or the second display). In addition, the execution steps are as follows:

Step 1 in which a selection area in initial information (i.e., a map in the exemplary embodiment of FIG. 44) is selected as a point through an input device, and a stepwise operation command is executed for the selected area;

Step 2 in which a position of the point from the input device is output to a central processing unit;

Step 3 in which the central processing unit determines a final step moved from a current step of the selection area; and Step 4 in which the central processing unit causes the initial information to be displayed on a part (i.e., first area 30a of the display 30) (or first display) that is unfolded, and causes the information on the final step of the selection area determined in Step 3 to be displayed on another part (i.e., second area 30b of the display 30) (or second display) that is unfolded. (The result of Step 4 may refer to the exemplary embodiment of FIG. 45).

Thus, the above-described steps are included.

In this case, in Step 3, the central processing unit determines the final step that is moved from the current step by means of the time for which a point of Step 1 is maintained or the intensity of the pressure applied through the point.

In addition, the exemplary embodiment of FIG. 46 may be implemented. That is, information on the final step of a selection area determined in Step 3 is displayed on the second area 30b (or the second display), the selection area exists in the second area 30b (or the second display), and when a stepwise operation command is executed on the selected area, a new window 34-1a is generated, so that the execution result of the stepwise operation command is displayed in the new window 34-1a.

That is, the case is the exemplary embodiment of FIG. 46. In FIG. 45, a table of contents for food is displayed in the second area 30b (or the second display). In addition, an item ("Chicken salad" in the exemplary embodiment of FIG. 45) among the table of contents for the food may be the selection area. Then, when the stepwise operation command for dividing time or pressure into steps is executed for the item (i.e., selection area), the result is displayed in a new window 34-1a (refer to the exemplary embodiment of FIG. 46).

—Case where Two Displays Exist Inside Foldable Display—

When a smartphone of the present disclosure is unfolded, two displays 30-1 and 30-2 appear. In addition, when the smartphone of the present disclosure is folded, an external display 30-3 is present. That is, the external display 30-3 exists outside the smartphone (refer to the exemplary embodiment of FIG. 42), and two displays 30-1 and 30-2 exist inside the smartphone.

In addition, when the stepwise operation command for dividing a distance or an angle into steps is executed for the initial information (i.e., the map in the exemplary embodiment of FIG. 43) displayed on the external display 30-3, the result is displayed on the external display 30-3. In addition, when the stepwise operation command for dividing time or pressure into steps is executed for the selected area 32 in the initial information (i.e., the map in the exemplary embodiment of FIG. 43), a separate window 30d-1 is generated and the result of the stepwise operation command dividing the time or pressure into the steps is displayed on the separate window 30d-1.

In addition, when the smartphone is unfolded, the central processing unit causes the initial information to be displayed on the first display 30-1, and the information displayed on the separate window 30d-1 is displayed on the second display 30-2.

Meanwhile, the previous exemplary embodiment of the present disclosure as it is applied to the method of displaying information on the two displays 30-1 and 30-2 that appear when the smartphone is unfolded.

Conversely, in the unfolded state of the smartphone, the pieces of information is respectively displayed on the two displays 30-1 and 30-2. When the smartphone is folded (i.e., closed), the central processing unit causes the information displayed on the first display 30-1 to be displayed on some area of the external display 30-3, and causes the information displayed on the second display 30-2 to be displayed on the separate window 30d-1. (refer to the exemplary embodiment of FIG. 47).

The method of displaying information on the first display and the second display, or the method of displaying the information by dividing the screen into the first area and the second area in one display, which are applied in the present disclosure, uses conventional methods. That is, the present disclosure uses the conventional methods of displaying the information on two displays, or the conventional methods of displaying the information by dividing the display screen.

The invention claimed is:

1. A smartphone configured to provide information, comprising:
   a display;
   a central processing unit; and
   an input device,
   wherein images or texts are displayed on the display,
   an operation command to select one of the images or texts as a point is input through the input device, the operation command being a touch by a user,
   the central processing unit controls for new information that is different from the one of the images or texts on the display,
   the new information is related to the selected images or texts, and the new information includes the first information and the second information,
   initial information is further provided, the initial information is displayed across the display and is displayed together with the images or texts,
   the first information is displayed across the display or on part of the display when an operation command of the first touch is executed on the selected images or texts,
   the second information is displayed on the display after the display screen is divided into two areas when an operation command of the second touch is executed on the selected images or texts,
   the time of the second touch is longer than the time of the first touch, and
   the initial information in one of the two areas is displayed, and the second information is displayed in the other of the two areas.

2. The smartphone of claim 1, wherein the smartphone is a foldable device, the display being a foldable display that is viewable to the user when the smartphone is unfolded,
   wherein the smartphone further includes an external display that is viewable to the user when the smartphone is folded.

3. A method of providing information in a smartphone comprising a display, a central processing unit, and an input device, the method comprising:
   displaying images or texts on the display;
   inputting an operation command to select one of the images or texts as a point through the input device, the operation command being a touch by a user; and
   controlling for, by the central processing unit, new information that is different from the one of the images or texts on the display,
   wherein:
   the new information is related to the selected images or texts, and the new information includes the first information and the second information,
   initial information is further provided, the initial information is displayed across the display and is displayed together with the images or texts,
   the first information is displayed across the display or on part of the display when an operation command of the first touch is executed on the selected images or texts,
   the second information is displayed on the display after the display screen is divided into two areas when an operation command of the second touch is executed on the selected images or texts, the time of the second touch is longer than the time of the first touch, and the initial information in one of the two areas is displayed, and the second information is displayed in the other of the two areas.

4. The method of claim 3, wherein the smartphone is a foldable device, the display being a foldable display that is viewable to the user when the smartphone is unfolded, wherein the smartphone further includes an external display that is viewable to the user when the smartphone is folded.

5. A smartphone configured to provide information, comprising:

a display;

a central processing unit; and an input device, wherein one application is executed, and a screen displayed on the display is divided into two areas, images or texts are displayed on one of the two areas, an operation command to select one of the images or texts as a point is input through the input device, the operation command being a touch by a user, the central processing unit controls for new information that is different from the one of the images or texts on the display, the new information is related to the selected images or texts, and the new information includes the first information and the second information, the display is a foldable display that is viewable to the user when the smartphone is unfolded, the smartphone further includes an external display that is viewable to the user when the smartphone is folded, the first information is displayed on the other of the two areas when an operation command of the first touch is executed on the selected images or texts, the second information is displayed on a part of the display when the operation command of the second touch is executed on the selected images or texts, and the time of the second touch is longer than the time of the first touch.

6. The smartphone of claim 5, wherein the one application is a map.

7. The smartphone of claim 5, wherein the images or texts are names, titles, numbers or phone numbers.

8. The smartphone of claim 5, wherein the images or texts are food names, which allows an order to be available through the food names.

9. A method of providing information in a smartphone comprising a display, a central processing unit, and an input device, comprising:

one application is executed, and a screen displayed on the display is divided into two areas, displaying images or texts on one of the two areas;

inputting an operation command to select one of the images or texts as a point through the input device, the operation command being a touch by a user; and controlling for, by the central processing unit, new information that is different from the one of the images or texts on the display, wherein:

the new information is related to the selected images or texts, and the new information includes the first information and the second information, the display is a foldable display that is viewable to the user when the smartphone is unfolded, the smartphone further includes an external display that is viewable to the user when the smartphone is folded, the first information is displayed on the other of the two areas when an operation command of the first touch is executed on the selected images or texts, the second information is displayed on a part of the display when the operation command of the second touch is executed on the selected images or texts, and the time of the second touch is longer than the time of the first touch.

10. The method of claim 9, wherein the one application is a map.

11. The method of claim 9, wherein the images or texts are names, titles, numbers or phone numbers.

12. The method of claim 9, wherein the images or texts are food names, which allows an order to be available through the food names.

13. The smartphone of claim 1, wherein a map is displayed on the display, a specific place is displayed on the map, the specific place is the one of the images or texts, and the specific place is selected as the point through the input device.

14. The method of claim 3, wherein a map is displayed on the display, a specific place is displayed on the map, the specific place is the one of the images or texts, and the specific place is selected as the point through the input device.

15. A smartphone configured to provide information, comprising:

a display;

a central processing unit; and an input device, wherein images or texts are displayed on the display, an operation command to select one of the images or texts as a point is input through the input device, the operation command being a touch by a user, the central processing unit controls for new information that is different from the one of the images or texts on the display, the new information is related to the selected images or texts, and the new information includes the first information and the second information, the display is a single unitary foldable display, initial information is further provided, the initial information is displayed across the display and is displayed together with the images or texts, the first information is displayed across the display or on part of the display when an operation command of the first touch is executed on the selected images or texts, the second information is displayed on the display after the display screen is divided into two areas when the operation command to move the selected point a certain distance after maintaining the selected point, which is the point selected in the images or texts, during the second touch time is executed, the time of the second touch is longer than the time of the first touch, and the initial information in one of the two areas is displayed, and the second information is displayed in the other of the two areas.

16. The smartphone of claim 15, wherein a map is displayed on the display, a specific place is displayed on the map, the specific place is the one of the images or texts, and the specific place is selected as the point through the input device.

17. The smartphone of claim 16, wherein the specific place refers to a place in which a product is sold, and if the operation command is executed on the one of the images or texts which is the specific place, a menu associated with the specific place is displayed on the display, allowing an order to be available through the menu.

18. A method of providing information in a smartphone comprising a display, a central processing unit, and an input device, comprising:
displaying images or texts on the display;
inputting an operation command to select one of the images or texts as a point through the input device, the operation command being a touch by a user; and
controlling for, by the central processing unit, new information that is different from the one of the images or texts on the display,
wherein:
the new information is related to the selected images or texts, and the new information includes the first information and the second information,
the display is a single unitary foldable display,
initial information is further provided, the initial information is displayed across the display and is displayed together with the images or texts,
the first information is displayed across the display or on part of the display when an operation command of the first touch is executed on the selected point, which is the point selected in the images or texts,
the second information is displayed on the display after the display screen is divided into two areas when the operation command to move the selected point a certain distance after maintaining the selected point, which is the point selected in the images or texts, during the second touch time is executed,
the time of the second touch is longer than the time of the first touch, and
the initial information in one of the two areas is displayed, and the second information is displayed in the other of the two areas.

19. The method of claim 18, wherein a map is displayed on the display, a specific place is displayed on the map, the specific place is the one of the images or texts, and the specific place is selected as the point through the input device.

20. The method of claim 19, wherein the specific place refers to a place in which a product is sold, and if the operation command is executed on the one of the images or texts which is the specific place, a menu associated with the specific place is displayed on the display, allowing an order to be available through the menu.

* * * * *